(12) United States Patent
Hasegawa

(10) Patent No.: US 10,586,154 B2
(45) Date of Patent: Mar. 10, 2020

(54) STATE ESTIMATION APPARATUS, STATE ESTIMATION METHOD, AND INTEGRATED CIRCUIT

(71) Applicant: MegaChips Corporation, Osaka-shi (JP)

(72) Inventor: Hiromu Hasegawa, Osaka (JP)

(73) Assignee: MEGACHIPS CORPORATION, Osaka (JP)

(*) Notice: Subject to any disclaimer, the term of this patent is extended or adjusted under 35 U.S.C. 154(b) by 0 days.

(21) Appl. No.: 15/468,748

(22) Filed: Mar. 24, 2017

(65) Prior Publication Data

US 2017/0278006 A1 Sep. 28, 2017

(30) Foreign Application Priority Data

Mar. 25, 2016 (JP) .................. 2016-061002
Apr. 18, 2016 (JP) .................. 2016-082679

(51) Int. Cl.
| | |
|---|---|
| *G06N 99/00* | (2019.01) |
| *G06T 7/00* | (2017.01) |
| *A61B 5/024* | (2006.01) |
| *A61B 5/091* | (2006.01) |
| *G06N 3/08* | (2006.01) |

(52) U.S. Cl.
CPC .................. *G06N 3/088* (2013.01)

(58) Field of Classification Search
CPC ....... G06N 5/047; G06N 99/005; G08G 1/123
See application file for complete search history.

(56) References Cited

U.S. PATENT DOCUMENTS

| 6,522,266 B1* | 2/2003 | Soehren | A61B 5/7264 340/988 |
|---|---|---|---|
| 2002/0052882 A1* | 5/2002 | Taylor | G06T 11/206 |
| 2005/0135667 A1* | 6/2005 | Saarela | G06K 9/036 382/141 |
| 2011/0066586 A1* | 3/2011 | Sabel | A61N 1/36025 706/52 |

(Continued)

FOREIGN PATENT DOCUMENTS

| JP | 2007-202964 | 8/2007 |
|---|---|---|
| JP | 2007-241866 A | 9/2007 |

OTHER PUBLICATIONS

Japanese Office Action dated Dec. 3, 2019, issued in corresponding Japanese Application No. 2016-061002.

*Primary Examiner* — Brian Turner
(74) *Attorney, Agent, or Firm* — Xsensus LLP

(57) ABSTRACT

Provided is a state determination apparatus that appropriately performs pattern classification processing and/or pattern determination processing even when a map generated by the SOM technique includes discontinuous image regions (e.g., split image regions). In the state determination apparatus, the matching processing unit obtains adaptability data indicating a correlation degree between template data indicating a predetermined state and the SOM output data. The state determination unit determines a state of an input data. This allows for appropriately performing pattern classification processing and/or pattern determination processing even when a map generated by the SOM technique includes discontinuous image regions (e.g., split image regions).

2 Claims, 26 Drawing Sheets

(56) References Cited

U.S. PATENT DOCUMENTS

| | | | | |
|---|---|---|---|---|
| 2013/0073223 | A1* | 3/2013 | Lapira | G06F 19/00 |
| | | | | 702/34 |
| 2013/0138388 | A1* | 5/2013 | Jain | G01P 15/00 |
| | | | | 702/141 |
| 2014/0310243 | A1* | 10/2014 | McGee | G06Q 10/101 |
| | | | | 707/639 |
| 2015/0112603 | A1* | 4/2015 | Zhong | G06K 9/46 |
| | | | | 702/19 |
| 2015/0339584 | A1* | 11/2015 | Baughman | G06F 16/116 |
| | | | | 706/11 |
| 2016/0325680 | A1* | 11/2016 | Curtis | B60R 1/00 |
| 2017/0342965 | A1* | 11/2017 | Olesen | F03D 1/06 |

* cited by examiner

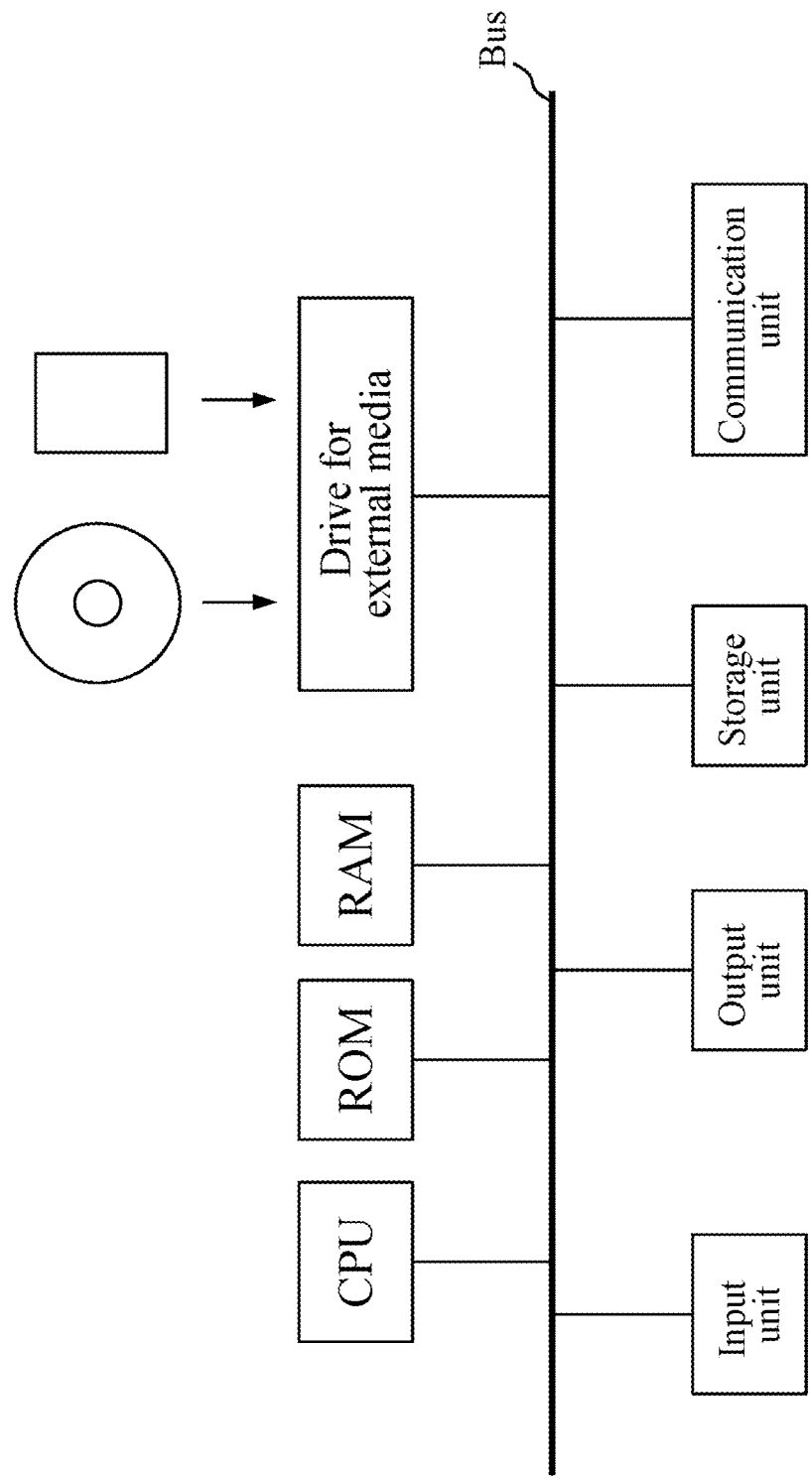

STATE ESTIMATION APPARATUS, STATE ESTIMATION METHOD, AND INTEGRATED CIRCUIT

This application claims priority to Japanese Patent Application No. 2016-061002 filed on Mar. 25, 2016, and Japanese Patent Application No. 2016-082679 filed on Apr. 18, 2016. The entire disclosure of Japanese Patent Application No. 2016-061002 filed on Mar. 25, 2016 and Japanese Patent Application No. 2016-082679 filed on Apr. 18, 2016 is hereby incorporated herein by reference.

BACKGROUND OF THE INVENTION

Field of the Invention

The present disclosure relates a technique that analyzes input data using SOM (Self-organizing map) to determine a state (pattern) indicating the input data.

Description of the Background Art

Self-organizing map (hereinafter referred to as "SOM") is achieved by modeling the visual cortex in the cerebral cortex. In the SOM, mapping input data into any-number-dimensional data by unsupervised machine learning enables visualization of multiple dimensional data (e.g., pattern classification). For example, the SOM maps high-dimensional input data into two-dimensional data, thereby enabling the high-dimensional input data to be projected in a second-dimensional map. Using the projected two-dimensional data (two-dimensional map) allows for performing classification processing of the input data (pattern classification processing). In the SOM, observing the projected two-dimensional data (two-dimensional map) through the above-described processing allows for visually and easily grasping a state for classification of the input data; thus the SOM is used in various fields.

For example, Patent Literature 1 (Japanese Unexamined Patent Publication No 2007-202964) discloses a technique of performing waveform analysis using the SOM.

The technique disclosed by Patent Literature 1 creates a waveform map using the SOM such that each of regions representing a predetermined waveform pattern form a continuous region. As shown in FIG. 16 in Patent Literature 1, the technique of Patent Literature 1 creates a waveform map in which continuous image regions listed below only exist (no split image regions exist) and the continuous image regions are clearly arranged.

(1) Image region representing the waveform A+
(2) Image region representing the waveform A
(3) Image region representing the waveform B+
(4) Image region representing the waveform B
(5) Image region representing the waveform C+
(6) Image region representing the waveform C
(7) Image region representing the waveform D+
(8) Image region representing the waveform D In the technique of Patent Literature 1, performing classification processing using the above-described waveform map allows the input waveform data to be classified appropriately (it is possible to determine that the input waveform data is similar to a predetermined waveform pattern).

However, the technique of Patent Literature 1 needs to generate the waveform map using the SOM technique such that a region representing a predetermined waveform pattern forms a continuous region. Thus, it is difficult for the technique of Patent Literature 1 to perform classification processing or pattern determination processing using a waveform map having discontinuous image regions (e.g., split image regions). In other words, with the conventional technique, the existence of discontinuous image regions (e.g., split image regions) in the map generated by the SOM technique makes it difficult to appropriately perform classification processing or pattern determination processing.

To solve the above problems, it is an object of the present invention to provide a state determination apparatus, a state determination method and an integrated circuit that appropriately perform pattern classification processing and/or pattern determination processing even when a map generated by the SOM technique includes discontinuous image regions (e.g., split image regions).

SUMMARY

To solve the above problem, a first aspect of the present invention provides a state determination apparatus including feature vector obtaining circuitry, mapping conversion circuitry, matching processing circuitry, and state determination circuitry.

The feature vector obtaining circuitry is configured to obtain feature vector data from measured data obtained by measuring an event with an unknown state.

The mapping conversion circuitry is configured to obtain SOM output data by mapping the feature vector data into a space whose dimension differs from a dimension of the feature vector data.

The matching processing circuitry is configured to obtain adaptability data indicating a correlation degree between template data indicating a predetermined state and the SOM output data obtained by the mapping conversion circuitry.

The state determination circuitry is configured to determine a state indicated by the measured data based on the adaptability data obtained by the matching processing circuitry.

BRIEF DESCRIPTION OF THE DRAWINGS

FIG. 26 is a schematic diagram of an exemplary configuration with a CPU bus

DESCRIPTION OF THE PREFERRED EMBODIMENTS

First Embodiment

A first embodiment will now be described with reference to the drawings.

1.1 Structure of State Determination Apparatus

Figure 1:
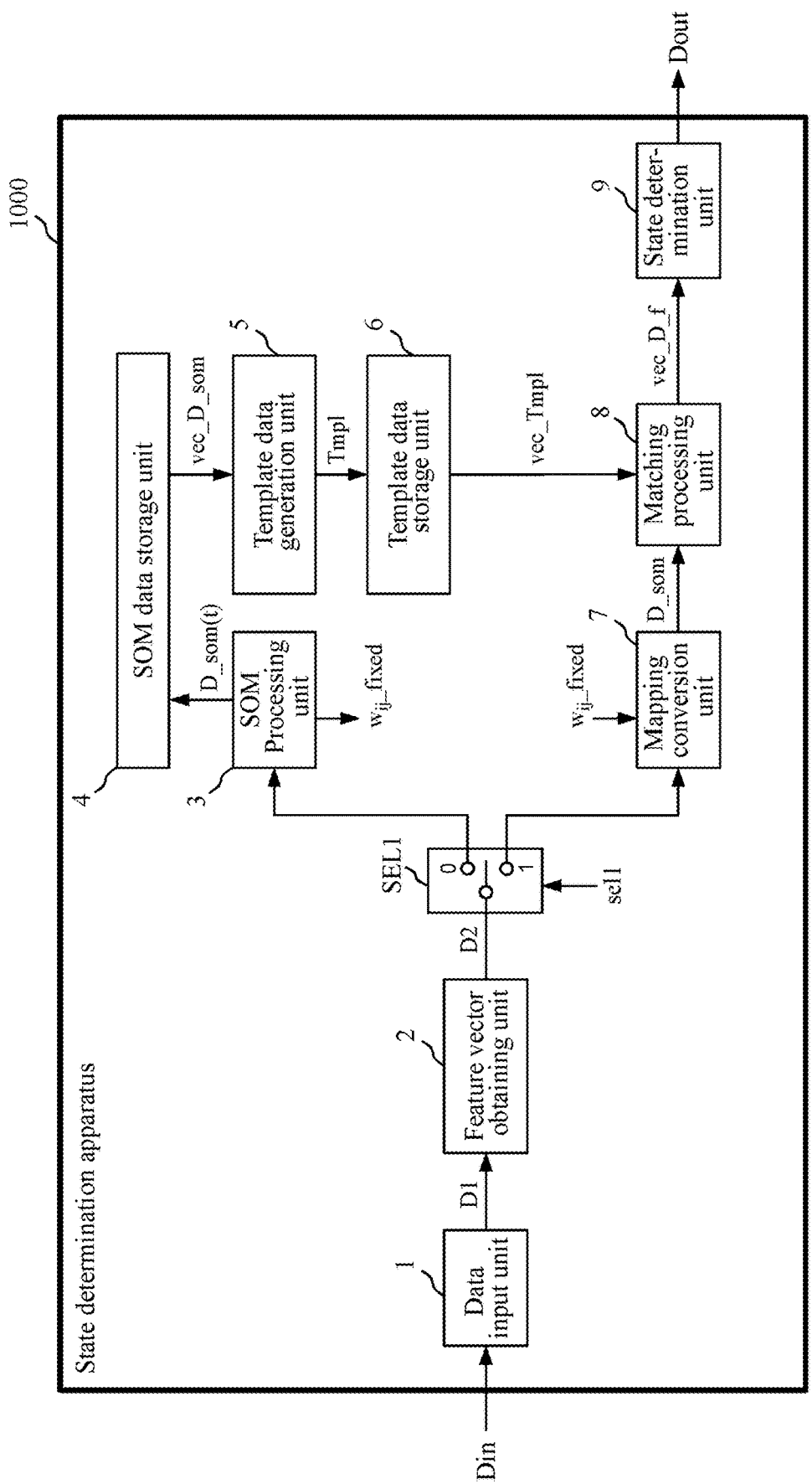
FIG. 1 is a schematic diagram of a state determination apparatus 1000 according to a first embodiment.

FIG. 1 is a schematic diagram of a state determination apparatus 1000 according to the first embodiment.

Figure 2:
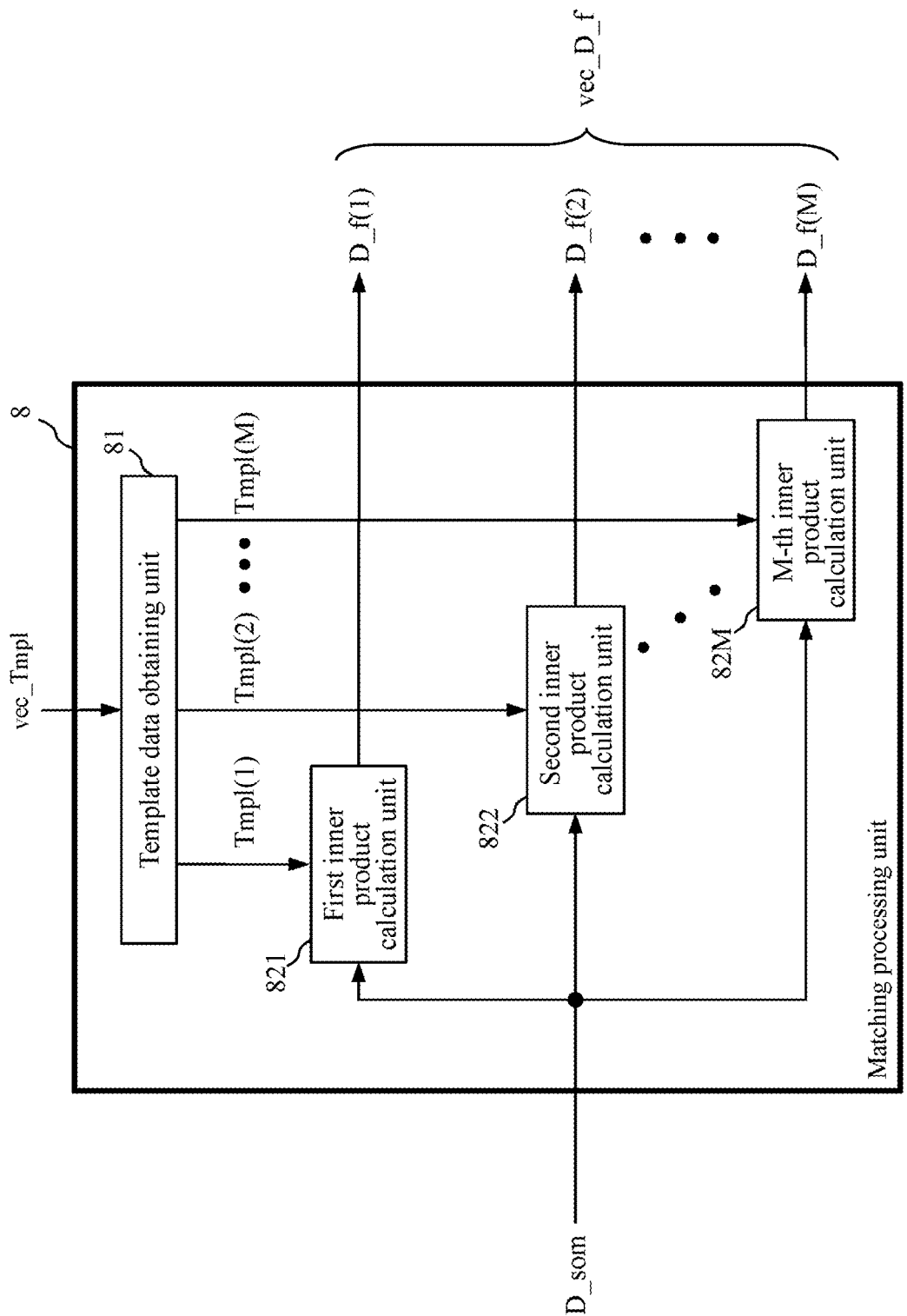
FIG. 2 is a schematic diagram of a matching processing unit 8 according to the first embodiment.

FIG. 2 is a schematic diagram of a matching processing unit 8 according to the first embodiment.

As shown in FIG. 1, the state determination apparatus 1000 includes a data input unit 1, a feature vector obtaining unit 2, selector SEL1, an SOM processing unit 3, an SOM storage unit 4, a template data generation unit 5, and a template data storage unit 6.

As shown in FIG. 1, the state determination apparatus 1000 also includes a mapping conversion unit 7, a matching processing unit 8 and a state determination unit 9.

The data input unit 1 receives an electric signal (sensor output signal) outputted from a sensor (e.g., an acceleration sensor) for example. The data input unit 1 converts the received electric signal into a digital signal, and then transmits the converted signal, as a signal D1, to the feature vector obtaining unit 2.

The feature vector obtaining unit 2 receives the signal D1 transmitted from the data input unit 1. The feature vector obtaining unit 2, for example, performs frequency transform on the received signal D1 to obtain a feature vector. The feature vector obtaining unit 2 then transmits the obtained feature vector data to the selector SEL1 as a signal D2 (feature vector data D2).

The selector SEL1 receives the signal D2 transmitted from the feature vector obtaining unit 2. The selector SEL1 transmits the signal D2, in accordance with a selecting signal sell, to the SOM processing unit 3 or the mapping conversion unit 7. Note that the selecting signal sel 1 is generated by a controller (not shown) that controls the various functional units of the state determination apparatus 1000.

The SOM processing unit 3 receives the feature vector data D2 (signal D2) transmitted from the selector SEL1. The SOM processing unit 3 performs SOM processing using the feature vector data D2.

(1) In a learning phase (a phase for performing a process to determine combining weights which are used when nodes in an input layer are each combined with nodes in an output layer), the SOM processing unit 3 performs SOM processing using the feature vector data D2 to determine combining weights between nodes in the input layer and nodes in the output layer. The SOM processing unit 3 completes the above processing, and then transmits the determined data for the combining weights between nodes in the input layer and nodes in the output layer to the mapping conversion unit 7 as the combining weights data $w_{ij}$ fixed.

(2) In a template creating phase, the SOM processing unit 3 performs SOM processing using the feature vector data D2, and then transmits SOM output data to the SOM data storage unit 4 as data D_som(t) (SOM output data D_som(t), which is data at current timing t).

The SOM data storage unit 4 stores the SOM output data D_som(t) transmitted from the SOM processing unit 3. The SOM data storage unit 4 is achieved using RAM (Random Access Memory), for example.

The template data generation unit 5 reads a plurality of pieces of SOM output data D_som, such as N (N is a natural number) pieces of SOM output data, each of which is obtained at timings t to t+N−1, from the SOM data storage unit 4. Note that a plurality of pieces of SOM data that the template data generation unit 5 reads from the SOM data storage unit 4 are referred to as vector data vec_D_som. The template data generation unit 5 generates template data from the plurality of SOM data read from the SOM storage unit 4, and then transmits the generated template data to the template data storage unit 6 as template data Tmpl.

The template data storage unit 6 stores the template data Tmpl transmitted from the template data generation unit 5. The template data storage 6 is achieved using RAM (Random Access Memory), for example.

The mapping conversion unit 7 receives the feature vector data D2 (signal D2) transmitted from the selector SEL1. The mapping conversion unit 7 also receives the combining weights data $w_{ij\_}$ fixed between nodes in the input layer and nodes in the output layer, which is determined by the SOM processing unit 3. The mapping conversion unit 7 performs SOM processing on the feature vector data D2 (signal D2) using the combining weights data $w_{ij\_}$ fixed to obtain SOM output data D_som. The mapping conversion unit 7 then transmits the obtained SOM output data D_som to the matching processing unit 8.

The matching processing unit 8 receives the SOM output data D_som transmitted from the mapping conversion unit 7. The matching processing unit 8 reads a plurality of pieces of template data Tmpl from the template data storage unit 6. Note that a plurality of pieces of SOM data that the matching processing unit 8 reads from the template data storage unit 6 are referred to as vector data vec_Tmpl.

The matching processing unit 8 performs matching processing using the SOM output data D_som and the plurality pieces of template data read from the template data storage unit 6 to obtain adaptability data D_f for each template data. The matching processing unit 8 transmits the obtained adaptability data D_f for each template data to the state determination unit 9 as vector data vec_D_f.

As shown in FIG. 2, the matching processing unit 8 includes a template data obtaining unit 81, and M (M is a natural number.) inner product calculation units, or a first inner product calculation unit 821 to M-th inner product calculation unit 82M.

The template data obtaining unit 81 reads a plurality of pieces of template data Tmpl (M pieces of template data Tmpl(1) to Tmpl(M)) from the template data storage unit 6. The template data obtaining unit 81 transmits M pieces of template data Tmpl(1) to Tmpl(M) to the first inner product calculation unit 821 to the M-th inner product calculation unit 82M, respectively.

The first inner product calculation unit 821 receives the SOM output data D_som transmitted from the mapping conversion unit 7 and the template data Tmpl(1) transmitted from the template data obtaining unit 81. The first inner product calculation unit 821 performs processing for calculating an inner product using the SOM output data D_som and the template data Tmpl(1). The first inner product calculation unit 821 then transmits a signal representing the calculated inner product value to the state determination unit 9 as a signal D_f(1).

Note that the same processing as described above is performed in the second inner product calculation unit 822 to M-th inner product calculation unit 82M.

In other words, a k-th (k is a natural number satisfying 1≤k≤M) inner product calculation unit 82$k$ receives the SOM data D_som transmitted from the mapping conversion unit 7 and the template data Tmpl(k) transmitted from the template data obtaining unit 81. The k-th inner product calculation unit 82$k$ performs processing for calculating an inner product using the SOM output data D_som and the template data Tmpl(k). The k-th inner product calculation unit 82$k$ then transmits a signal representing the calculated inner product value to the state determination unit 9 as a signal D_f(k).

Note that the signal D_f(1) to D_f(M), each of which is transmitted from the corresponding one of the first inner product calculation unit 821 to the M-th inner product calculation unit 82M, are collectively referred to as vector data vec_Tmpl.

For ease of explanation, a case of M=3 will be described below.

Figure 3:
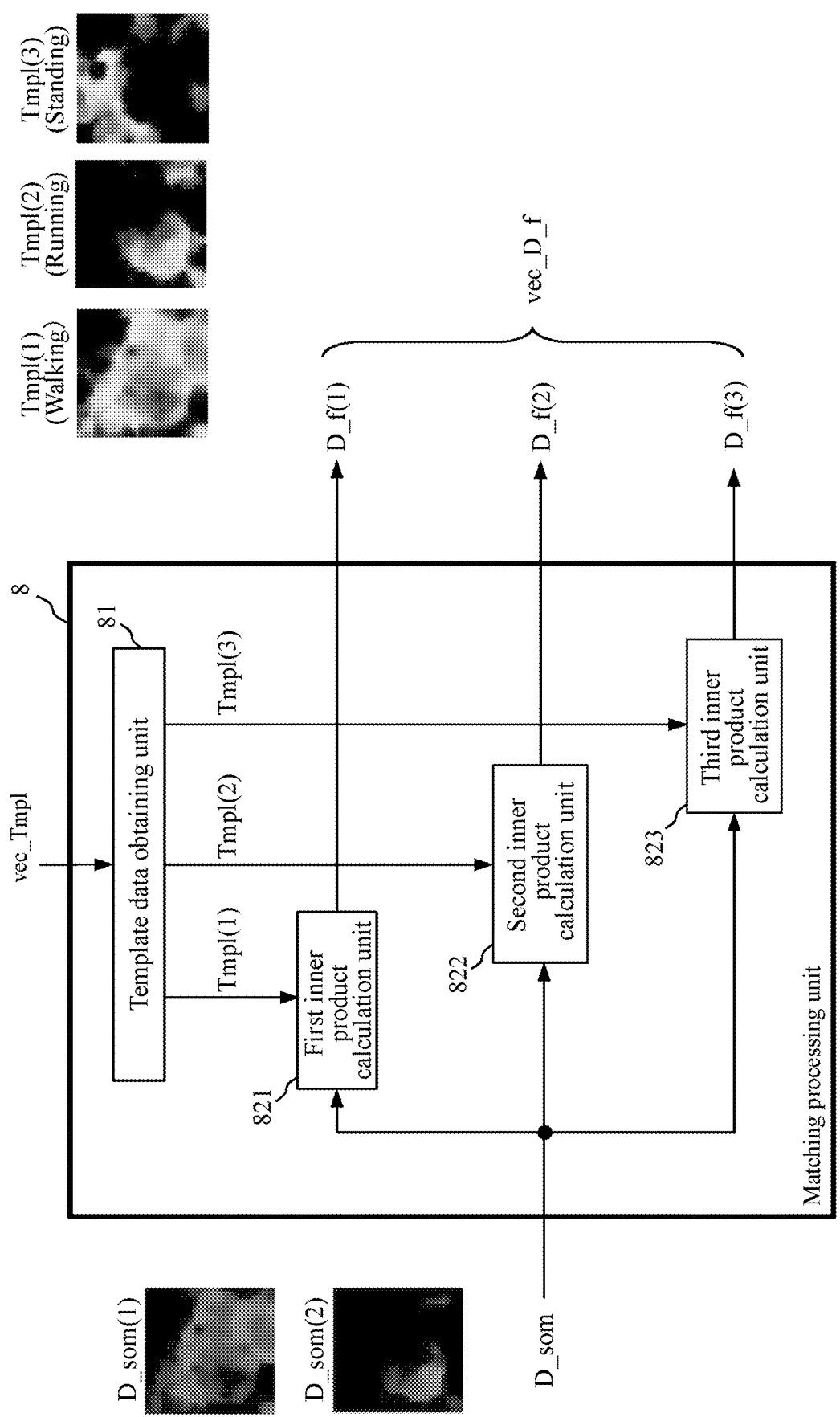
FIG. 3 is a schematic diagram of the matching processing unit 8 in the case of M=3.

FIG. 3 is a schematic diagram of the matching processing unit 8 in the case of M=3.

The state determination unit 9 receives the vector data vec_D_f of the adaptability data transmitted from the matching processing unit 8. The state determination unit 9 determines the state at currency timing t based on the received vector data vec_D_f, and then transmits data containing the determination result as data Dout out of the state determination apparatus 1000.

1.2 Operation of State Determination Apparatus

The operation of the state determination apparatus 1000 with the above-described structure will now be described.

In one example, a case in which an output from an acceleration sensor (not shown) for detecting a state of a person is inputted into the state determination apparatus 1000 will now be described. For ease of explanation, a case in which the state determination apparatus 1000 determines one of three states of a person including (1) Walking state (a state indicating that a person is walking), (2) Running state (a state indicating that a person is running), and (3) Standing state (a state indicating that a person is standing) will now be described.

For the operation of the state determination apparatus 1000, (1) the operation in the learning phase, (2) the operation of the template creating phase, and (3) the operation of the state determination processing phase will now be described separately.

1.2.1 Operation of Learning Phase

First, the operation of the learning phase in the state determination apparatus 1000 will be described.

The output from the acceleration sensor (not shown) for detecting a state of a person is inputted, as a signal Din, to the data input unit 1. Note that the acceleration sensor may be attached to a human body, for example.

The data input unit 1 samples (digitizes) the signal Din to obtain discrete data (digital data) thereof. The data input unit 1 then transmits the obtained discrete data (digital data) to the feature vector obtaining unit 2 as the signal D1.

The feature vector obtaining unit 2 transforms the discrete data D1 (digital data D1) obtained by the data input unit 1, for example, using Gabor-wavelet transform, into frequency-domain data to obtain the magnitude and phase of each frequency spectrum of the digital data D1.

The feature vector obtaining unit 2 then obtains, for example, data of the magnitude of the frequency spectrum included in a partial frequency band as the feature vector data D2.

The transform to obtain frequency-domain data from the discrete data D1 (digital data D1) should not be limited to Gabor-wavelet transform; for example, the discrete Fourier transform, the fast Fourier transform, the wavelet transform and other transforms may be used.

Figure 4:
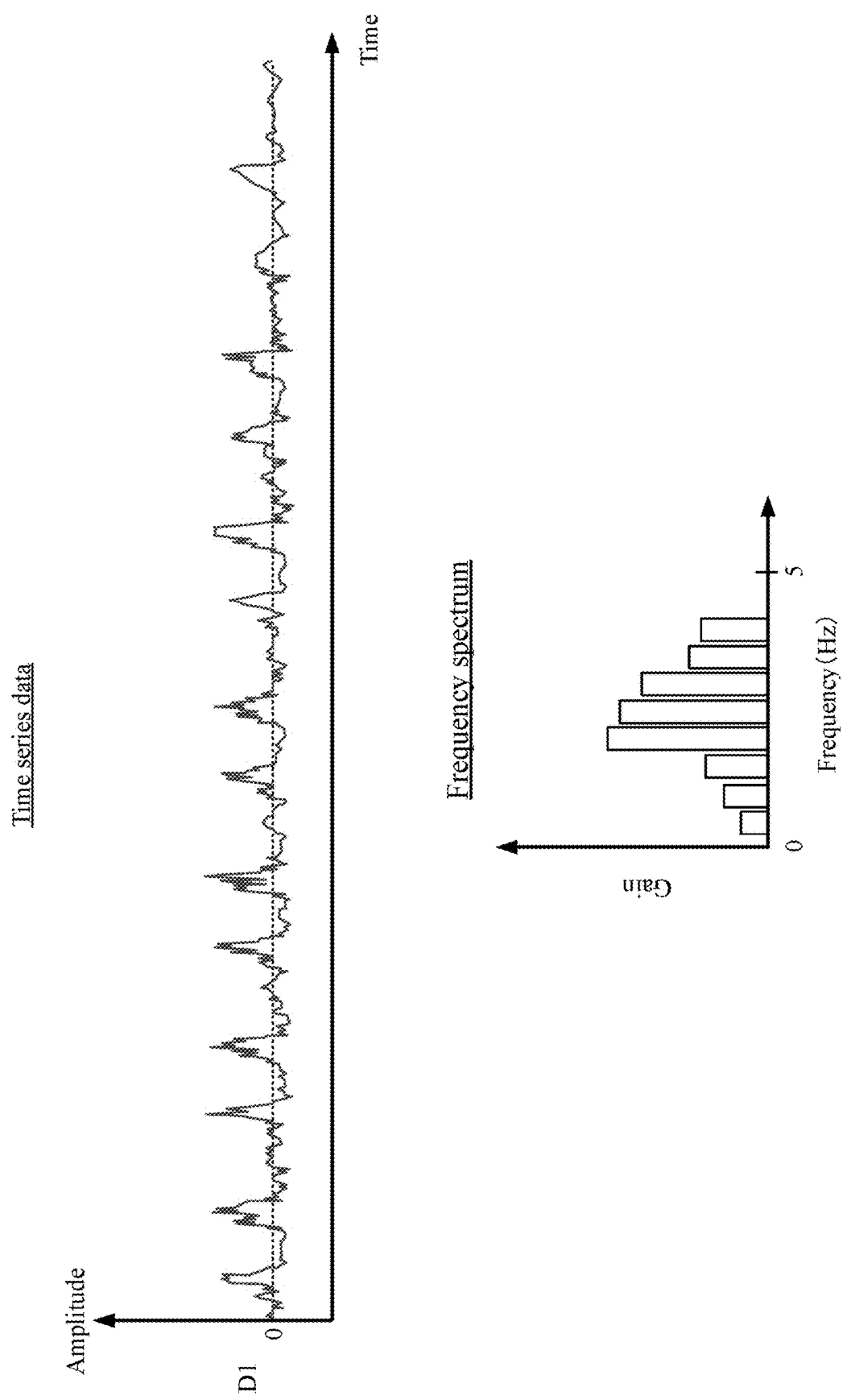
FIG. 4 is a diagram showing digital data D1 (time series data D1) obtained by a data input unit 1 and frequency-domain data D2 obtained by performing frequency transform on the digital data D1.

FIG. 4 is a diagram showing digital data D1 (time series data D1) obtained by a data input unit 1 (the upper portion of FIG. 4) and frequency-domain data D2 obtained by performing frequency transform on the digital data D1 (the lower portion of FIG. 4).

In the case of FIG. 4, the feature vector obtaining unit 2 obtains 8-dimensional data, which is vector data consisting of eight parameters (eight frequency components included in a range from 0 to 5 Hz) as the frequency-domain data D2.

For ease of explanation, a case in which the feature vector obtaining unit 2 obtains 8-dimensional data, which is vector data consisting of eight parameters (eight frequency components included in a range from 0 to 5 Hz) as the frequency-domain data D2 will now be described.

The feature vector data D2 obtained as described above is transmitted from the feature vector obtaining unit 2 to the selector SEL1.

The controller (not shown) that controls the various functional units of the state determination apparatus 1000 generates a selecting signal sel1 for selecting the terminal 0 of the selector SEL1, and then transmits the generated selecting signal sel1 to the selector SEL1.

The selector SEL1 transmits the signal D2 to the SOM processing unit 3 in accordance with the selecting signal sel1.

The SOM processing unit 3 performs SOM processing using the feature vector data D2 (signal D2) transmitted from the selector SEL1 to determine the combining weights between nodes in the input layer and neurons in the output layer. This processing will be described with reference to FIG. 5.

Figure 5:
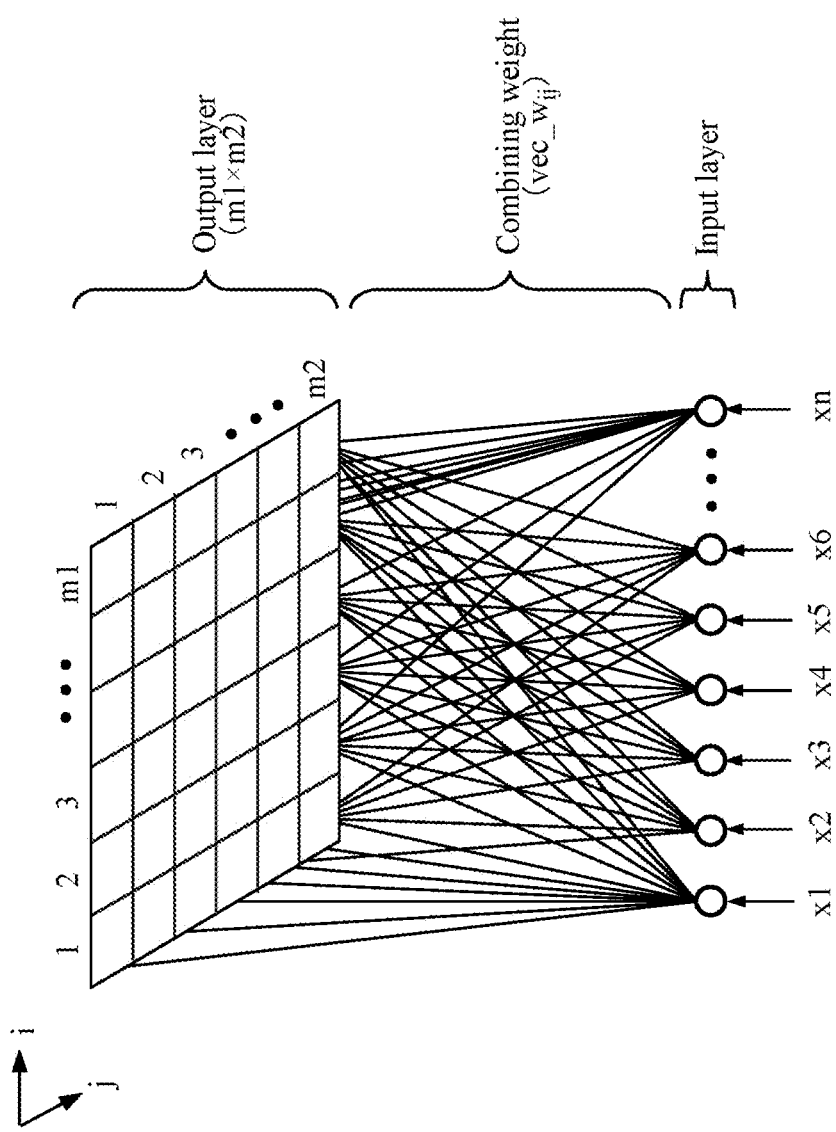
FIG. 5 is a diagram describing SOM processing and schematically showing the structure of an SOM.

FIG. 5 is a diagram describing SOM processing and schematically showing the structure of an SOM. Note that i-axis and j-axis are set as shown in FIG. 5 to define a plane on which neurons of the output layer are disposed.

Assume that input data is given as n-dimensional real number vec_x=$(x_1, x_2, \ldots, x_n)$ and the two-dimensional SOM has neurons disposed on m1×m2(=M1) lattice points. More specifically, as shown in FIG. 5, the input layer has n nodes and the output layer has neurons each disposed on one of m1×m2(=M1) lattice points.

Each of nodes (n input nodes) in the input layer for receiving the input data vec_x is connected to all neurons (all output neurons). The neuron $u_{i,j}$, which is located at (i, j) in the two-dimensional lattice arrangement of the output layer, has variable combining weight vector vec_$w_{ij}$= $(w_{ij\_1}, w_{ij\_2}, \ldots, w_{ij\_n})$ for weighting and combining each element of the input data vec_x. This combining weight vector is referred to as a reference vector.

Note that $w_{ij\_k}$ is a combining weight for the output node at a coordinate (i, j) and k-th input node.

The SOM processing unit 3 performs SOM processing through processes described in "<<Step 1>>" and "<<Step 2>>" below.

<<Step 1: Initialization>>

The SOM processing unit 3 randomly sets (sets using random numbers) initial values for vec_$w_{11}$, vec_$w_{12}$, ..., and vec_$w_{mm}$ at timing t=0 where n is the number of input data vectors and T (≥n) is the number for iteration.

<<Step 2: Learning>>

The SOM processing unit 3 performs processing described below at timing t.

2A:

The SOM processing unit 3 calculates a Euclidean distance dis(vec_x(t), vec_$w_{ij}$(t−1)) between the input data vec_x(t), which is an input data at timing t, and each of reference vectors vec_$w_{ij}$(t−1). Note that dis(vec1, vec2) is a function for calculating a Euclidean distance between a vector vec1 and a vector vec2.

2B:

The SOM processing unit 3 determines a neuron $u_u$ with the minimum Euclidean distance, and then sets the determined neuron as a winning neuron $u_{IJ}$. Note that the neuron $u_{IJ}$ is a neuron located at the coordinate (I, J).

Alternatively, the SOM processing unit 3 may determine a neuron $u_{IJ}$ with the maximum inner product value between the input data vec_x(t) at timing t and the reference vector vec_$w_{ij}$(t−1) at timing t−1, and then set the determined neuron as a winning neuron $u_{IJ}$.

2C:

The SOM processing unit 3 performs learning processing for the reference vector vec_$w_{ij}$(t), which is a reference vector at timing t, using the following formula:

vec_$w_{ij}$(t)=vec_$w_{ij}$(t−1)+h((i,j),(I,J),t)×
(vec_x(t)−vec_$w_{ij}$(t−1))

Note that h is a monotonically decreasing function and has characteristics below.

(1) The function h is a monotonically decreasing function with respect to t, and converges zero as t approaches infinity.
(2) The function h is a monotonically decreasing function with respect the Euclidean distance dis(vec_$u_{ij}$, vec_$u_{IJ}$) between a lattice point (i, j) and a lattice point (I, J) The monotonically decreasing rate (amount) of the function h becomes larger as t becomes larger. Note that vec_$u_{ij}$ is a vector from a predetermined point (e.g., the origin) to the position of a neuron $u_{ij}$ and vec_$u_{IJ}$ is a vector from a predetermined point (e.g., the origin) to the position of a neuron $u_{IJ}$.

Furthermore, the SOM processing unit 3 performs the same processing as described above at timing t+1.

Note that the timing t+1 is timing at which the feature vector obtaining unit 2 obtains the data D2 and the SOM processing unit 3 receives, next to timing t, the data D2 obtained by the feature vector obtaining unit 2.

The SOM processing unit 3 repeatedly performs the above-described processing until timing t=T.

The SOM processing unit 3 performs the above-described SOM processing, and then obtains the reference vector vec_$w_{ij}$ which has been obtained when the above-described SOM processing has been completed as a determined reference vector vec_$w_{ij\_}$fixed. The SOM processing unit 3 then transmits the determined reference vector vec_$w_{ij\_}$fixed to the mapping conversion unit 7.

For ease of explanation, a case in which the input data vec_x, or data D2, consists of eight pieces of frequency component data and the second-dimensional SOM has neurons each of which is assigned to its corresponding one of 32×32 lattice points will now be described as one example.

1.2.2 Operation of Template Creating Phase

Next, the operation of the template creating phase in the state determination apparatus 1000 will be described.

In the template creating phase, the state determination apparatus 1000 creates template data for (1) Walking state (a state indicating that a person is walking), (2) Running state (a state indicating that a person is running), and (3) Standing state (a state indicating that a person is standing).

First, a case of creating a template for Walking state (a state indicating that a person is walking) will be described.

In this case, the output from the acceleration sensor (not shown) while a person is walking (continues to be in the Walking state) is inputted into the data input unit 1 as the signal Din.

The data input unit 1 samples (digitizes using AD conversion) the signal Din to obtain discrete data (digital data). the data input unit 1 transmits the obtained discrete data (digital data) to the feature vector obtaining unit 2 as the signal D2.

The feature vector obtaining unit 2 transforms the discrete data D1 (digital data D1) obtained by the data input unit 1, for example, using Gabor-wavelet transform, into frequency-domain data to obtain the magnitude and phase of each frequency spectrum of the digital data D1.

The feature vector obtaining unit 2 then obtains, for example, data of the magnitude of the frequency spectrum included in a partial frequency band as the feature vector data D2.

The feature vector data D2 obtained by the feature vector obtaining unit 2 is transmitted from the feature vector obtaining unit 2 to the selector SEL1.

The controller (not shown) that controls the various functional units of the state determination apparatus 1000 generates a selecting signal sel1 for selecting the terminal 0 of the selector SEL1, and then transmits the generated selecting signal sel1 to the selector SEL1.

The selector SEL1 transmits the signal D2 to the SOM processing unit 3 in accordance with the selecting signal sel1.

The SOM processing unit 3 performs SOM processing using the feature vector data D2 (signal D2) transmitted from the selector SEL1. In this case, the SOM processing uses, as combining weight vectors (reference vectors) vec_$w_{ij}$, the combining weight vectors (reference vectors) vec_$w_{ij}$_fixed that are determined through the above-described learning processing. The SOM processing unit 3 performs SOM processing on the feature vector data D2 (signal D2) using the combining weight vectors (reference vectors) vec_$w_{ij}$_fixed to obtain SOM data D_som(t), which is SOM data at timing t. The SOM processing unit 3 transmits the obtained SOM data D_som(t) to the SOM data storage unit 4.

The SOM data storage unit 4 stores the SOM output data D_som(t) transmitted from the SOM processing unit 3.

While a person is walking (continues to be in the Walking state) during a period from the timing t=1 to the timing t=N, the state determination apparatus 1000 performs the above-described processing. The SOM processing unit 3 then stores N pieces of SOM output data D_som(t) obtained during the period from the timing t=1 to t=N to the SOM data storage unit 4.

The template data generation unit 5 reads N pieces of SOM output data D_som(1) to D_som(N) obtained during the period from the timing t=1 to t=N (the period in which the person is walking (continues to be in the Walking state)) from the SOM data storage unit 4. Using the SOM output data D_som(1) to D_som(N), the template data generation unit 5 calculates an average value of the output values at the same coordinate position on the second-dimensional SOM (an average of values output from the same output node). Template data for the Walking state (a state indicating that a person is walking) is created by setting the calculated average values to values of their corresponding nodes.

More specifically, assuming that the feature vector data vec_x(t), which is feature vector data at timing t, is defined by the following formulae:

$$\text{vec\_}x(t)=(x_1(t),x_2(t), \ldots ,x_{N1}(t))$$

$N1=8$, and the determined combining weight vector f_vec_$w_{ij}$ is defined by the following formulae:

$$f\_\text{vec\_}w_{ij}=(w_{ij\_1},w_{ij\_2}, \ldots ,w_{ij\_N1})$$

$N1=8$, the template data is obtained by the following formula:

Formula 1

$$D_{ij}(t) = \sum_{k=1}^{N1} \{x_k(t) \times w_{ij\_k}\} \qquad (1)$$

$N1 = 8$ where $D_{ij}(t)$ is the output value of a neuron (output node) located at (i, j) on the second-dimensional SOM at timing t.

Note that $w_{ij\_k}$ is a combining weight between the output node at the coordinate (i, j) and the k-th input node.

The template data generation unit 5 obtains a template data value $g_{ij}$ for a node corresponding to a neuron (output node) located at (i, j) on the second-dimensional SOM through the processing corresponding to the formula below.

Formula 2

$$g_{ij} = \frac{1}{N}\sum_{t=1}^{N} D_{ij}(t) \qquad (2)$$

The template data generation unit 5 obtains second-dimensional template data by assigning the value $g_{ij}$ calculated through the above processing to the node at the coordinate (i, j)

Figure 6:
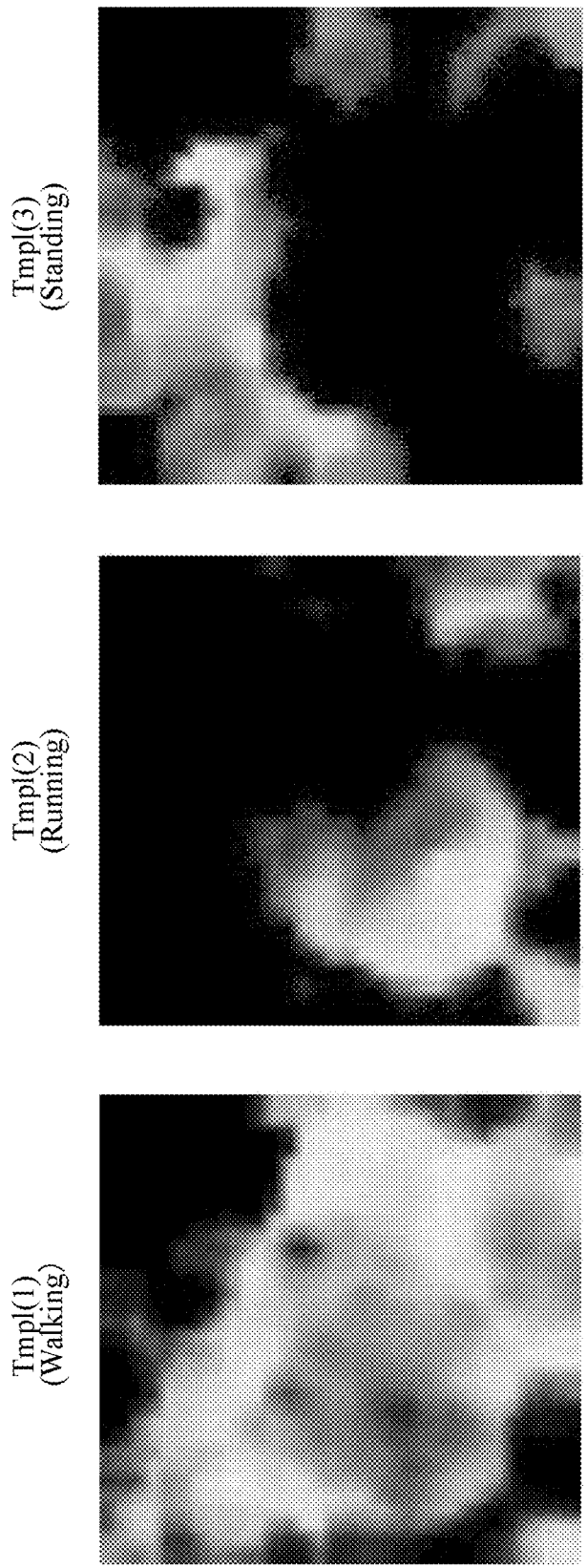
FIG. 6 is a diagram showing an example of template data.

FIG. 6 is a diagram showing an example of template data.

The left portion of FIG. 6 is a diagram showing the template data Tmpl(1) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is walking (continues to be in Walking state)). In the left portion of FIG. 6, the pixel value at the coordinate (i, j) of the template data Tmpl(1) is the value $g_{ij}$ calculated through the above-described processing.

In the template data shown in FIG. 6, values $g_{ij}$ are normalized to range from 0 to 1 inclusive ($0 \leq g_{ij} \leq 1$). In the template data shown in FIG. 6, the template data is represented as image data in which a pixel of $g_{ij}=0$ is depicted as a pixel with a pixel value of 0, which corresponds to W 0% level, and a pixel of $g_{ij}=1$ is depicted as a pixel with a pixel value of 1, which corresponds to W 100% level.

The template data Tmpl(1) for the Walking state (a state in which a person is walking) obtained by the template data generation unit 5 as described above is stored in the template data storage unit 6.

Processing for creating template data for the Running state (a state in which a person is running) is performed in the same manner as described above (the created template is referred to as "template data Tmpl(2)").

More specifically, the output from the acceleration sensor (not shown) while a person is running (continues to be in the Running state) during a period from the timing t=1 to the timing t=N is inputted into the data input unit 1 as the signal Din. The state determination apparatus 1000 performs processing similar to the above-described processing to obtain template data Tmpl(2) for the Running state (a state in which a person is running). The obtained template data Tmpl(2) for the Running state (a state in which a person is running) is then stored in the template data storage unit 6.

The center portion of FIG. 6 is a diagram showing the template data Tmpl(2) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is running (continues to be in Running state)).

Processing for creating template data for the Standing state (a state in which a person is standing) is performed in the same manner as described above. The template data for the Standing state is referred to as template data Tmpl(3).

More specifically, the output from the acceleration sensor (not shown) while a person is standing (continues to be in the Standing state) during a period from the timing t=1 to the timing t=N is inputted into the data input unit 1 as the signal Din. The state determination apparatus 1000 performs processing similar to the above-described processing to obtain template data Tmpl(3) for the Standing state (a state in which a person is standing). The obtained template data Tmpl(3) for the Standing state (a state in which a person is standing) is then stored in the template data storage unit 6.

The right portion of FIG. 6 is a diagram showing the template data Tmpl(3) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is standing (continues to be in Standing state)).

A case in which the template data generation unit 5 creates template data by calculating an average value of the output values at the same coordinate position on the second-dimensional SOM (an average of values output from the same output node) using the SOM output data D_som(1) to D_som(N) is described above. However, the present invention should not be limited to the above-described processing. For example, the template data generation unit 5 may create template data through processing below (Processing 1 to Processing 4).

(1) Processing 1 (Threshold Processing for Output Values)

Using the SOM output data D_som(1) to D_som(N), the template data generation unit 5 compares the output values $D_{ij}(t)$ at the same coordinate position on the second-dimensional SOM (the values output from the same output node) with a threshold value Th1. The template data generation unit 5 calculates an average value of the output values $D_{ij}(t)$ satisfying $D_{ij}(t) \geq Th\mathbf{1}$, and then sets the calculated average value as a value $g_{ij}$ at the coordinate (i, j) of the template data.

Figure 7:
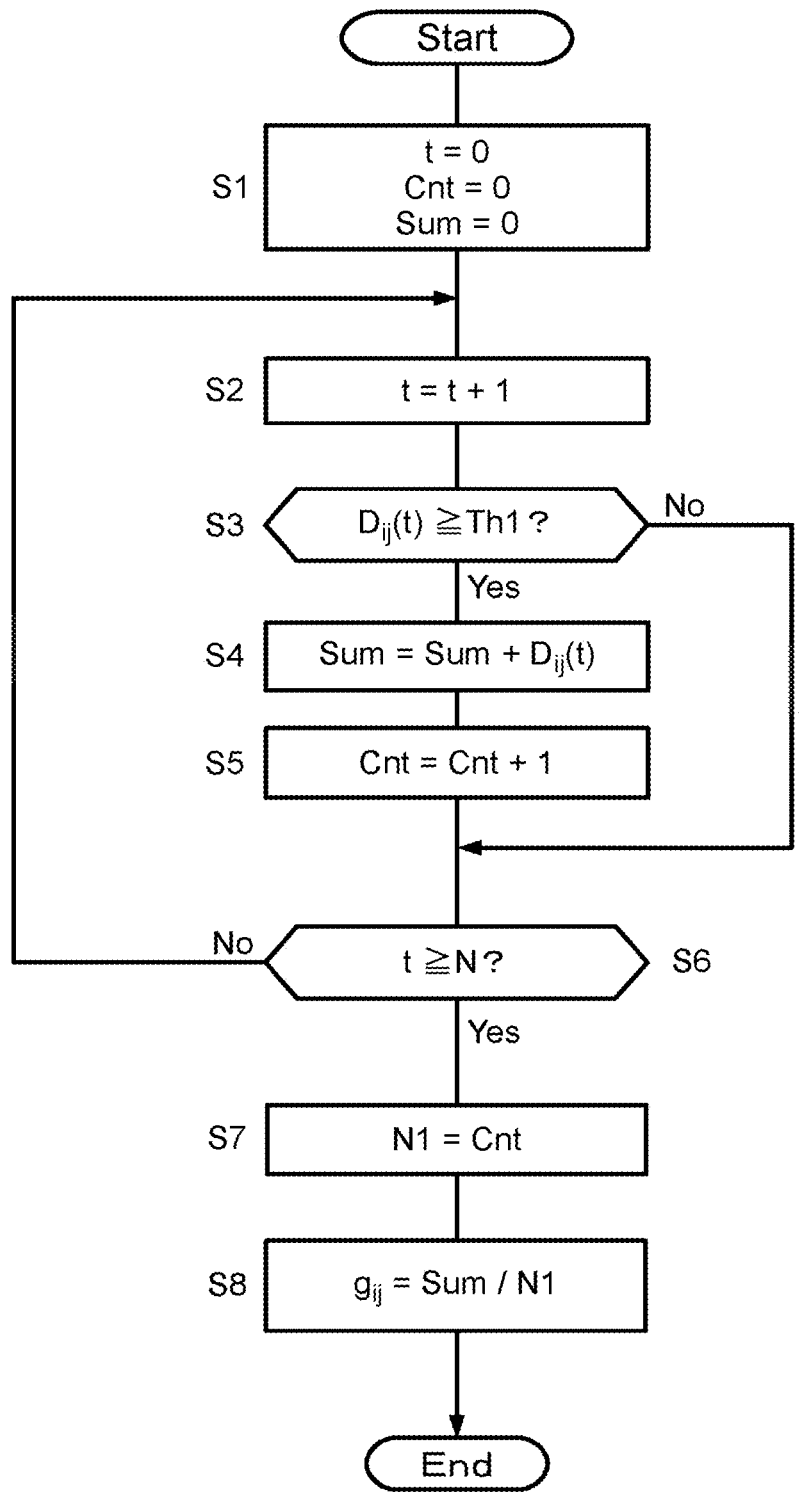
FIG. 7 is a flowchart showing Processing 1 (a threshold process for an output value).

This processing will be described with the flowchart shown in FIG. 7.

In step S1, the template data generation unit 5 sets a variable t representing timing (time), a counter value Cnt, and a sum value Sum to zeros individually.

In step S2, the template data generation unit 5 increments the variable represent timing by one.

The template data generation unit 5 compares the output value $D_{ij}(t)$ at the same coordinate position on the second-dimensional SOM (an average of values output from the same output node) with a predetermined threshold value Th1. If $D_{ij}(t) \geq Th\mathbf{1}$ is satisfied ("Yes" at step S3), then the output value $D_{ij}(t)$ is added to the sum value Sum (step S4), and furthermore the counter value Cnt is incremented by one (step S5).

In contrast, if $D_{ij}(t) \geq Th\mathbf{1}$ is not satisfied ("No" at step S3), then the template data generation unit 5 advances the processing to step S6.

In step S6, if t≥N is not satisfied, then the template data generation unit 5 returns the processing to step S2. If t≥N is satisfied, then the template data generation unit 5 substitutes the counter value Cnt into a final counter value N1 (Step S7). Furthermore, the template data generation unit 5 obtains the template value $g_{ij}$ at the coordinate (i, j) through processing that corresponds to $g_{ij}$=Sum/N1 (Step S8).

The above-described processing allows an average value obtained by excluding output values of SOM which are smaller than the predetermined threshold value to be set as the template data value $g_{ij}$, thereby creating more appropriate template data.

(2) Processing 2 (Threshold Processing for Variance of Output Values)

Using the SOM output data D_som(1) to D_som(N), the template data generation unit 5 calculates variance of the output values $D_{ij}(t)$ at the same coordinate position on the second-dimensional SOM (the values output from the same output node) through processing which corresponds to the following formulae:

Formula 3

$$AveD_{ij} = \frac{1}{N}\sum_{t=1}^{N} D_{ij}(t) \tag{3}$$

Formula 4

$$v_{ij} = \frac{1}{N}\sum_{t=1}^{N} (D_{ij}(t) - AveD_{ij})^2 \tag{4}$$

The template data generation unit 5 then compares the variance $v_{ij}$ with a predetermined threshold value Th2. Subsequently, the template data generation unit 5 calculates an average value of the SOM output values $D_{ij}(t)$ at the coordinate (i, j) which satisfy $v_{ij} \leq Th\mathbf{2}$, and then sets the calculated average value as a template data value $g_{ij}$ at the coordinate (i, j).

Note that if $v_{ij} \leq Th\mathbf{2}$ is not satisfied, the template data generation unit 5 sets template data values $g_{ij}$ at the coordinate (i, j) to zeros.

Such processing allows an average values obtained using only SOM output values $D_{ij}(t)$ whose variance in a temporal direction is small to be set as a template data value $g_{ij}$ at the coordinate (i, j), thereby creating more appropriate template data. In other words, the above-described processing allows an average value obtained using only SOM output values $D_{ij}(t)$ less variable in the temporal direction to be set as a template data value $g_{ij}$ at the coordinate (i, j), thereby creating more appropriate template data.

(3) Processing 3 (Processing Combining Processing 1 and Processing 2)

The template data generation unit 5 may obtain the template data values $g_{ij}$ at the coordinate (i, j) through processing achieved by combining the above-described Processing 1 and Processing 2.

The template generation unit 5 compares the variance $v_{ij}$ with the predetermined threshold Th2, calculates an average value using only SOM output values $D_{ij}(t)$ which satisfy $v_{ij} \leq Th\mathbf{2}$ and are larger than the threshold value Th1, and then sets the calculated average value as a template data value $g_{ij}$ at the coordinate (i, j).

Note that if $v_{ij} \leq Th\mathbf{2}$ is not satisfied, the template data generation unit 5 sets a template data value $g_{ij}$ at the coordinate (i, j) to zero.

As described above, processing achieved by combining Processing 1 and Processing 2 allows for creating more appropriate template data.

(4) Processing 4 (Processing Using Data within a Range Defined by n1×σ)

The template data generation unit 5 performs, using the variance $v_{ij}$, processing which corresponds to the formula below to obtain a standard deviation $\sigma_{ij}$ of the SOM output values $D_{ij}(t)$ at the coordinate (i, j).

$$\sigma_{ij} = sqrt(v_{ij})$$

where sqrt(x) is a function that returns the square root of x.

If $abs(D_{ij}(t)-AveD_{ij}) \leq n1 \times \sigma_{ij}$ (n1 is a positive natural number. abs(x) is a function that returns an absolute value of "x".) is satisfied, the template data generation unit 5 calculates an average value of the SOM output values $D_{ij}(t)$ at the coordinate (i, j) and then sets the calculated average values at the coordinate (i, j) to a template data value $g_{ij}$.

If $abs(D_{ij}(t)-AveD_{ij}) \leq n1 \times \sigma_{ij}$ (n1 is a positive natural number. abs(x) is a function that returns an absolute value of "x".) is not satisfied, the template data generation unit 5 sets a template data value $g_{ij}$ to zero.

Such processing allows for creating template data using data within a range from the average value minus n1×σ to the average value plus n1×σ inclusive.

For example, when n1=3, performing processing as described above allows for creating template data using data within a range from the average value minus 3σ to the average value plus 3σ inclusive. In the state determination apparatus 1000, assuming that SOM output values $D_{ij}(t)$ follows the normal distribution, setting n1 to three (i.e., n1=3) allows for creating template data using data within a range occupying 99.7 percent of the entire range. As described above, adjusting the value of n1 in the state determination apparatus 1000 allows the range of the SOM output value $D_{ij}(t)$ used for creating template data to be adjusted.

Through the above-described processing, the state determination apparatus 1000 creates template data.

Note that normalization may be performed such that the sum of all the template data values $g_{ij}$ becomes "1". Such normalization allows possible range of values indicating correlation degree (e.g., inner product values or Euclidean distances) to be constant (common) regardless of templates to be used in the determination processing for determining the correlation degree between template data and SOM output data. This allows classification determination processing to be easily achieved.

1.2.3 Operation of State Determination Processing Phase

Next, the operation of the state determination processing phase in the state determination apparatus 1000 will be described.

Figure 8:
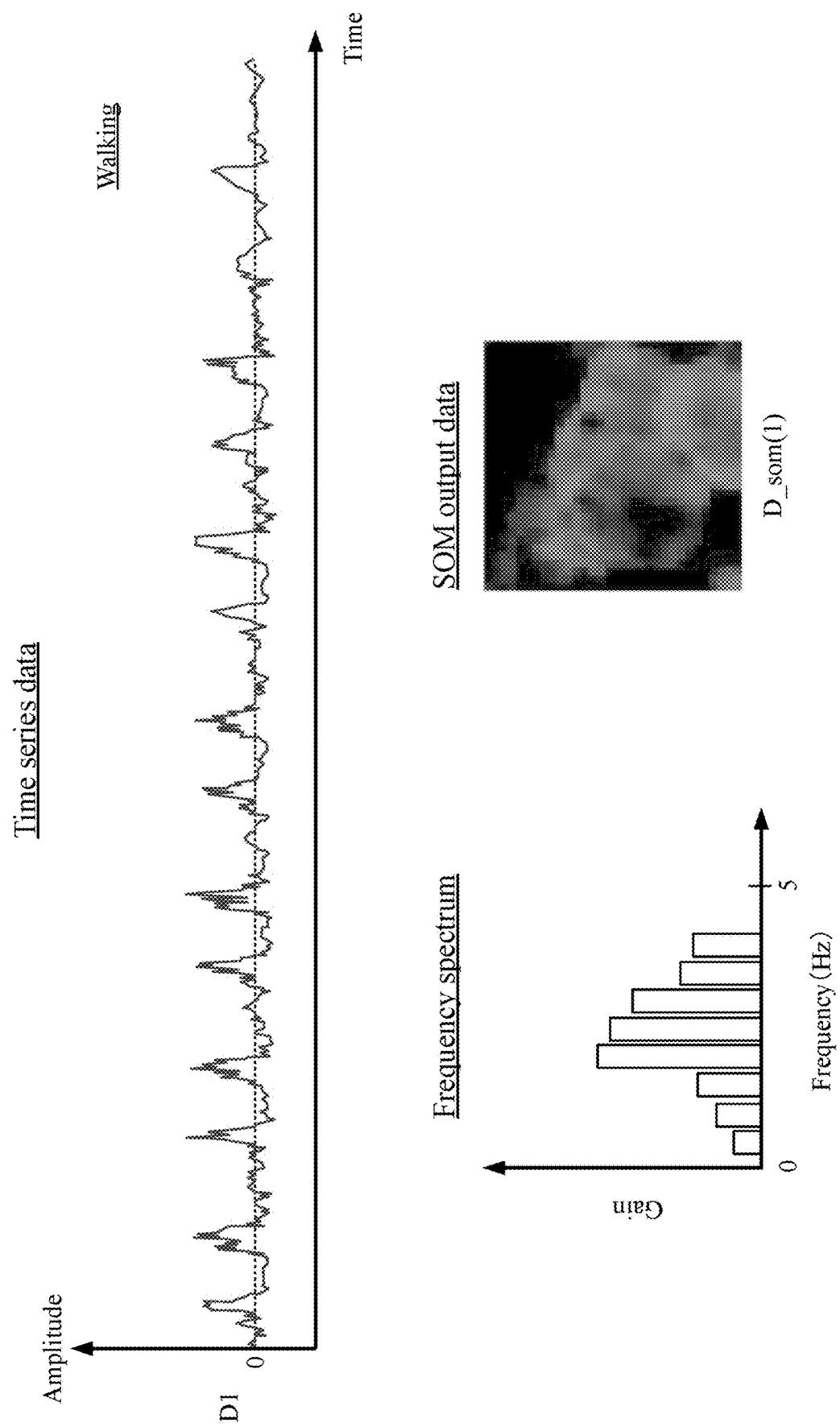
FIG. 8 is a diagram showing a waveform of a signal D1 (waveform in a state of Walking) obtained by the data input unit 1, feature vector data D2 that a feature vector obtaining unit 2 obtains from the signal D1, and SOM output data D_som(1) that a mapping conversion unit 7 obtains from the feature vector data D2.

FIG. 8 is a diagram showing a waveform of the signal D1 (waveform in a state of Walking) obtained by the data input unit 1 (the upper portion of FIG. 8), feature vector data D2 that the feature vector obtaining unit 2 obtains from the signal D1 (the left lower portion of FIG. 8), and SOM output data D_som(1) that the mapping conversion unit 7 obtains from the feature vector data D2 (the right lower portion of FIG. 8).

Figure 9:
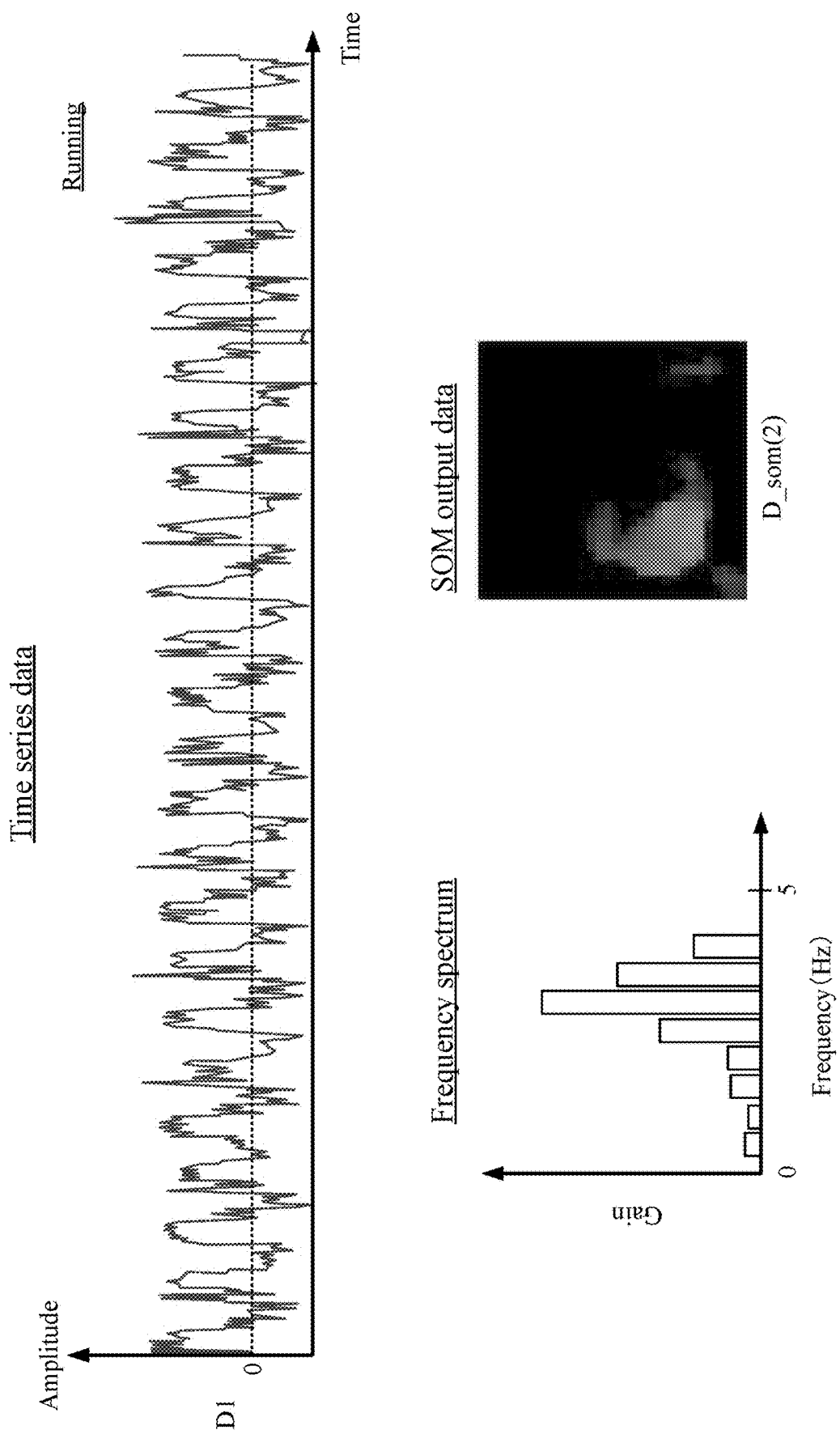
FIG. 9 is a diagram showing a waveform of the signal D1 (waveform in a state of Running) obtained by the data input unit 1, feature vector data D2 that the feature vector obtaining unit 2 obtains from the signal D1, and SOM output data D_som(2) that the mapping conversion unit 7 obtains from the feature vector data D2.

FIG. 9 is a diagram showing a waveform of the signal D1 (waveform in a state of Running) obtained by the data input unit 1 (the upper portion of FIG. 9), feature vector data D2 that the feature vector obtaining unit 2 obtains from the signal D1 (the left lower portion of FIG. 9), and SOM output data D_som(2) that the mapping conversion unit 7 obtains from the feature vector data D2 (the right lower portion of FIG. 9).

The output from the acceleration sensor (not shown) for detecting a state of a person is inputted, as a signal Din, to the data input unit 1. Note that the acceleration sensor may be attached to a human body, for example.

The data input unit 1 samples (digitizes) the signal Din to obtain discrete data (digital data) thereof. The data input unit 1 then transmits the obtained discrete data (digital data) to the feature vector obtaining unit 2 as the signal D1.

In Walking state, the signal D1 shown in the upper portion of FIG. 8 is obtained, for example. In Running state, the signal D1 shown in the upper portion of FIG. 9 is obtained.

The feature vector obtaining unit 2 obtains feature vector data D2 from the discrete data D1 (digital data D1) obtained by the data input unit 1 in the same manner as processing in the learning phase.

In Walking state, the feature vector data D2 shown in the lower portion of FIG. 8 is obtained, for example. In Running state, the feature vector data D2 shown in the lower portion of FIG. 9 is obtained.

The feature vector data D2 obtained by the feature vector obtaining unit 2 is transmitted from the feature vector obtaining unit 2 to the selector SEL1.

The controller (not shown) that controls the various functional units of the state determination apparatus 1000 generates a selecting signal sel 1 for selecting the terminal 1 of the selector SEL1, and then transmits the generated selecting signal sel1 to the selector SEL1.

The selector SEL1 transmits the signal D2 to the mapping conversion unit 7 in accordance with the selecting signal sel1.

The mapping conversion unit 7 performs SOM processing on the feature vector data D2 (signal D2) using the combining weights data $w_{ij\_}$ fixed between nodes in the input layer and nodes in the output layer, which is determined by the SOM processing unit 3. The mapping conversion unit 7 then transmits the SOM output data D_som obtained through the SOM processing to the matching processing unit 8.

In Walking state, the SOM output data shown in the right lower portion of FIG. 8 is obtained, for example. In Running state, the SOM output data shown in the right lower portion of FIG. 9 is obtained.

The matching processing unit 8 of the template data obtaining unit 81 reads, from the template storage unit 6, template data Tmpl(1) for Walking state, template data Tmpl(2) for Running state, and template data Tmpl(3) for Standing state.

The template data obtaining unit 81 then transmits the three read pieces of template data Tmpl(1) to Tmpl(3) to the first inner product calculation unit 821 to the third inner product calculation unit 823, respectively.

The first inner product calculation unit 821 performs processing for calculating an inner product using the SOM output data D_som and the template data Tmpl(1).

More specifically, the first inner product calculation unit 821 performs processing corresponding to the formula below to calculate an inner product.

Formula 5

$$D\_f(1) = \sum_{j=1}^{m2} \sum_{i=1}^{m1} (D_{ij} \times g_{ij}) \qquad (5)$$

Note that $D_{ij}$ is an SOM output value at the coordinate (i, j) on the second-dimensional SOM, and $g_{ij}$ is a value at the coordinate (i, j) of the template data Tmpl(1).

The first inner product calculation unit 821 transmits the signal indicating the calculated inner product value through the above-described processing to the state determination unit 9 as the signal D_f(1).

The second inner product calculation unit 822 performs processing for calculating an inner product using the SOM output data D_som and the template data Tmpl(2).

More specifically, the second inner product calculation unit 822 performs processing corresponding to the formula below to calculate an inner product.

Formula 6

$$D\_f(2) = \sum_{j=1}^{m2} \sum_{i=1}^{m1} (D_{ij} \times g_{ij}) \quad (6)$$

Note that $D_{ij}$ is an SOM output value at the coordinate (i, j) on the second-dimensional SOM, and $g_{ij}$ is a value at the coordinate (i, j) of the template data Tmpl(2).

The second inner product calculation unit 822 transmits the signal indicating the calculated inner product value through the above-described processing to the state determination unit 9 as the signal D_f(2).

The third inner product calculation unit 823 performs processing for calculating an inner product using the SOM output data D_som and the template data Tmpl(3).

More specifically, the third inner product calculation unit 823 performs processing corresponding to the formula below to calculate an inner product.

Formula 7

$$D\_f(3) = \sum_{j=1}^{m2} \sum_{i=1}^{m1} (D_{ij} \times g_{ij}) \quad (7)$$

Note that $D_{ij}$ is an SOM output value at the coordinate (i, j) on the second-dimensional SOM, and $g_{ij}$ is a value at the coordinate (i, j) of the template data Tmpl(3).

The third inner product calculation unit 823 transmits the signal indicating the calculated inner product value through the above-described processing to the state determination unit 9 as the signal D_f(3).

The matching processing unit 8 transmits the data obtained through the above-described processing to the state determination unit 9 as vector data vec_D_f(=(D_f(1), D_f(2), D_f(3))) for adaptability data.

The state determination unit 9 receives the vector data vec_D_f for adaptability data transmitted from the matching processing unit 8. The state determination unit 9 determines a state at current timing t based on the received vector data vec_D_f.

When the adaptability data is obtained by calculation of the inner product as described above, the larger the adaptability data (the inner product value) is, the higher the probability that the current state is the state corresponding to the template used in the processing for calculating the inner product is.

When the value of D_f(1) is the largest of the three pieces of adaptability data (the inner product values), which are obtained by the matching processing unit 8, the data inputted into the state determination apparatus 1000 is determined to be close to template data Tmpl(1) for Walking state; thus, the data inputted into the state determination apparatus 1000 is determined to be data obtained while a person is walking (continues to be in Walking state).

More specifically, (1) when the value of D_f(1) is the largest of the three pieces of adaptability data (inner product values) D_f(1), D_f(2), and D_f(3), the state determination unit 9 transmits a signal indicating that the data inputted into the state determination apparatus 1000 is data obtained in "Walking state" transmits out of the state determination apparatus 1000.

(2) When the value of D_f(2) is the largest of the three pieces of adaptability data (inner product values) D_f(1), D_f(2), and D_f(3), the state determination unit 9 transmits a signal indicating that the data inputted into the state determination apparatus 1000 is data obtained in "Running state" transmits out of the state determination apparatus 1000.

(3) When the value of D_f(3) is the largest of the three pieces of adaptability data (inner product values) D_f(1), D_f(2), and D_f(3), the state determination unit 9 transmits a signal indicating that the data inputted into the state determination apparatus 1000 is data obtained in "Standing state" transmits out of the state determination apparatus 1000.

For example, when the SOM data D_som(1) shown in FIG. 3 is inputted into the matching processing unit 8, the value of D_f(1) is the largest. The state determination unit 9 then transmits the signal Dout indicating that the input data is data obtained in "Walking state" out of the state determination apparatus 1000.

When the SOM data D_som(2) shown in FIG. 3 is inputted into the matching processing unit 8, the value of D_f(2) is the largest. The state determination unit 9 then transmits the signal Dout indicating that the input data is data obtained in "Running state" out of the state determination apparatus 1000.

As described above, the state determination apparatus 1000 creates template data indicating a predetermined state, calculates a value (e.g., inner product value) indicating the correlation degree between template data and SOM output data, and then determines a state for the input data based on the value indicating the correlation degree.

In other words, the state determination apparatus 1000 appropriately detects the correlation degree (the degree of similarity) between the template indicating a predetermined state and the SOM output data even when a map generated by the SOM technique includes discontinuous image regions (e.g., split image regions). Thus, the state determination apparatus 1000 appropriately performs pattern classification processing and/or pattern determination processing even when a map generated by the SOM technique includes discontinuous image regions (e.g., split image regions).

First Modification

A first Modification of the first embodiment will now be described.

The components in this modification that are the same as the components described in the above embodiment will be given the same reference numerals as those components and will not be described in detail.

Figure 10:
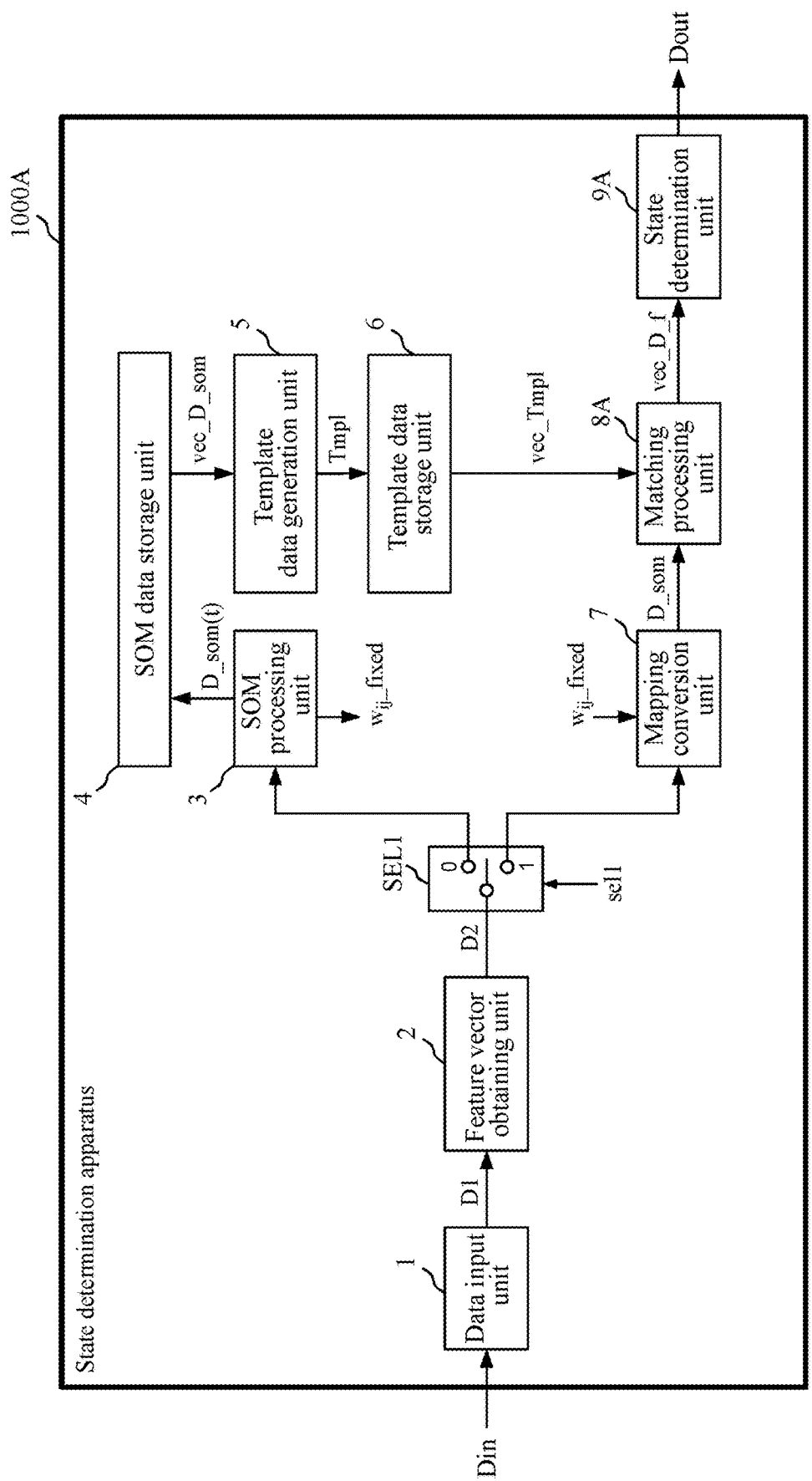
FIG. 10 is a schematic diagram of a state determination apparatus 1000A according to a first modification of the first embodiment.

FIG. 10 is a schematic diagram of a state determination apparatus 1000A according to the first modification of the first embodiment.

Figure 11:
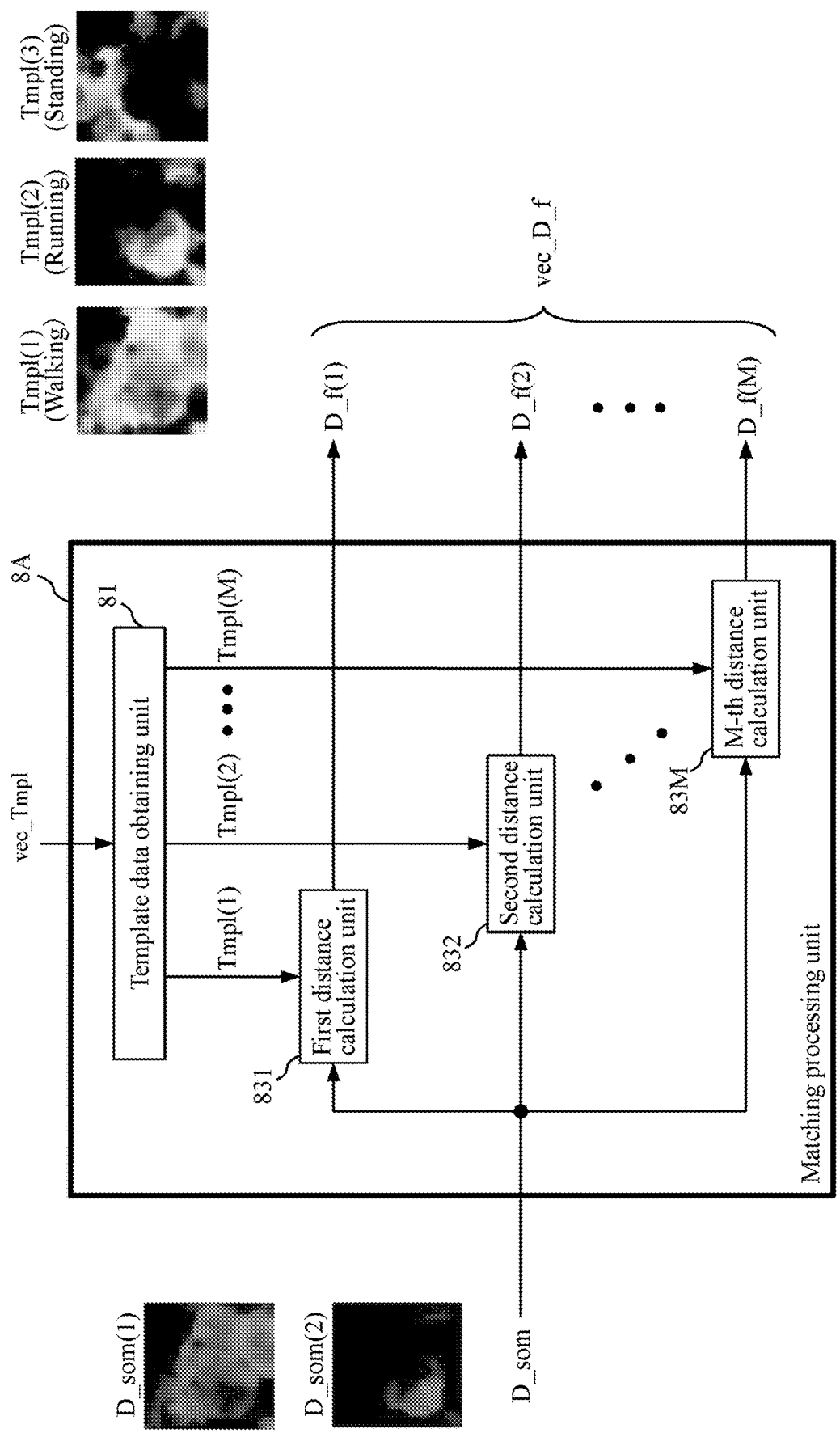
FIG. 11 is a schematic diagram of a matching processing unit 8A according to the first modification of the first embodiment.

FIG. 11 is a schematic diagram of a matching processing unit 8A according to the first modification of the first embodiment.

As shown in FIG. 10, the state determination apparatus 1000A of the present modification includes a matching processing unit 8A, which replaces the matching processing unit 8 of the state determination apparatus 1000 according to the first embodiment, and a state determination unit 9A, which replaces the state determination unit 9 of the state determination apparatus 1000 according to the first embodiment.

The matching processing unit 8A of the present modification includes a first distance calculation unit 831 to an M-th distance calculation unit 83M, which replaces the first inner product calculation unit 821 to the M-th inner product calculation unit 82M, respectively.

The matching processing unit 8 obtains the adaptability data D_f by calculating an inner product, whereas the matching processing unit 8A of the present modification obtains the adaptability data D_f by calculating a Euclidean distance.

More specifically, the first distance calculation unit 831 performs processing corresponding to the formula below to calculate a Euclidean distance between the SOM output data D_som and the template data Tmpl(1).

Formula 8

$$D\_f(1) = \sum_{j=1}^{m2} \sum_{i=1}^{m1} |D_{ij} - g_{ij}|^2 \quad (8)$$

Note that $D_{ij}$ is an SOM output value at the coordinate (i, j) on the second-dimensional SOM, and $g_{ij}$ is a value at the coordinate (i, j) of the template data Tmpl(1).

The second distance calculation unit 832 performs processing corresponding to the formula below to calculate a Euclidean distance between the SOM output data D_som and the template data Tmpl(2).

Formula 9

$$D\_f(2) = \sum_{j=1}^{m2} \sum_{i=1}^{m1} |D_{ij} - g_{ij}|^2 \quad (9)$$

Note that $D_{ij}$ is an SOM output value at the coordinate (i, j) on the second-dimensional SOM, and $g_{ij}$ is a value at the coordinate (i, j) of the template data Tmpl(2).

The third distance calculation unit 833 performs processing corresponding to the formula below to calculate a Euclidean distance between the SOM output data D_som and the template data Tmpl(3).

Formula 10

$$D\_f(3) = \sum_{j=1}^{m2} \sum_{i=1}^{m1} |D_{ij} - g_{ij}|^2 \quad (10)$$

Note that $D_{ij}$ is an SOM output value at the coordinate (i, j) on the second-dimensional SOM, and $g_{ij}$ is a value at the coordinate (i, j) of the template data Tmpl(3).

The matching processing unit 8A transmits the data obtained through the above-described processing to the state determination unit 9A as vector data vec_D_f(=(D_f(1), D_f(2), D_f(3))) for adaptability data.

The state determination unit 9A receives the vector data vec_D_f for adaptability data transmitted from the matching processing unit 8A. The state determination unit 9 determines a state at current timing t based on the received vector data vec_D_f.

When the adaptability data is obtained by calculation of the Euclidean distance as described above, the smaller the adaptability data (the Euclidean distance) is, the higher the probability that the current state is the state corresponding to the template used in the processing for calculating the Euclidean distance is.

When the value of D_f(1) is the smallest of the three pieces of adaptability data (the Euclidean distances), which are obtained by the matching processing unit 8A, the data inputted into the state determination apparatus 1000A is determined to be close to template data Tmpl(1) for Walking state; thus, the data inputted into the state determination apparatus 1000A is determined to be data obtained while a person is walking (continues to be in Walking state).

More specifically, (1) when the value of D_f(1) is the smallest of the three pieces of adaptability data (Euclidean distances) D_f(1), D_f(2), and D_f(3), the state determination unit 9A transmits a signal indicating that the data inputted into the state determination apparatus 1000A is data obtained in "Walking state" transmits out of the state determination apparatus 1000A.

(2) When the value of D_f(2) is the smallest of the three pieces of adaptability data (Euclidean distances) D_f(1), D_f(2), and D_f(3), the state determination unit 9A transmits a signal indicating that the data inputted into the state determination apparatus 1000A is data obtained in "Running state" transmits out of the state determination apparatus 1000A.

(3) When the value of D_f(3) is the smallest of the three pieces of adaptability data (Euclidean distances) D_f(1), D_f(2), and D_f(3), the state determination unit 9A transmits a signal indicating that the data inputted into the state determination apparatus 1000A is data obtained in "Standing state" transmits out of the state determination apparatus 1000A.

For example, when the SOM data D_som(1) shown in FIG. 11 is inputted into the matching processing unit 8A, the value of D_f(1) is the smallest. The state determination unit 9A then transmits the signal Dout indicating that the input data is data obtained in "Walking state" out of the state determination apparatus 1000A.

When the SOM data D_som(2) shown in FIG. 11 is inputted into the matching processing unit 8A, the value of D_f(2) is the smallest. The state determination unit 9A then transmits the signal Dout indicating that the input data is data obtained in "Running state" out of the state determination apparatus 1000A.

As described above, the state determination apparatus 1000A creates template data indicating a predetermined state, calculates a value (Euclidean distance) indicating the correlation degree between template data and SOM output data, and then determines a state for the input data based on the value indicating the correlation degree.

In other words, the state determination apparatus 1000A appropriately detects the correlation degree (the degree of similarity) between the template indicating a predetermined state and the SOM output data even when a map generated by the SOM technique includes discontinuous image regions (e.g., split image regions). Thus, the state determination apparatus 1000A appropriately performs pattern classification processing and/or pattern determination processing even when a map generated by the SOM technique includes discontinuous image regions (e.g., split image regions).

Second Embodiment

A second embodiment will now be described with reference to the drawings.

2.1 Structure of State Determination Apparatus

Figure 12:
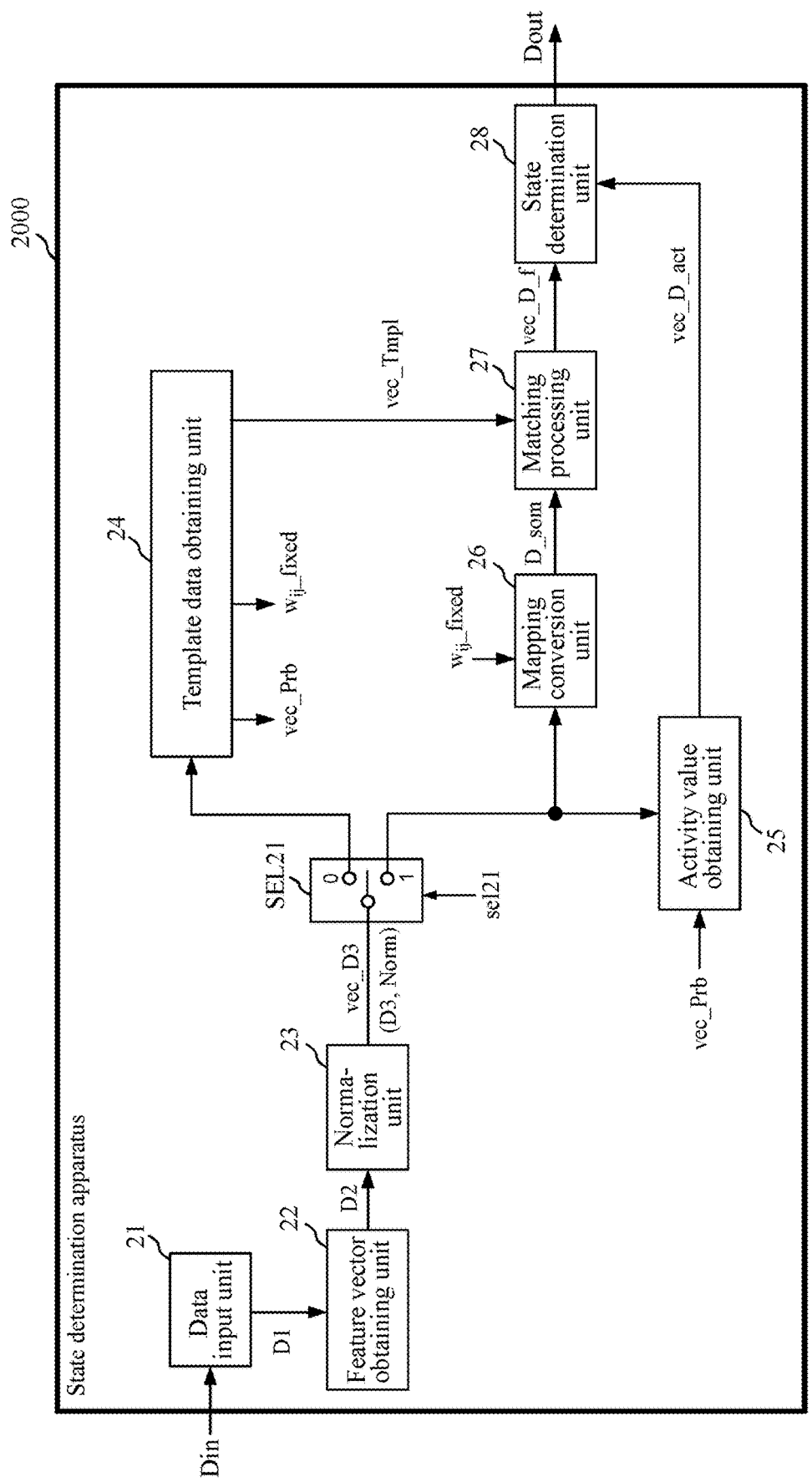
FIG. 12 is a schematic diagram of a state determination apparatus 2000 according to a second embodiment.

FIG. 12 is a schematic diagram of a state determination apparatus 2000 according to the second embodiment.

Figure 13:
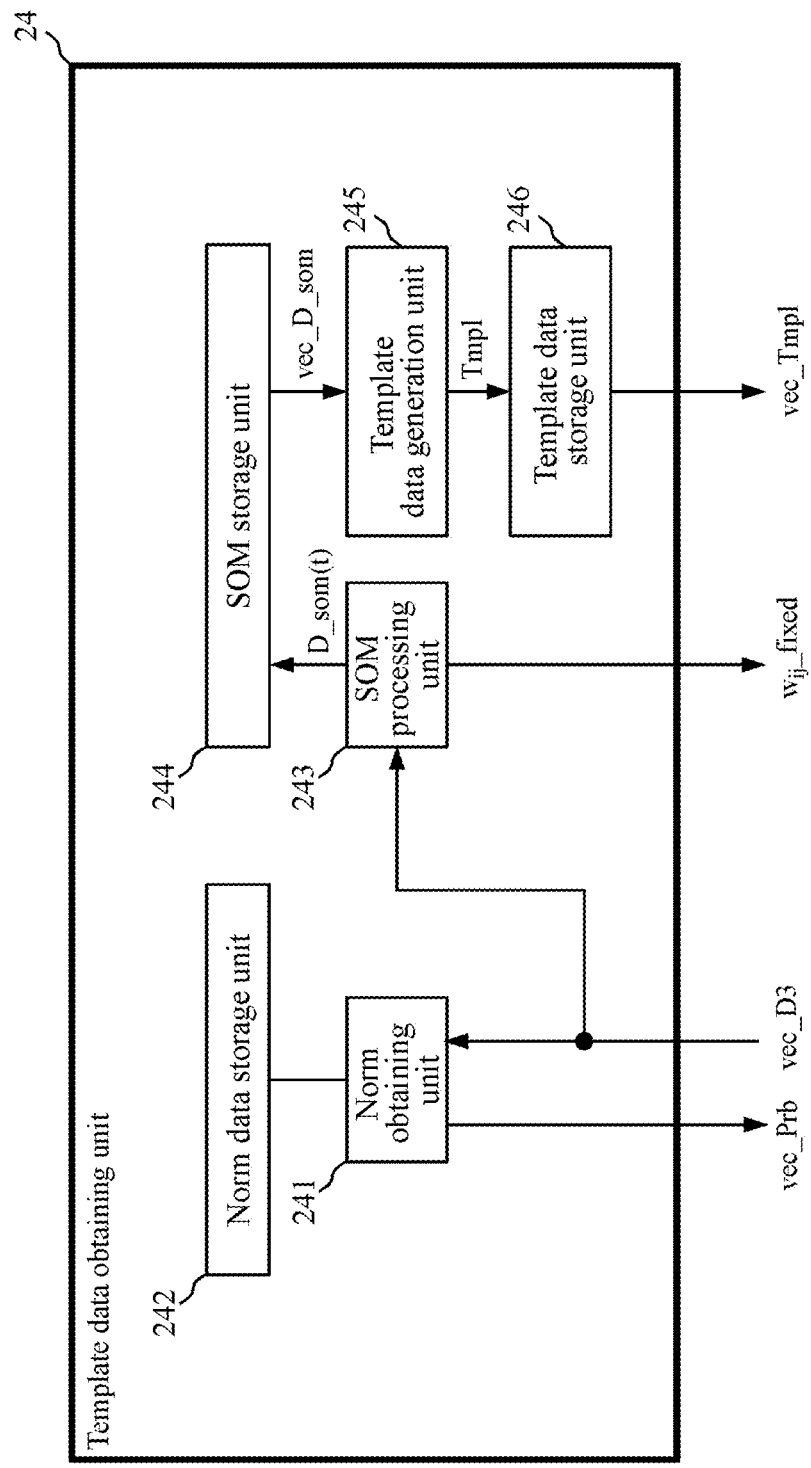
FIG. 13 is a schematic diagram of a template data obtaining unit 24 according to the second embodiment.

FIG. 13 is a schematic diagram of a template data obtaining unit 24 according to the second embodiment.

Figure 14:
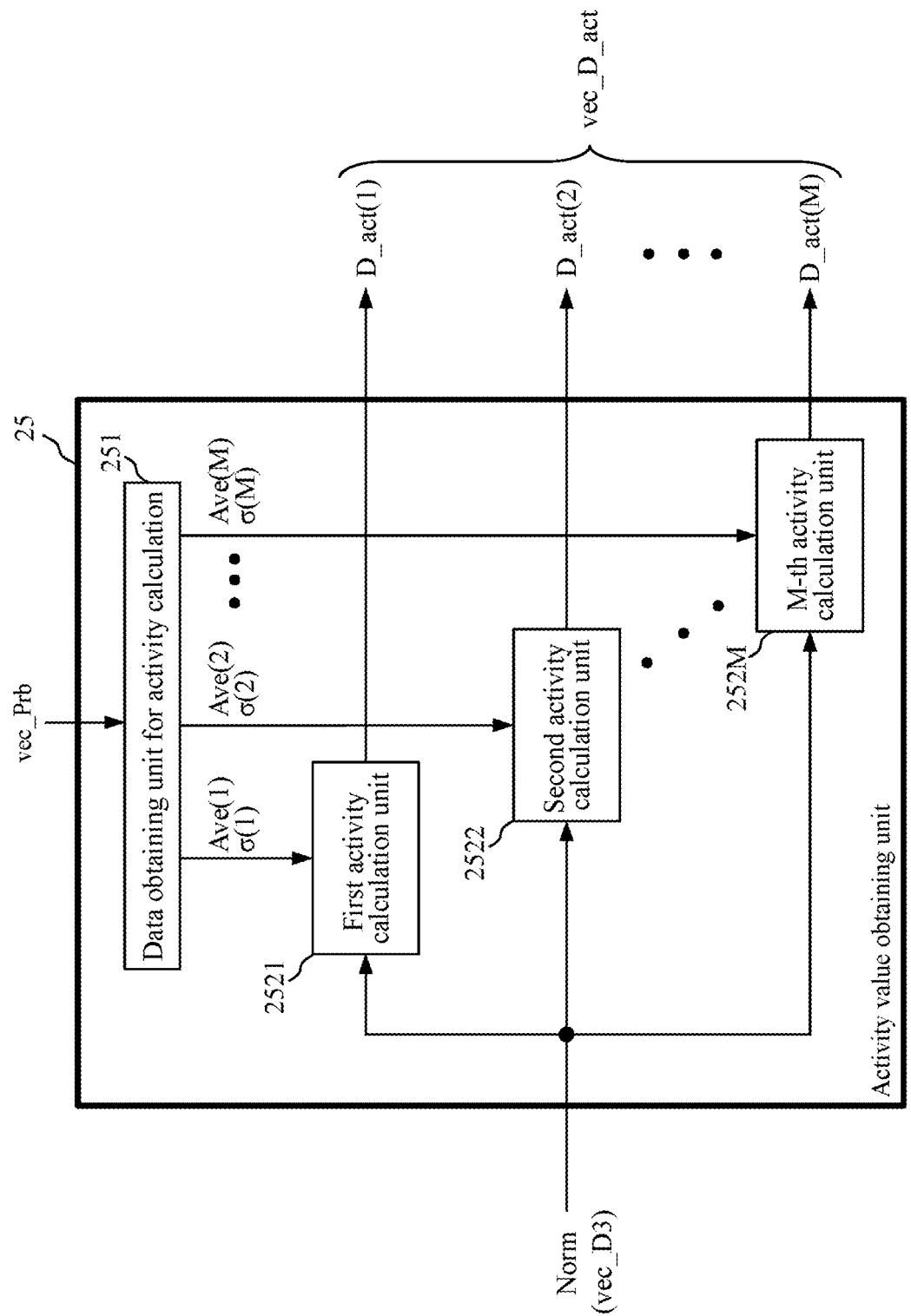
FIG. 14 is a schematic diagram of an activity value obtaining unit 25 according to the second embodiment.

FIG. 14 is a schematic diagram of an activity value obtaining unit 25 according to the second embodiment.

Figure 15:
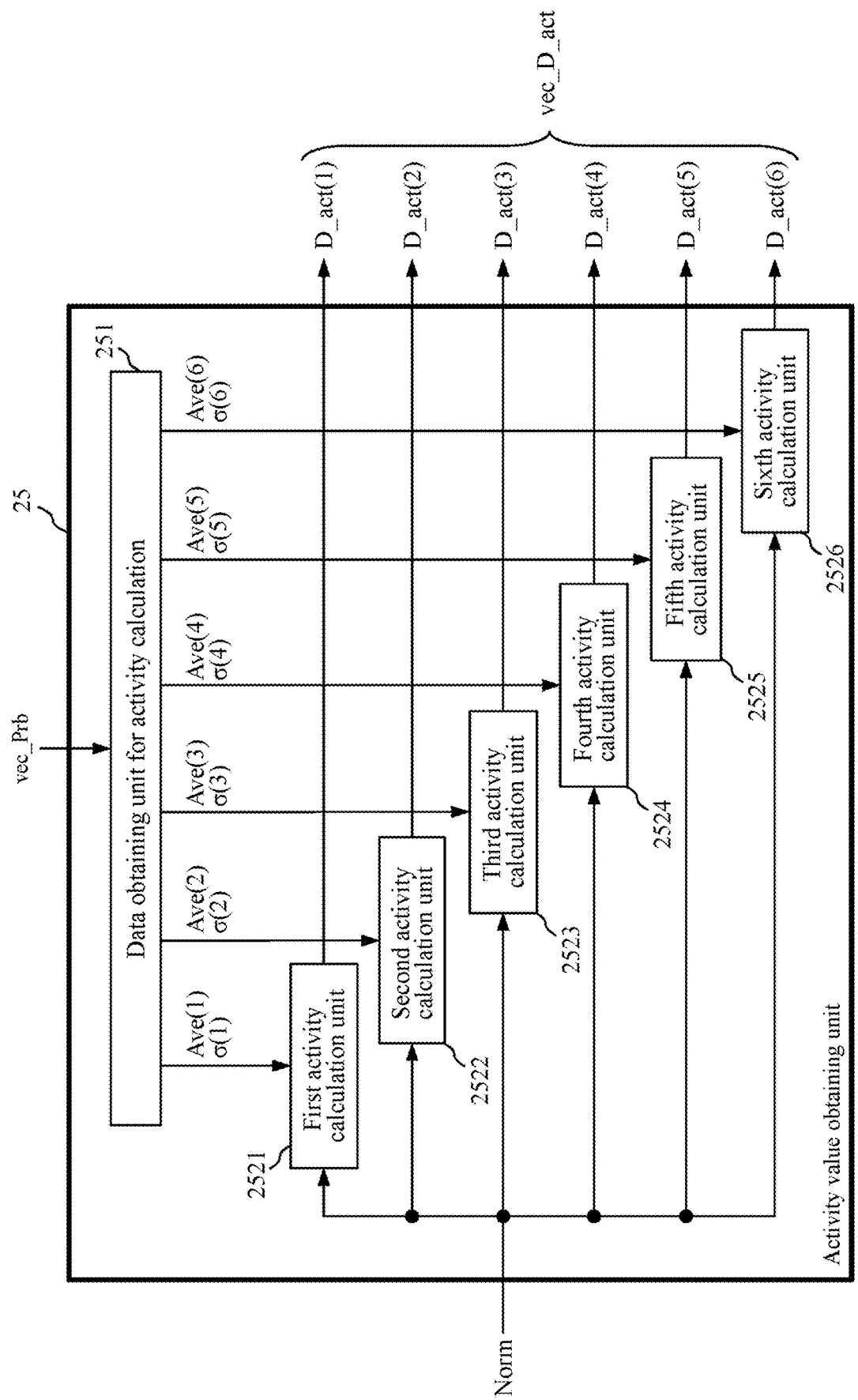
FIG. 15 is a schematic diagram of the activity value obtaining unit 25 in the case of M=6.

FIG. 15 is a schematic diagram of the activity value obtaining unit 25 in the case of M=6.

Figure 16:
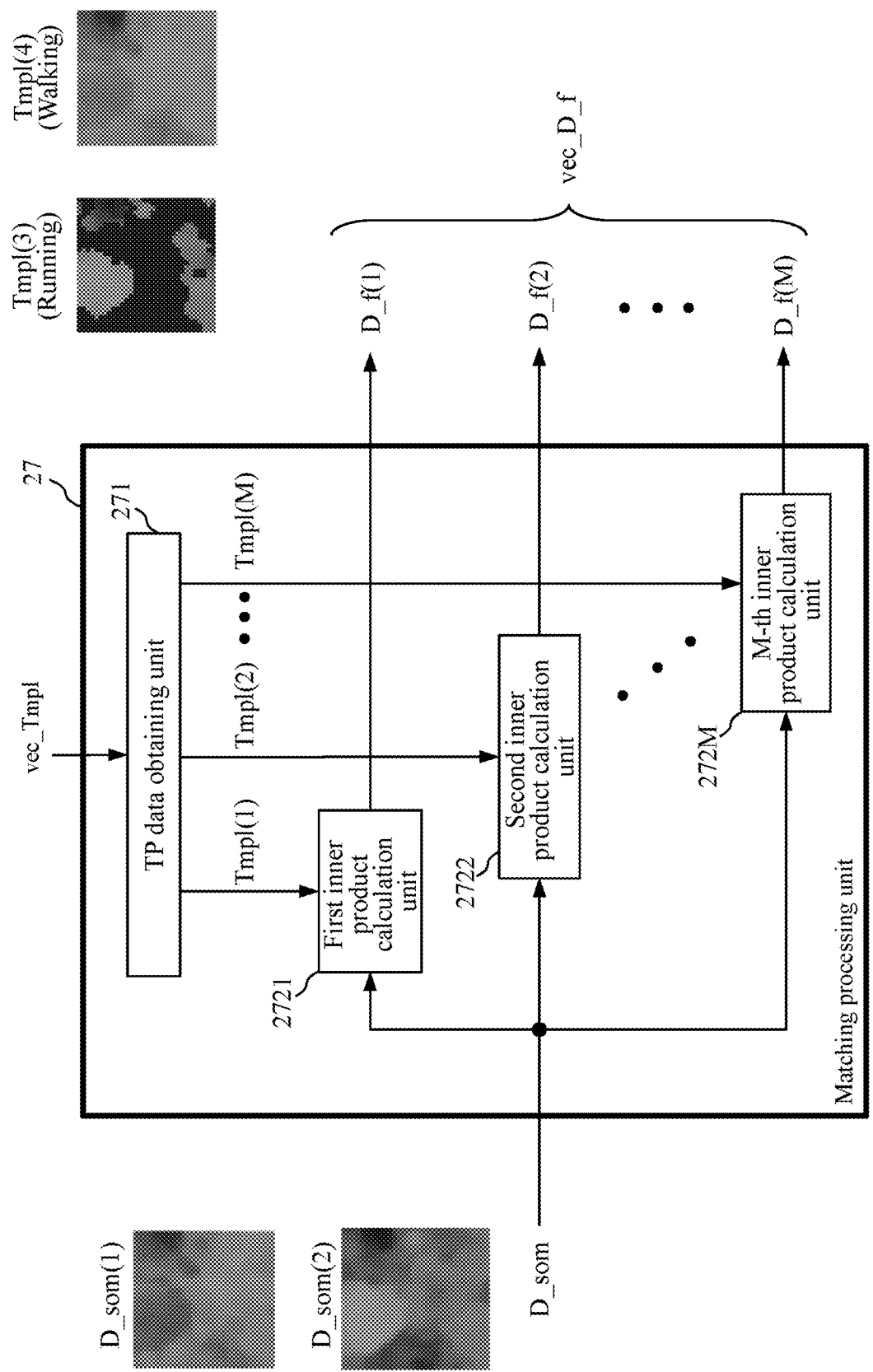
FIG. 16 is a schematic diagram of a matching processing unit 27 according to the second embodiment.

FIG. 16 is a schematic diagram of a matching processing unit 27 according to the second embodiment.

As shown in FIG. 12, the state determination apparatus 2000 includes a data input unit 21, a feature vector obtaining unit 22, selector SEL21, a normalization unit 23, a template data obtaining unit 24, an activity value obtaining unit 25, a mapping conversion unit 26, a matching processing unit 27, and a state determination unit 28.

The data input unit 21 receives an electric signal (sensor output signal) outputted from a sensor (e.g., an acceleration sensor) for example. The data input unit 21 converts the received electric signal into a digital signal, and then transmits the converted signal, as a signal D1, to the feature vector obtaining unit 22.

The feature vector obtaining unit 22 receives the signal D1 transmitted from the data input unit 21. The feature vector obtaining unit 22, for example, performs frequency transform on the received signal D1 to obtain a feature vector. The feature vector obtaining unit 22 then transmits the obtained feature vector data to the normalization unit 23 as a signal D2 (feature vector data D2).

The normalization unit 23 receives the signal D2 (feature vector data D2) transmitted from the feature vector obtaining unit 22. The normalization unit 23 obtains a norm (norm data) Norm from the feature vector data D2 and performs normalization processing on the feature vector data D2 to obtain normalized feature vector data D3. The normalization unit 23 transmits the obtained norm data Norm and the normalized feature vector data D3 to the selector SEL21 as vector data vec_D3.

The selector SEL21 receives the vector data vec_D3 transmitted from the normalization unit 23. The selector SEL21 transmits the vector data vec_D3, in accordance with a selecting signal sel21, to (1) template data obtaining unit 24 or (2) the activity value obtaining unit 25 and the mapping convention unit 26. Note that the selecting signal sel21 is generated by a controller (not shown) that controls the various functional units of the state determination apparatus 2000.

As shown in FIG. 13, the template data obtaining unit 24 includes a norm obtaining unit 241, a norm data storage unit 242, an SOM processing unit 243, an SOM data storage unit 244, a template data generation unit 245, and a template data storage unit 246.

The norm obtaining unit 241 receives the vector data vec_D3 transmitted from the selector SEL21. The norm obtaining unit 241 extracts the norm data Norm from the vector data vec_D3 and then stores the extracted norm data Norm in the norm data storage unit 242. The norm obtaining unit 241 reads norm data stored in the norm data storage unit 242 and obtains, from the read norm data, an average value Ave(StateK) of the norm data and a standard deviation σ(StateK) of the norm data for each state StateK, which is a state in which the read norm data was obtained. The norm obtaining unit 241 transmits the obtained data to the activity value obtaining unit 25 as vector data vec_Prb.

The norm storage unit 242 stores the norm data transmitted from the norm obtaining unit 241. The norm storage unit 242 is achieved using RAM (Random Access Memory), for example. The norm storage unit 242 also transmits predetermined norm data to the norm obtaining unit 241 in accordance with a data read instruction requested by the norm obtaining unit 241.

The SOM processing unit 243 receives the vector data vec_D3 transmitted from the selector SEL21. The SOM processing unit 243 extracts normalized feature vector data D3 from the vector data vec_D3 and then performs SOM processing using the extracted normalized feature vector data D3.

(1) In a learning phase, the SOM processing unit 243 performs SOM processing using the normalized feature vector data D3 to determine combining weights between nodes in the input layer and nodes in the output layer. After the completion of the above-describe processing, the SOM processing unit 243 transmits the determined combining weights data to the mapping conversion unit 26 as combining weights data $w_{ij}$_fixed.

(2) In a template creating phase, the SOM processing unit 243 performs SOM processing using the normalized feature vector data D3 and then transmits the SOM output data to the SOM data storage unit 244 as data D_som(t), which is SOM output data at current timing t).

The SOM storage unit 244 stores the SOM output data D_som(t) transmitted from the SOM processing unit 243. The SOM data storage unit 244 is achieved using RAM (Random Access Memory), for example.

The template data generation unit 245 reads a plurality of pieces of SOM output data D_som, such as N (N is a natural number) pieces of SOM output data, each of which is obtained at timings t to t+N−1, from the SOM data storage unit 244. Note that a plurality of pieces of SOM data that the template data generation unit 245 reads from the SOM data storage unit 244 are referred to as vector data vec_D_som. The template data generation unit 245 generates template data from the plurality of SOM data read from the SOM storage unit 244, and then transmits the generated template data to the template data storage unit 246 as template data Tmpl.

The template data storage unit 246 stores the template data Tmpl transmitted from the template data generation unit 245. The template data storage 246 is achieved using RAM (Random Access Memory), for example.

As shown in FIG. 14, the activity value obtaining unit 25 includes a data obtaining unit 251 for activity calculation, M (M is a natural number) activity calculation units, which are a first activity calculation unit 2521 to an M-th activity calculation unit 252M.

The data obtaining unit 251 for activity calculation receives the vector data vec_Prb transmitted from the norm obtaining unit 241 of the template data obtaining unit 24. The activity unit 251 for activity calculation obtains, from the vector data vec_Prb, an average value Ave(StateK) and a standard deviation σ(StateK) of the norm data of the feature vector data D2 for each state StateK. The activity unit 251 for activity calculation transmits the average value and standard deviation of the norm data of the feature vector data D2 for the k-th state (k is a natural number satisfying 1≤k≤M), as Ave(k) and σ(k) respectively, to the k-th activity calculation unit.

The first activity calculation unit 2521 receives the norm data Norm included in the vector data vec_D3 transmitted from the selector SEL21 and the average value Ave(1) and the standard deviation σ(1) of the norm data of the feature vector data D2 in a first state transmitted from the data obtaining unit 251 for activity calculation. The first activity calculation unit 2521 calculate an activity value D_act(1), which is an activity value in the first state, based on the average value Ave(1) and the standard deviation σ(1) of the norm data of the feature vector data D2 in the first state, and then transmits the calculated activity value D_act(1) to the state determination unit 8.

The second activity calculation unit 2522 to the M-th activity calculation unit 252M performs the same processing as described above.

The activity value obtaining unit 25 transmits the activity value D_act(1) to D_act(M), which are obtained by the first activity calculation unit 2521 to the M-th activity calculation unit 252M, to the state determination unit 28, as vector data vec_D_act.

For ease of explanation, a case of M=6 will be described below.

FIG. 15 is a schematic diagram of the activity value obtaining unit 25 in the case of M=6.

The mapping conversion unit 26 receives the normalized feature vector data D3 included in the vector data vec_D3 transmitted from the selector SEL21. The mapping conversion unit 26 also receives the combining weights data $w_{ij}$ fixed between nodes in the input layer and nodes in the output layer, which is determined by the SOM processing unit 243. The mapping conversion unit 26 performs SOM processing on the normalized feature vector data D3 using the combining weights data $w_{ij}$ fixed to obtain SOM output data D_som. The mapping conversion unit 26 transmits the obtained SOM output data D_som to the matching processing unit 27.

The matching processing unit 27 receives the SOM output data D_som transmitted from the mapping conversion unit 26. The matching processing unit 27 reads a plurality of pieces of template data Tmpl from the template data storage unit 246. Note that a plurality of pieces of SOM data that the matching processing unit 27 reads from the template data storage unit 246 are referred to as vector data vec_Tmpl.

The matching processing unit 27 performs matching processing using the SOM output data D_som and the plurality pieces of template data read from the template data storage unit 246 to obtain adaptability data D_f for each template data.
The matching processing unit 27 transmits the obtained adaptability data D_f for each template data to the state determination unit 28 as vector data vec_D_f.

As shown in FIG. 16, the matching processing unit 27 includes a TP data obtaining unit 271, and M (M is a natural number.) inner product calculation units, or a first inner product calculation unit 2721 to M-th inner product calculation unit 272M.

The TP data obtaining unit 271 reads a plurality of pieces of template data Tmpl (M pieces of template data Tmpl(1) to Tmpl(M)) from the template data storage unit 246. The TP data obtaining unit 271 transmits M pieces of template data Tmpl(1) to Tmpl(M) to the first inner product calculation unit 2721 to the M-th inner product calculation unit 272M, respectively.

The first inner product calculation unit 2721 receives the SOM output data D_som transmitted from the mapping conversion unit 26 and the template data Tmpl(1) transmitted from the TP data obtaining unit 271. The first inner product calculation unit 2721 performs processing for calculating an inner product using the SOM output data D_som and the template data Tmpl(1). The first inner product calculation unit 2721 transmits a signal representing the calculated inner product value to the state determination unit 28 as a signal D_f(1).

Note that the same processing as described above is performed in the second inner product calculation unit 2722 to M-th inner product calculation unit 272M.

In other words, a k-th (k is a natural number satisfying 1≤k≤M) inner product calculation unit 272k receives the SOM data D_som transmitted from the mapping conversion unit 26 and the template data Tmpl(k) transmitted from the TP data obtaining unit 271. The k-th inner product calculation unit 272k performs processing for calculating an inner product using the SOM output data D_som and the template data Tmpl(k). The k-th inner product calculation unit 272k transmits a signal representing the calculated inner product value to the state determination unit 28 as a signal D_f(k).

Note that the signal D_f(1) to D_f(M), each of which is transmitted from the corresponding one of the first inner product calculation unit 2721 to the M-th inner product calculation unit 272M, are collectively referred to as vector data vec_Tmpl.

For ease of explanation, a case of M=6 will be described below.

The state determination unit 28 receives the vector data vec_D_act transmitted from the activity value obtaining unit 25 and the vector data vec_D_f of the adaptability data transmitted from the matching processing unit 27. The state determination unit 28 determines the state at currency timing t based on the received vector data vec_D_act and vector data vec_D_f, and then transmits data containing the determination result as data Dout out of the state determination apparatus 2000.

2.2 Operation of State Determination Apparatus

The operation of the state determination apparatus 2000 with the above-described structure will now be described.

In one example, a case in which an output from an acceleration sensor (not shown) for detecting a state of a person is inputted into the state determination apparatus 2000 will now be described. For ease of explanation, a case in which the state determination apparatus 2000 determines one of six states of a person (states for a person's behavior) including:

(1) Sitting state (a state indicating that a person is sitting),
(2) Standing state (a state indicating that a person is standing),
(3) Running state (a state indicating that a person is running),
(4) Walking state (a state indicating that a person is walking),
(5) UpStairs state (a state indicating that a person is going up stairs), and
(6) DownStairs state (a state indicating that a person is going down stairs).

For the operation of the state determination apparatus 2000, (1) the operation in the learning phase, (2) the operation of the template creating phase, and (3) the operation of the state determination processing phase will now be described separately.

2.2.1 Operation of Learning Phase

First, the operation of the learning phase in the state determination apparatus 2000 will be described.

The output from the acceleration sensor (not shown) for detecting a state of a person is inputted, as a signal Din, to the data input unit 1. Note that the acceleration sensor may be attached to a human body, for example.

The data input unit 21 samples (digitizes) the signal Din to obtain discrete data (digital data) thereof. The data input unit 21 then transmits the obtained discrete data (digital data) to the feature vector obtaining unit 22 as the signal D1.

The feature vector obtaining unit 22 transforms the discrete data D1 (digital data D1) obtained by the data input unit 21, for example, using Gabor-wavelet transform into frequency-domain data to obtain the magnitude and phase of each frequency spectrum of the digital data D1.

The feature vector obtaining unit 22 then obtains, for example, data of the magnitude of the frequency spectrum included in a partial frequency band as the feature vector data D2.

The transform to obtain frequency-domain data from the discrete data D1 (digital data D1) should not be limited to Gabor-wavelet transform; for example, the discrete Fourier transform, the fast Fourier transform, the wavelet transform and other transforms may be used.

Figure 17:
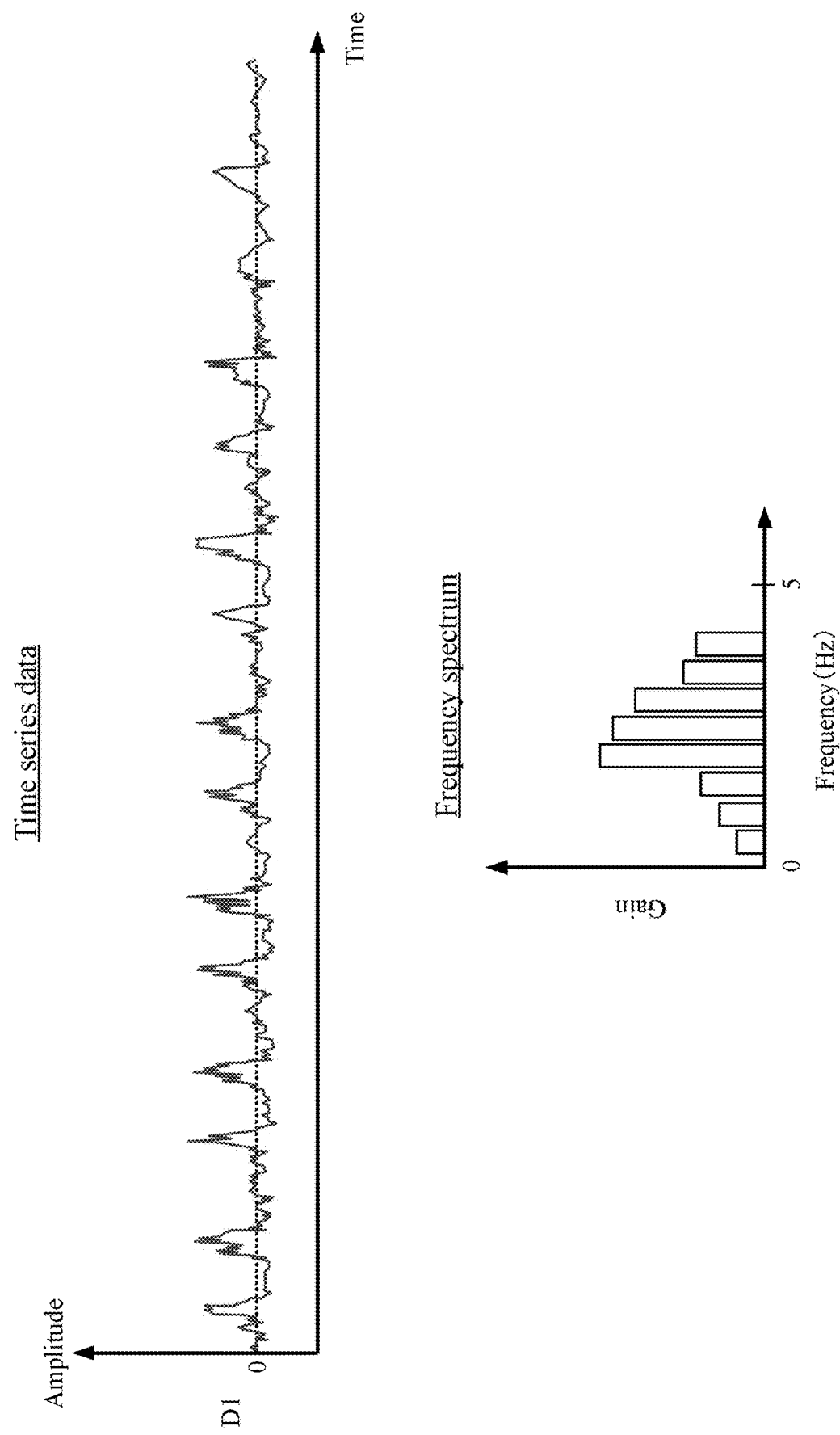
FIG. 17 is a diagram showing digital data D1 (time series data D1) obtained by a data input unit 21 and frequency-domain data D2 obtained by performing frequency transform on the digital data D1.

FIG. 17 is a diagram showing digital data D1 (time series data D1) obtained by a data input unit 1 (the upper portion of FIG. 4) and frequency-domain data D2 obtained by performing frequency transform on the digital data D1 (the lower portion of FIG. 4).

In the case of FIG. 17, the feature vector obtaining unit 22 obtains 8-dimensional data, which is vector data consisting of eight parameters (eight frequency components included in a range from 0 to 5 Hz) as the frequency-domain data D2.

For ease of explanation, a case in which the feature vector obtaining unit 22 obtains 8-dimensional data, which is vector data consisting of eight parameters (eight frequency components included in a range from 0 to 5 Hz) as the frequency-domain data D2 will now be described.

The feature vector data D2 obtained as described above is transmitted from the feature vector obtaining unit 22 to the normalization unit 23.

The normalization unit 23 obtains a norm (norm data) Norm from the feature vector data D2 and performs normalization processing on the feature vector data D2 to obtain normalized feature vector data D3.

More specifically, assuming that the feature vector data D2 is denoted as D2=(x1, x2, . . . , xn), the normalization unit 23 performs processing corresponding to the following Formula to obtain norm data Norm:

$$\text{Norm}=\text{sqrt}(x1^2+x2^2+\ldots+xn^2)$$

where sqrt(x) is a function that returns the square root of x.

The normalization unit 23 obtains the normalized feature vector data D3 by dividing the feature vector data D2 by the norm data Norm. More specifically, the normalization unit 23 obtains the normalized feature vector data D3 whose norm is "1" by dividing each element of the feature vector data D2 (each element of the vector) by the norm data Norm.

The norm data Norm and the normalized feature vector data D3 through the above-describe processing are transmitted from the normalization unit 23 to the selector SEL21 as vector data vec_D3.

The controller (not shown) that controls the various functional units of the state determination apparatus 2000 generates a selecting signal sel21 for selecting the terminal 0 of the selector SEL21, and then transmits the generated selecting signal sel21 to the selector SEL21.

The selector SEL21 transmits the vector data vec_D3 to the template data obtaining unit 24 in accordance with the selecting signal sel21.

The SOM processing unit 243 of the template data obtaining unit 24 performs SOM processing using the normalized feature vector data D3 to determine combining weights between nodes in the input layer and nodes in the output layer. This processing will now be described with reference to FIG. 18.

Figure 18:
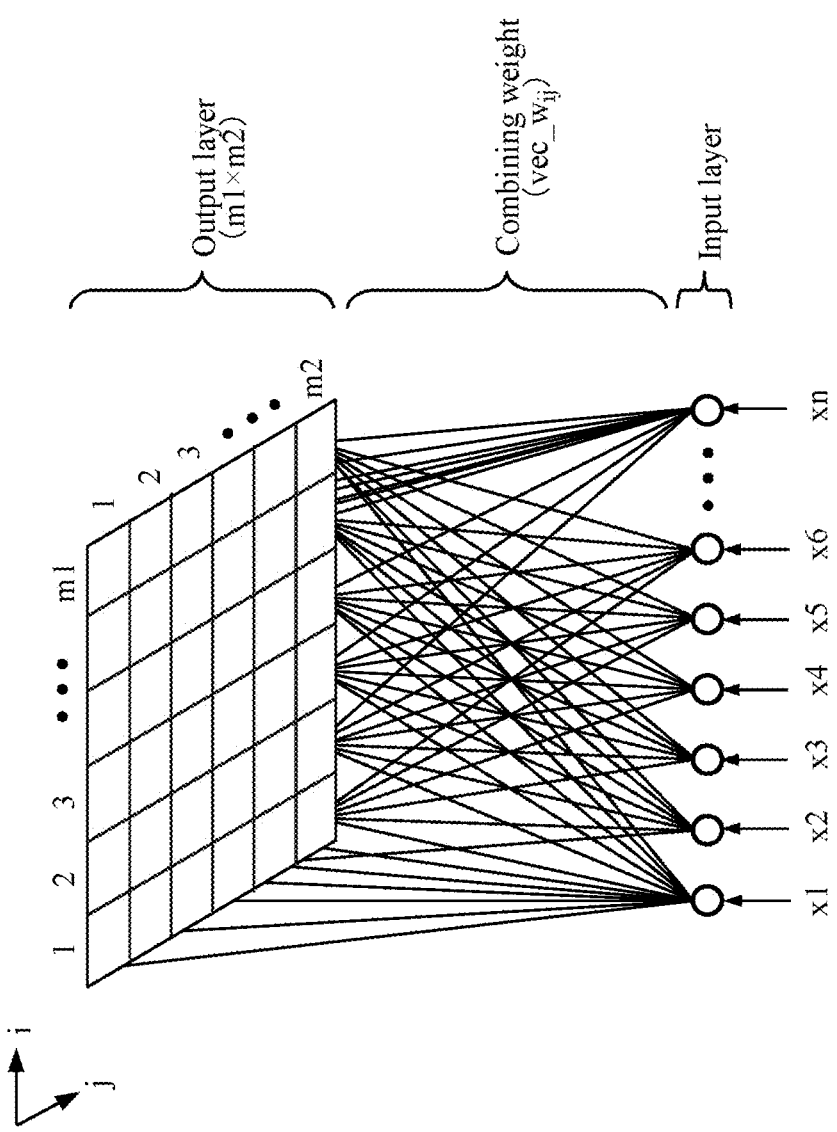
FIG. 18 is a diagram describing SOM processing and schematically showing the structure of an SOM.

FIG. 18 is a diagram describing SOM processing and schematically showing the structure of an SOM. Note that i-axis and j-axis are set as shown in FIG. 18 to define a plane on which neurons of the output layer are disposed.

Assume that input data is given as n-dimensional real number vec_x=(x1, $x_2$, . . . , $x_n$) and the two-dimensional SOM has neurons disposed on m1×m2(=M1) lattice points. More specifically, as shown in FIG. 18, the input layer has n nodes and the output layer has neurons each disposed on one of m1×m2(=M1) lattice points.

Each of nodes (n input nodes) in the input layer for receiving the input data vec_x is connected to all neurons (all output neurons). The neuron $u_{i,j}$, which is located at (i, j) in the two-dimensional lattice arrangement of the output layer, has variable combining weight vector vec_$w_{ij}$= ($w_{ij\_1}$, $w_{ij\_2}$, . . . , $w_{ij\_n}$) for weighting and combining each element of the input data vec_x. This combining weight vector is referred to as a reference vector.

Note that $w_{ij\_k}$ is a combining weight for the output node at a coordinate (i, j) and k-th input node.

The SOM processing unit 243 performs SOM processing through processes described in "<<Step 1>>" and "<<Step 2>>" below.

<<Step 1: Initialization>>

The SOM processing unit 243 randomly sets (sets using random numbers) initial values for vec_$w_{11}$, vec_$w_{12}$, . . . , and vec_$w_{mm}$ at timing t=0 where n is the number of input data vectors and T (≥n) is the number for iteration.

<<Step 2: Learning>>

The SOM processing unit 243 performs processing described below at timing t.

2A:

The SOM processing unit 243 calculates a Euclidean distance dis(vec_x(t), vec_$w_{ij}$(t−1)) between the input data vec_x(t), which is an input data at timing t, and each of reference vectors vec_$w_{ij}$(t−1). Note that dis(vec1,vec2) is a function for calculating a Euclidean distance between a vector vec1 and a vector vec2.

2B:

The SOM processing unit 243 determines a neuron $u_{IJ}$ with the minimum Euclidean distance, and then sets the determined neuron as a winning neuron $u_{IJ}$. Note that the neuron $u_{IJ}$ is a neuron located at the coordinate (I, J).

Alternatively, the SOM processing unit 243 may determine a neuron $u_{IJ}$ with the maximum inner product value, and then set the determined neuron as a winning neuron $u_{IJ}$.

2C:

The SOM processing unit 243 performs learning processing for the reference vector vec_$w_{ij}$(t), which is a reference vector at timing t, using the following formula:

$$\text{vec\_}w_{ij}(t)=\text{vec\_}w_{ij}(t-1)+h((i,j),(I,J),t)\times(\text{vec\_}x(t)-\text{vec\_}w_{ij}(t-1))$$

Note that h is a monotonically decreasing function and has characteristics below.

(1) The function h is a monotonically decreasing function with respect to t, and converges zero as t approaches infinity.
(2) The function h is a monotonically decreasing function with respect the Euclidean distance dis(vec_$u_{ij}$,vec_$u_{IJ}$) between a lattice point (i, j) and a lattice point (I, J). The monotonically decreasing rate (amount) of the function h becomes larger as t becomes larger. Note that vec_$u_{ij}$ is a vector from a predetermined point (e.g., the origin) to the position of a neuron $u_{ij}$ and vec_$u_{IJ}$ is a vector from a predetermined point (e.g., the origin) to the position of a neuron $u_{IJ}$.

Furthermore, the SOM processing unit 243 performs the same processing as described above at timing t+1.

Note that the timing t+1 is timing at which the normalization unit 23 obtains the normalized feature vector data D3 and the SOM processing unit 43 receives, next to timing t, the normalized feature vector data D3 obtained by the normalization unit 23.

The SOM processing unit 243 repeatedly performs the above-described processing until timing t=T.

The SOM processing unit 243 performs the above-described SOM processing, and then obtains the reference vector vcc_w$_{ij}$ which has been obtained when the above-described SOM processing has been completed as a determined reference vector vec_w$_{ij}$_fixed. The SOM processing unit 243 then transmits the determined reference vector vec_w$_{ij}$_fixed to the mapping conversion unit 26.

For ease of explanation, a case in which the input data vec_x, or normalized feature vector data D3, consists of eight pieces of frequency component data and the second-dimensional SOM has neurons each of which is assigned to its corresponding one of 32×32 lattice points will now be described as one example.

The state determination apparatus 2000 also performs norm data processing in the learning phase.

More specifically, the norm obtaining unit 241 extracts norm data Norm from the vector data vec_D3 transmitted from the selector SEL21 and then stores the extracted norm data Norm in the norm data storage unit 242. In other words, the norm obtaining unit 241 extracts norm data Norm from the vector data D3, which is obtained from data inputted into the state determination apparatus 2000 when a person continues to be in a predetermined state (e.g., when a person is walking), and then stores the extracted norm data Norm in the norm data storage unit 242.

The norm obtaining unit 241 reads norm data, which is stored in the norm data storage unit 242 when a person continues to be in a predetermined state (e.g., when a person is walking), and obtains, from the read norm data, an average value Ave(StateK) of the norm data and a standard deviation σ(StateK) of the norm data for each state StateK, which is a state in which the read norm data was obtained. The norm obtaining unit 241 transmits the obtained data to the activity value obtaining unit 25 as vector data vec_Prb.

One example of data obtained by the norm obtaining unit 241 through the above-describe processing will be described below.
(1) Sitting State (State 1)
  Ave(1)=0.082989
  σ(1)=0.059778
(2) Standing State (State 2)
  Ave(2)=0.334777
  σ(2)=0.224319
(3) Running State (State 3)
  Ave(3)=31.286555
  σ(3)=2.630188
(4) Walking State (State 4)
  Ave(4)=12.395692
  σ(4)=3.409114
(5) UpStairs State (State 5)
  Ave(5)=8.146392
  σ(5)=1.912558
(6) DownStairs State (State 6)
  Ave(6)=25.002112
  σ(6)=3.254508

A case in which the above-described data is processed will be described below.

The above-describe data is transmitted from the norm obtaining unit 241 to the activity value obtaining unit 25 as vector data vec_Prb.

2.2.2 Operation of Template Creating Phase

Next, the operation of the template creating phase in the state determination apparatus 2000 will be described.

In the template creating phase, the state determination apparatus 2000 creates template data for (1) Sitting state (a state indicating that a person is sitting), (2) Standing state (a state indicating that a person is standing), (3) Running state (a state indicating that a person is running), (4) Walking state (a state indicating that a person is walking), (5) UpStairs state (a state indicating that a person is going up stairs), and (6) DownStairs state (a state indicating that a person is going down stairs).

First, a case of creating a template for Walking state (a state indicating that a person is walking) will be described.

In this case, the output from the acceleration sensor (not shown) while a person is walking (continues to be in the Walking state) is inputted into the data input unit 21 as the signal Din.

The data input unit 21 samples (digitizes using AD conversion) the signal Din to obtain discrete data (digital data). The data input unit 1 transmits the obtained discrete data (digital data) to the feature vector obtaining unit 22 as the signal D1.

The feature vector obtaining unit 22 transforms the discrete data D1 (digital data D1) obtained by the data input unit 21, for example, using Gabor-wavelet transform into frequency-domain data to obtain the magnitude and phase of each frequency spectrum of the digital data D1.

The feature vector obtaining unit 22 then obtains, for example, data of the magnitude of the frequency spectrum included in a partial frequency band as the feature vector data D2.

The feature vector data D2 obtained by the feature vector obtaining unit 22 is transmitted from the feature vector obtaining unit 22 to the normalization unit 23.

The normalization unit 23 obtains a norm (norm data) Norm from the feature vector data D2 and performs normalization processing on the feature vector data D2 to obtain normalized feature vector data D3.

The normalization unit 23 transmits the obtained norm data Norm and normalized feature vector data D3 to the selector SEL21 as vector data vec_D3.

The controller (not shown) that controls the various functional units of the state determination apparatus 2000 generates a selecting signal scl21 for selecting the terminal 0 of the selector SEL21, and then transmits the generated selecting signal sel21 to the selector SEL21.

The selector SEL21 transmits the vector data vec_D3 to the SOM processing unit 243 in accordance with the selecting signal sel21.

The SOM processing unit 243 extracts the normalized feature vector data D3 from the vector data vec_D3 transmitted from the selector SEL21 and performs SOM processing using the normalized feature vector data D3. In this case, the SOM processing uses, as combining weight vectors (reference vectors) vec_w$_{ij}$, the combining weight vectors (reference vectors) vec_w$_{ij}$_fixed that are determined through the above-described learning processing. The SOM processing unit 243 performs SOM processing on the normalized feature vector data D3 using the combining weight vectors (reference vectors) vec_w$_{ij}$_fixed to obtain SOM data D_som(t), which is SOM data at timing t. The SOM processing unit 243 transmits the obtained SOM data D_som(t) to the SOM data storage unit 244.

The SOM data storage unit 244 stores the SOM output data D_som(t) transmitted from the SOM processing unit 243.

While a person is walking (continues to be in the Walking state) during a period from the timing t=1 to the timing t=N, the state determination apparatus 2000 performs the above-described processing. The SOM processing unit 243 then stores N pieces of SOM output data D_som(t) obtained during the period from the timing t=1 to t=N to the SOM data storage unit 244.

The template data generation unit 245 reads N pieces of SOM output data D_som(1) to D_som(N) obtained during the period from the timing t=1 to t=N (the period in which the person is walking (continues to be in the Walking state)) from the SOM data storage unit 244. Using the SOM output data D_som(1) to D_som(N), the template data generation unit 245 calculates an average value of the output values at the same coordinate position on the second-dimensional SOM (an average of values output from the same output node). Template data for the Walking state (a state indicating that a person is walking) is created by setting the calculated average values to values of their corresponding nodes.

More specifically, assuming that the feature vector data vec_x(t), which is feature vector data at timing t, is defined by the following formulae:

$$\text{vec\_}x(t) = (x_1(t), x_2(t), \ldots, x_{N1}(t))$$

$$N1 = 8, \text{ and}$$

the determined combining weight vector $f\_vec\_w_{ij}$ is defined by the following formulae:

$$f\_vec\_w_{ij} = (w_{ij\_1}, w_{ij\_2}, \ldots, w_{ij\_N}1)$$

$$N1 = 8,$$

the template data is obtained by the following formula:

Formula 11

$$D_{ij}(t) = \sum_{k=1}^{N1} \{x_k(t) \times w_{ij\_k}\} \quad (11)$$

$$N1 = 8$$

where $D_{ij}(t)$ is the output value of a neuron (output node) located at (i, j) on the second-dimensional SOM at timing t.

Note that $w_{ij\_k}$ is a combining weight between the output node at the coordinate (i, j) and the k-th input node.

The template data generation unit 245 obtains a template data value $g_{ij}$ for a node corresponding to a neuron (output node) located at (i, j) on the second-dimensional SOM through the processing corresponding to the formula below.

Formula 12

$$g_{ij} = \frac{1}{N}\sum_{t=1}^{N} D_{ij}(t) \quad (12)$$

The template data generation unit 245 obtains second-dimensional template data by assigning the value $g_{ij}$ calculated through the above processing to the node at the coordinate (i, j)

Figure 19:
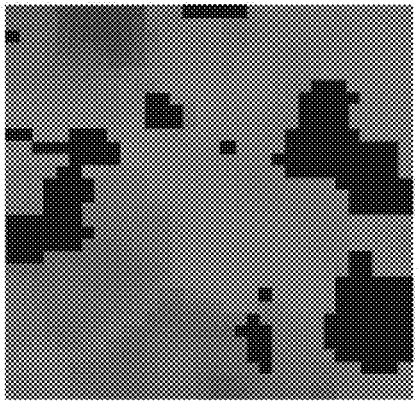
FIG. 19 is a diagram showing an example of template data.
Figure 19:
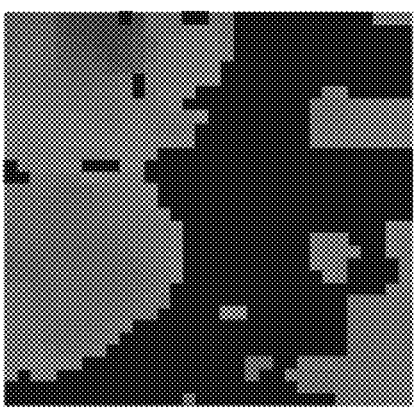
Figure 19:
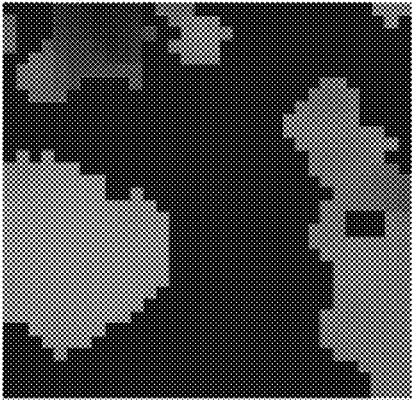
Figure 19:
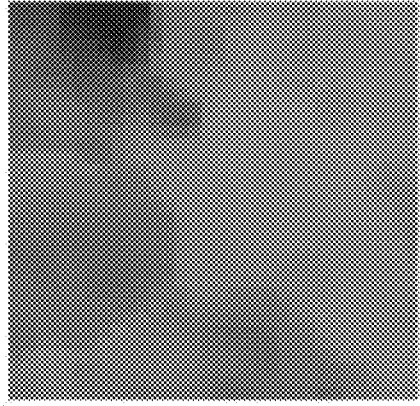
Figure 19:
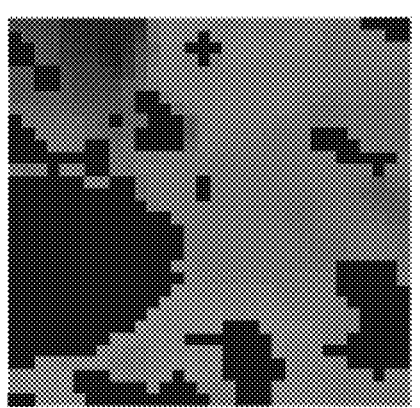
Figure 19:
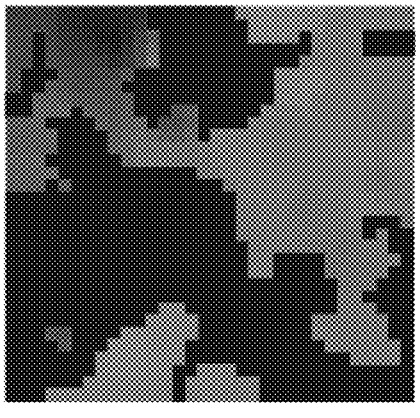

FIG. 19 is a diagram showing an example of template data.

More specifically, FIG. 19(a) is a diagram showing a template data for Sitting state (a state indicating that a person is sitting (State 1)). FIG. 19(b) is a diagram showing a template data for Standing state (a state indicating that a person is standing (State 2)). FIG. 19(c) is a diagram showing a template data for Running state (a state indicating that a person is running (State 3)).

FIG. 19(d) is a diagram showing a template data for Walking state (a state indicating that a person is walking (State 4)). FIG. 19(e) is a diagram showing a template data for UpStairs state (a state indicating that a person is going up stairs (State 5)). FIG. 19(f) is a diagram showing a template data for DownStairs state (a state indicating that a person is going down stairs (State 6)).

For example, FIG. 19(d) a diagram showing the template data Tmpl(4) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is walking (continues to be in Walking state)). In FIG. 19(d), the pixel value at the coordinate (i, j) of the template data Tmpl(4) is the value $g_{ij}$ calculated through the above-described processing.

In the template data shown in FIG. 19, values $g_{ij}$ are normalized to range from 0 to 1 inclusive (0≤$g_{ij}$≤1). In the template data shown in FIG. 19, the template data is represented as image data in which a pixel of $g_{ij}$=0 is depicted as a pixel with a pixel value of 0, which corresponds to W 0% level, and a pixel of $g_{ij}$=1 is depicted as a pixel with a pixel value of 1, which corresponds to W 100% level.

The template data Tmpl(4) for the Walking state (a state in which a person is walking) obtained by the template data generation unit 45 as described above is stored in the template data storage unit 46.

Processing for creating template data for the Running state (a state in which a person is running) is performed in the same manner as described above. The template data for the Running state is referred to as template data Tmpl(3).

More specifically, the output from the acceleration sensor (not shown) while a person is running (continues to be in the Running state) during a period from the timing t=1 to the timing t=N is inputted into the data input unit 21 as the signal Din. The state determination apparatus 2000 performs processing similar to the above-described processing to obtain template data Tmpl(3) for the Running state (a state in which a person is running). The obtained template data Tmpl(3) for the Running state (a state in which a person is running) is then stored in the template data storage unit 46.

FIG. 19(c) is a diagram showing the template data Tmpl (3) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is running (continues to be in Running state)).

Processing for creating template data for other states is performed in the same manner as described above.

A case in which the template data generation unit 245 creates template data by calculating an average value of the output values at the same coordinate position on the second-dimensional SOM (an average of values output from the same output node) using the SOM output data D_som(1) to D_som(N) is described above. However, the present invention should not be limited to the above-described processing. For example, the template data generation unit 245 may create template data through processing below (Processing 1 to Processing 4).

(1) Processing 1 (Threshold Processing for Output Values)

Using the SOM output data D_som(1) to D_som(N), the template data generation unit 245 compares the output values $D_{ij}(t)$ at the same coordinate position on the second-dimensional SOM (the values output from the same output node) with a threshold value Th1. The template data generation unit 245 calculates an average value of the output values $D_{ij}(t)$ satisfying $D_{ij}(t) \geq Th1$, and then sets the calculated average value as a value $g_{ij}$ at the coordinate (i, j) of the template data.

Figure 20:
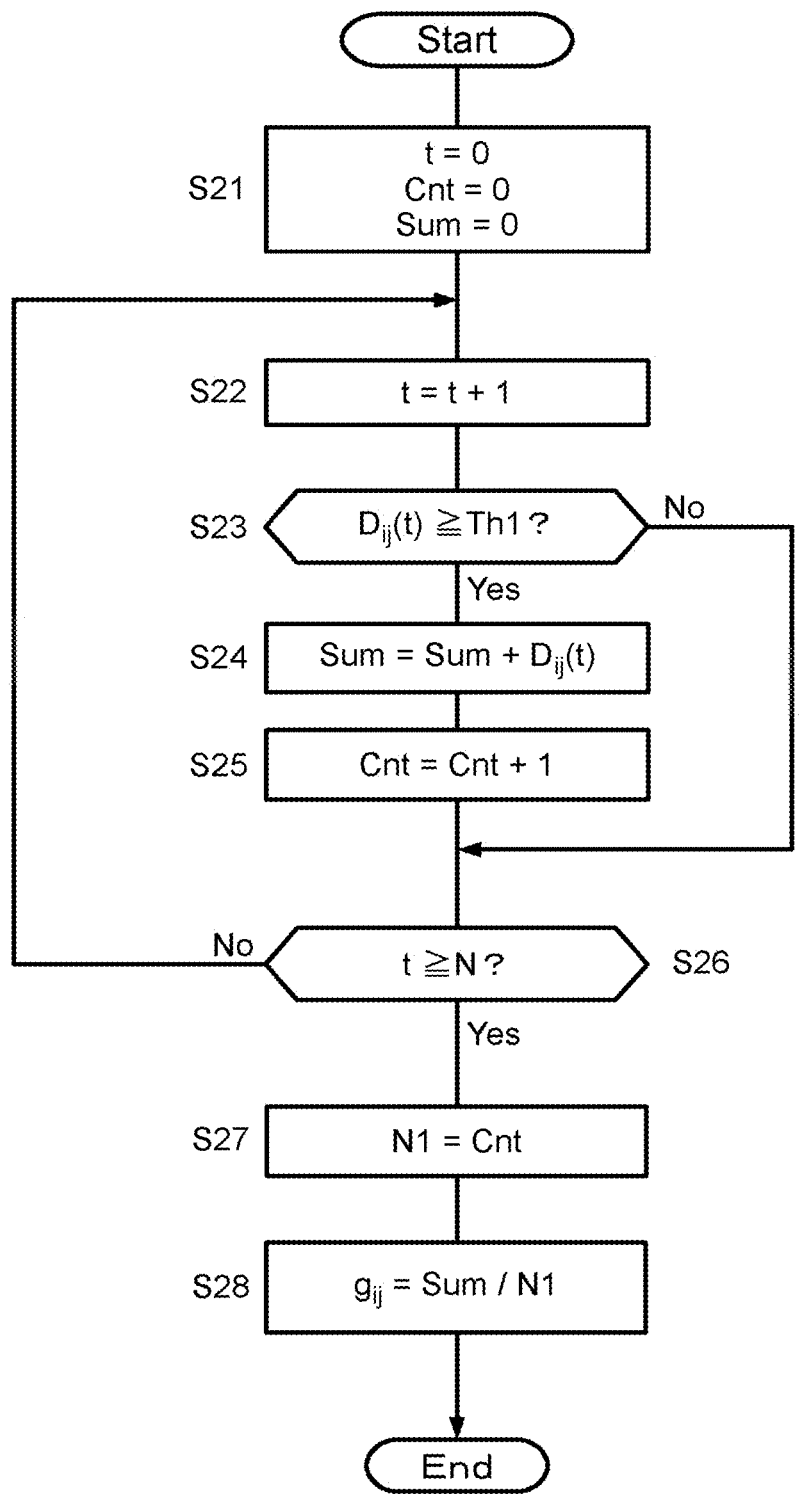
FIG. 20 is a flowchart showing Processing 1 (a threshold process for an output value).

This processing will be described with the flowchart shown in FIG. 20.

In step S21, the template data generation unit 245 sets a variable t representing timing (time), a counter value Cnt, and a sum value Sum to zeros individually.

In step S22, the template data generation unit 245 increments the variable represent timing by one.

The template data generation unit 245 compares the output value $D_{ij}(t)$ at the same coordinate position on the second-dimensional SOM (an average of values output from the same output node) with a predetermined threshold value Th1. If $D_{ij}(t) \geq Th1$ is satisfied ("Yes" at step S23), then the output value $D_{ij}(t)$ is added to the sum value Sum (step S24), and furthermore the counter value Cnt is incremented by one (step S25).

In contrast, if $D_{ij}(t) \geq Th1$ is not satisfied ("No" at step S23), then the template data generation unit 245 advances the processing to step S26.

In step S26, if $t \geq N$ is not satisfied, then the template data generation unit 245 returns the processing to step S22. If $t \geq N$ is satisfied, then the template data generation unit 245 substitutes the counter value Cnt into a final counter value N1 (Step 27). Furthermore, the template data generation unit 245 obtains the template value $g_{ij}$ at the coordinate (i, j) through processing that corresponds to $g_{ij}$=Sum/N1 (Step S28).

The above-described processing allows an average value obtained by excluding output values of SOM which are smaller than the predetermined threshold value to be set as the template data value $g_{ij}$, thereby creating more appropriate template data.

(2) Processing 2 (Threshold Processing for Variance of Output Values)

Using the SOM output data D_som(1) to D_som(N), the template data generation unit 245 calculates variance of the output values $D_{ij}(t)$ at the same coordinate position on the second-dimensional SOM (the values output from the same output node) through processing which corresponds to the following formulae:

Formula 13

$$AveD_{ij} = \frac{1}{N}\sum_{t=1}^{N} D_{ij}(t) \tag{13}$$

Formula 14

$$v_{ij} = \frac{1}{N}\sum_{t=1}^{N} (D_{ij}(t) - AveD_{ij})^2 \tag{14}$$

The template data generation unit 245 then compares the variance $v_{ij}$ with a predetermined threshold value Th2. Subsequently, the template data generation unit 245 calculates an average value of the SOM output values $D_{ij}(t)$ at the coordinate (i, j) which satisfy $v_{ij} \leq Th2$, and then sets the calculated average value as a template data value $g_{ij}$ at the coordinate (i, j).

Note that if $v_{ij} \leq Th2$ is not satisfied, the template data generation unit 245 sets template data values $g_{ij}$ at the coordinate (i, j) to zeros.

Such processing allows an average values obtained using only SOM output values $D_{ij}(t)$ whose variance in a temporal direction is small to be set as a template data value $g_{ij}$ at the coordinate (i, j), thereby creating more appropriate template data. In other words, the above-described processing allows an average values obtained using only SOM output values $D_{ij}(t)$ less variable in the temporal direction to be set as a template data value $g_{ij}$ at the coordinate (i, j), thereby creating more appropriate template data.

(3) Processing 3 (Processing Combining Processing 1 and Processing 2)

The template data generation unit 245 may obtain the template data values $g_{ij}$ at the coordinate (i, j) through processing achieved by combining the above-described Processing 1 and Processing 2.

The template generation unit 245 compares the variance $v_{ij}$ with the predetermined threshold Th2, calculates an average value using only SOM output values $D_{ij}(t)$ which satisfy $v_{ij} \leq Th2$ and are larger than the threshold value Th1, and then sets the calculated average value as a template data value $g_{ij}$ at the coordinate (i, j).

Note that if $v_{ij} \leq Th2$ is not satisfied, the template data generation unit 245 sets a template data value $g_{ij}$ at the coordinate (i, j) to zero.

As described above, processing achieved by combining Processing 1 and Processing 2 allows for creating more appropriate template data.

(4) Processing 4 (Processing Using Data within a Range Defined by n1×σ)

The template data generation unit 245 performs, using the variance $v_{ij}$, processing which corresponds to the formula below to obtain a standard deviation $\sigma_{ij}$ of the SOM output values $D_{ij}(t)$ at the coordinate (i, j).

$$\sigma_{ij} = \mathrm{sqrt}(v_{ij})$$

where sqrt(x) is a function that returns the square root of x.

If $abs(D_{ij}(t) - AveD_{ij}) \leq n1 \times \sigma_{ij}$ (n1 is a positive natural number, abs(x) is a function that returns an absolute value of "x".) is satisfied, the template data generation unit 245 calculates an average value of the SOM output values $D_{ij}(t)$ at the coordinate (i, j) and then sets the calculated average values at the coordinate (i, j) to a template data value $g_{ij}$.

If $abs(D_{ij}(t) - AveD_{ij}) \leq n1 \times \sigma_{ij}$ (n1 is a positive natural number, abs(x) is a function that returns an absolute value of "x".) is not satisfied, the template data generation unit 245 sets a template data value $g_{ij}$ to zero.

Such processing allows for creating template data using data within a range from the average value minus n1×σ to the average value plus n1×σ inclusive.

For example, when n1=3, performing processing as described above allows for creating template data using data within a range from the average value minus 3σ to the average value plus 3σ inclusive. In the state determination apparatus 2000, assuming that SOM output values $D_{ij}(t)$ follows the normal distribution, setting n1 to three (i.e., n1=3) allows for creating template data using data within a range occupying 99.7 percent of the entire range. As described above, adjusting the value of n1 in the state determination apparatus 2000 allows the range of the SOM output value $D_{ij}(t)$ used for creating template data to be adjusted.

Through the above-described processing, the state determination apparatus 2000 creates template data.

Note that normalization may be performed such that the sum of all the template data values $g_{ij}$ becomes "1". Such normalization allows possible range of values indicating correlation degree (e.g., inner product values or Euclidean distances) to be constant (common) regardless of templates to be used in the determination processing for determining the correlation degree between template data and SOM output data. This allows classification determination processing to be easily achieved.

2.2.3 Operation of State Determination Processing Phase

Next, the operation of the state determination processing phase in the state determination apparatus 2000 will be described.

Figure 21:
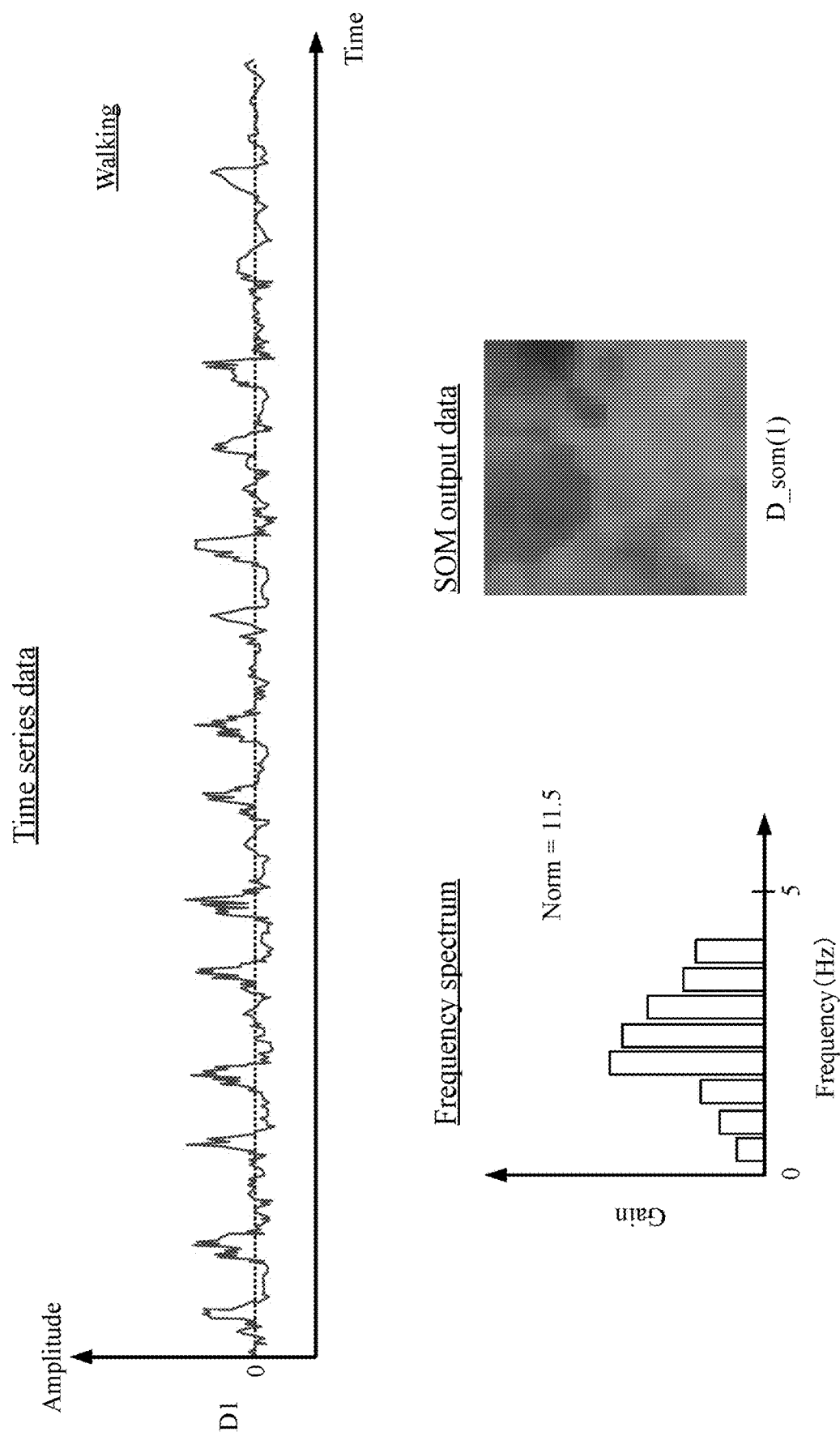
FIG. 21 is a diagram showing a waveform of a signal D1 (waveform in a state of Walking) obtained by the data input unit 21, feature vector data D2 that a feature vector obtaining unit 22 obtains from the signal D1, and SOM output data D_som(1) that a mapping conversion unit 26 obtains from normalized feature vector data D3.

FIG. 21 is a diagram showing a waveform of the signal D1 (waveform in a state of Walking) obtained by the data input unit 21 (the upper portion of FIG. 21), feature vector data D2 that the feature vector obtaining unit 22 obtains from the signal D1 (the left lower portion of FIG. 21), and SOM output data D_som(1) that the mapping conversion unit 26 obtains from the normalized feature vector data D3 (the right lower portion of FIG. 21).

Figure 22:
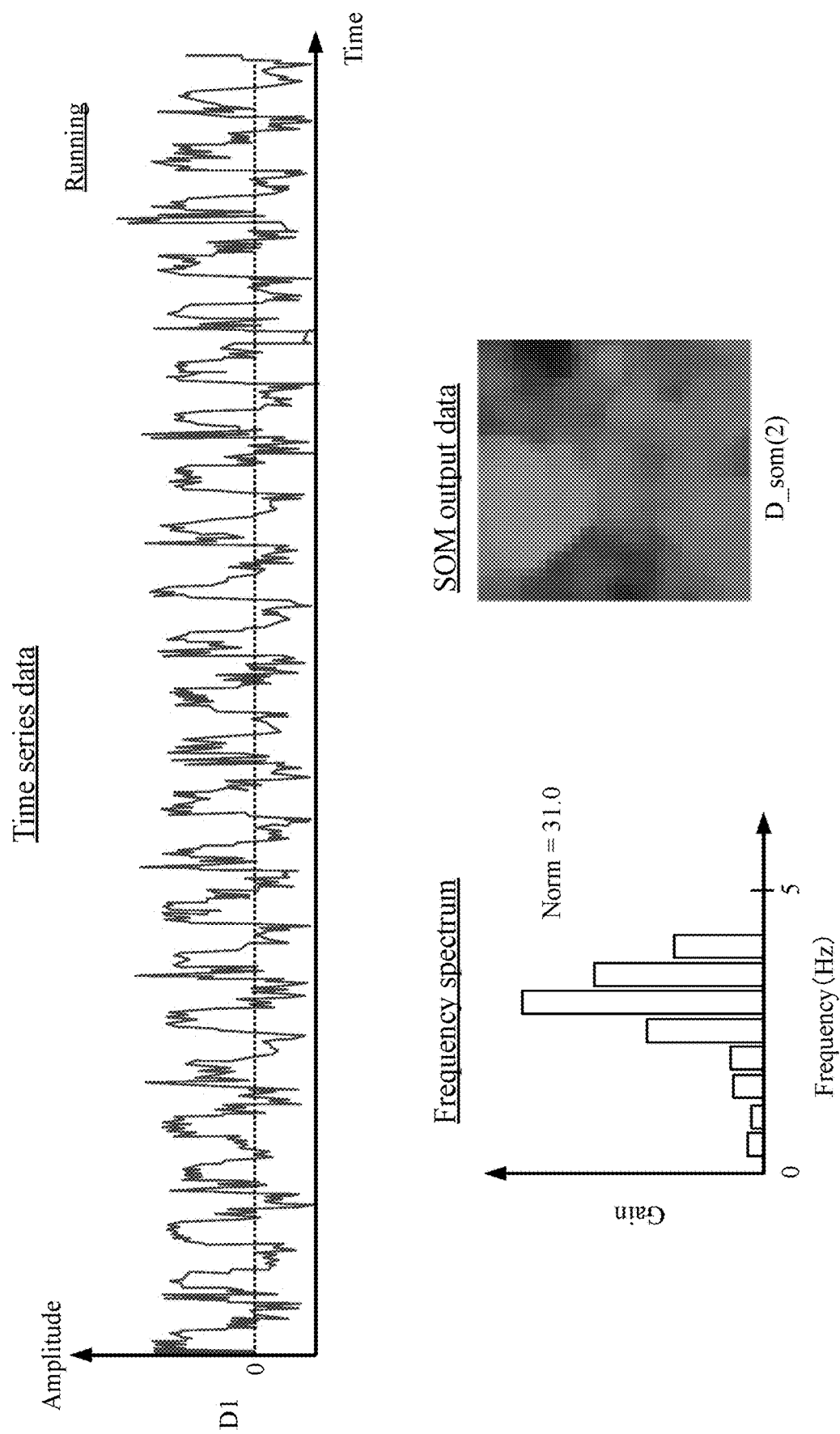
FIG. 22 is a diagram showing a waveform of a signal D1 (waveform in a state of Running) obtained by the data input unit 21, feature vector data D2 that the feature vector obtaining unit 22 obtains from the signal D1, and SOM output data D_som(2) that the mapping conversion unit 26 obtains from normalized feature vector data D3.

FIG. 22 is a diagram showing a waveform of the signal D1 (waveform in a state of Running) obtained by the data input unit 21 (the upper portion of FIG. 22), feature vector data D2 that the feature vector obtaining unit 22 obtains from the signal D1 (the left lower portion of FIG. 22), and SOM output data D_som(2) that the mapping conversion unit 26 obtains from the normalized feature vector data D3 (the right lower portion of FIG. 22).

The output from the acceleration sensor (not shown) for detecting a state of a person is inputted, as a signal Din, to the data input unit 21. Note that the acceleration sensor may be attached to a human body, for example.

The data input unit 21 samples (digitizes) the signal Din to obtain discrete data (digital data) thereof. The data input unit 21 then transmits the obtained discrete data (digital data) to the feature vector obtaining unit 22 as the signal D1.

In Walking state, the signal D1 shown in the upper portion of FIG. 21 is obtained, for example. In Running state, the signal D1 shown in the upper portion of FIG. 22 is obtained.

The feature vector obtaining unit 22 obtains feature vector data D2 from the discrete data D1 (digital data D1) obtained by the data input unit 21 in the same manner as processing in the learning phase.

In Walking state, the feature vector data D2 shown in the lower portion of FIG. 21 is obtained, for example. In Running state, the feature vector data D2 shown in the lower portion of FIG. 22 is obtained.

The feature vector data D2 obtained by the feature vector obtaining unit 22 is transmitted from the feature vector obtaining unit 22 to the normalization unit 23.

The normalization unit 23 obtains norm data Norm and normalized feature vector data D3 from the feature vector data D2 in the same manner as processing in the learning phase. The normalization unit 23 transmits the obtained data to the selector SEL21 as vector data vec_D3.

Assume that norm data Norm obtained in the case of FIG. 21 is "11.5" and norm data Norm obtained in the case of FIG. 22 is "31.0".

The controller (not shown) that controls the various functional units of the state determination apparatus 2000 generates a selecting signal sel21 for selecting the terminal 1 of the selector SEL21, and then transmits the generated selecting signal sel21 to the selector SEL21.

The selector SEL21 transmits the vector data D3 to the activity value obtaining unit 25 and the mapping conversion unit 26 in accordance with the selecting signal sel21.

The first activity calculation unit 2521 of the activity value obtaining unit 25 receives the norm data Norm transmitted included in the vector data vec_D3 transmitted from the selector SEL21 and the average value Ave(1) and the standard deviation σ(1) of the norm data of the feature vector data D2 in State 1 (Sitting state) transmitted from the data obtaining unit 251 for activity calculation. The first activity calculation unit 2521 calculate an activity value D_act(1), which is an activity value in State 1, based on the average value Ave(1) and the standard deviation σ(1) of the norm data of the feature vector data D2 in State 1.

More specifically, assuming that the norm data of the feature vector data D2 in State 1 follows the normal distribution, the activity value obtaining unit 25 obtains the activity value D_act(1) using a probability density function f(x) following the normal distribution. In other words, the activity value obtaining unit 25 obtains the activity value D_act(1) through processing corresponding to the following formula:

Formula 15

$$f(x) = \frac{1}{\sqrt{2\pi\sigma^2}} \exp\left(-\frac{(x-\mu)^2}{2\sigma^2}\right) \qquad (15)$$

where μ is an average value, and a is a standard deviation.

In the present embodiment, the average value Ave(1) and standard deviation σ(1) of the norm data of the feature vector data D2 in State 1 is as follows:

Ave(1)=0.082989

σ(1)=0.059778

Thus, the activity value obtaining unit 25 calculates the value of the probability density function f(x) using μ=Ave(1)=0.082989 and σ=σ(1)=0.059778, and then obtains the calculated value as the activity value D_act(1).

The activity value obtaining unit 25 transmits the activity value D_act(1) obtained through the above-describe processing to the state determination unit 28.

The second activity calculation unit 2522 obtains an activity value D_act(2) for State 2 (Standing state) through the same processing as the above-describe processing.

More specifically, the second activity calculation unit 2522 calculates the value of the probability density function f(x) using μ=Ave(2)=0.334777 and σ=σ(2)=0.224319, and then obtains the calculated value as the activity value D_act(2).

The third activity calculation unit 2523 obtains an activity value D_act(3) for State 3 (Running state) through the same processing as the above-describe processing.

More specifically, the third activity calculation unit 2523 calculates the value of the probability density function f(x) using μ=Ave(3)=31.286555 and σ=σ(3)=20.630188, and then obtains the calculated value as the activity value D_act(3).

The fourth activity calculation unit 2524 obtains an activity value D_act(4) for State 4 (Walking state) through the same processing as the above-describe processing.

More specifically, the fourth activity calculation unit 2524 calculates the value of the probability density function f(x) using μ=Ave(4)=12.395692 and σ=σ(4)=3.409114, and then obtains the calculated value as the activity value D_act(4).

The fifth activity calculation unit 2525 obtains an activity value D_act(5) for State 5 (UpStairs state) through the same processing as the above-describe processing.

More specifically, the fifth activity calculation unit 2525 calculates the value of the probability density function f(x) using μ=Ave(5)=8.146392 and σ=σ(5)=1.912558, and then obtains the calculated value as the activity value D_act(5).

The sixth activity calculation unit 2526 obtains an activity value D_act(6) for State 6 (DownStairs state) through the same processing as the above-describe processing.

More specifically, the sixth activity calculation unit 2526 calculates the value of the probability density function f(x) using μ=Ave(6)=25.002112 and σ=σ(6)=3.254508, and then obtains the calculated value as the activity value D_act(6).

Figure 23:
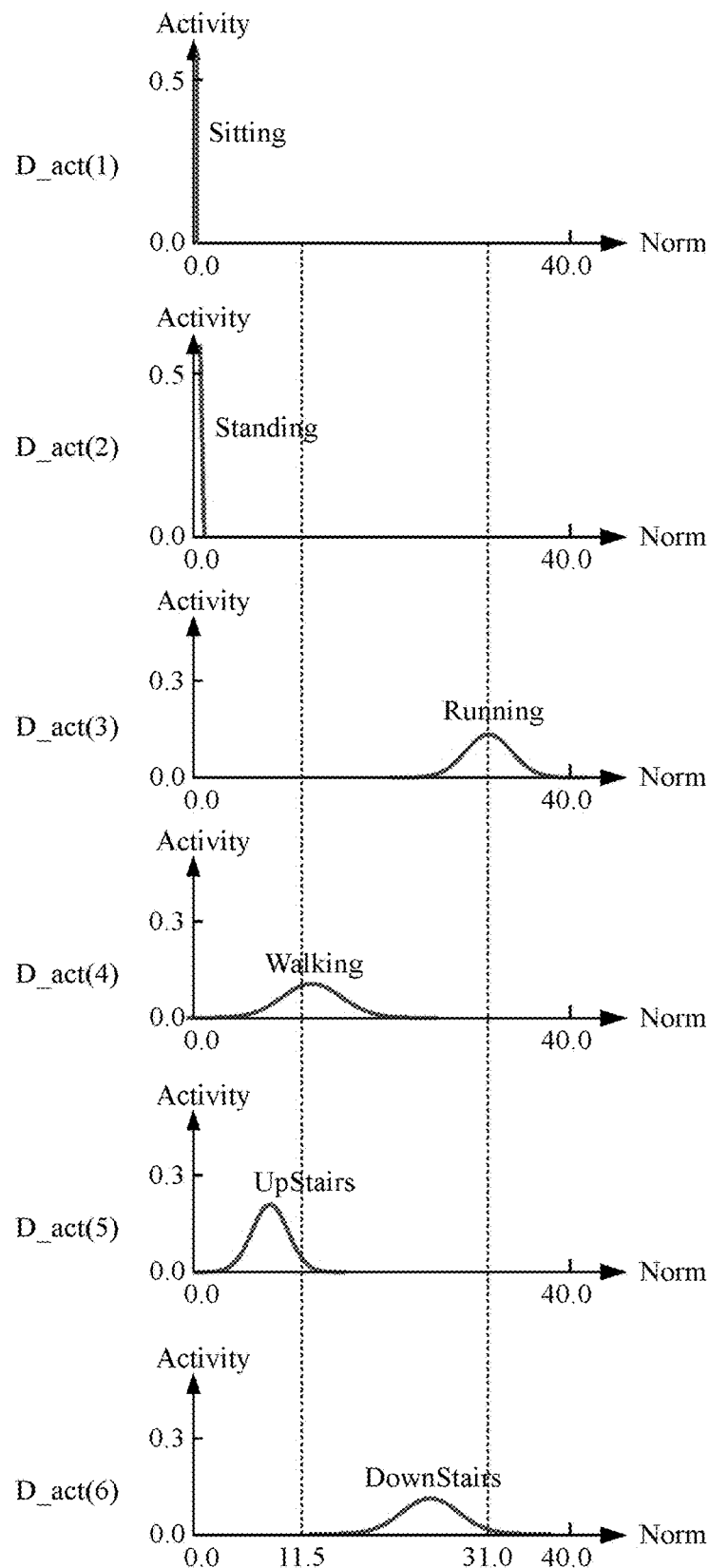
FIG. 23 is a graph in which values calculated using a probability density function f(x) are plotted assuming that noun data of the feature vector data D2 in State k (k is a natural number satisfying 1≤k≤6) follows the normal distribution.

FIG. 23 is a graph in which values calculated using a probability density function f(x) are plotted assuming that norm data of the feature vector data D2 in State k (k is a natural number satisfying 1≤k≤6) follows the normal distribution. In other words, FIG. 23 shows a graph of the probability density function f(x) in the case in which the variable x of the function f(x) following the normal distribution is the norm data Norm and the average value and standard deviation in State k are the above-describe values.

In one example, the activity values D_act(k) obtained by the activity value obtaining unit 5 in a case of x=Norm=11.5 (a case of FIG. 21) and a case of x=Norm=31.0 (a case of FIG. 22) will be shown below.

(1) In the case of x=Norm=11.5 (FIG. 21)
D_act(1)=0.00
D_act(2)=0.00
D_act(3)=0.00
D_act(4)=0.11
D_act(5)=0.04
D_act(4)=0.00

In this case, the activity value D_act(4) for State 4 (Walking state) is large.

(2) In the case of x=Norm=31.0 (FIG. 22)
D_act(1)=0.00
D_act(2)=0.00
D_act(3)=0.15
D_act(4)=0.00
D_act(5)=0.00
D_act(4)=0.02

In this case, the activity value D_act(3) for State 3 (Running state) is large.

The activity values D_act(1) to D_act(6) obtained for each state are transmitted from the activity value obtaining unit 25 to the state determination unit 28.

The mapping conversion unit 26 performs SOM processing on the normalized feature vector data D3 using the combining weights data $w_{ij}$ fixed between nodes in the input layer and nodes in the output layer, which is determined by the SOM processing unit 243. The mapping conversion unit 26 then transmits the SOM output data D_som obtained through the SOM processing to the matching processing unit 27.

In Walking state, the SOM output data shown in the right lower portion of FIG. 21 is obtained, for example. In Running state, the SOM output data shown in the right lower portion of FIG. 22 is obtained.

The TP obtaining unit 271 of the matching processing unit 27 reads, from the template storage unit 246, six pieces of template data Tmpl(1) to Tmpl(6) for six states.

The TP data obtaining unit 271 then transmits the six read pieces of template data Tmpl(1) to Tmpl(6) to the first inner product calculation unit 2721 to the sixth inner product calculation unit 2726, respectively. Note that a case (a case of M=6) in which the matching unit 27 shown in FIG. 16 includes six inner product calculation units will be described.

The first inner product calculation unit 2721 performs processing for calculating an inner product using the SOM output data D_som and the template data Tmpl(1).

More specifically, the first inner product calculation unit 2721 performs processing corresponding to the formula below to calculate an inner product.

Formula 16

$$D\_f(1) = \sum_{j=1}^{m2} \sum_{i=1}^{m1} (D_{ij} \times g_{ij}) \quad (16)$$

Note that $D_{ij}$ is an SOM output value at the coordinate (i, j) on the second-dimensional SOM, and $g_{ij}$ is a value at the coordinate (i, j) of the template data Tmpl(1).

The first inner product calculation unit 2721 transmits the signal indicating the calculated inner product value through the above-described processing to the state determination unit 28 as the signal D_f(1).

The k-th (k is a natural number satisfying 1≤k≤6) inner product calculation unit 272k performs processing for calculating an inner product using the SOM output data D_som and the template data Tmpl(k).

More specifically, the k-th inner product calculation unit 272k performs processing corresponding to the formula below to calculate an inner product.

Formula 17

$$D\_f(k) = \sum_{j=1}^{m2} \sum_{i=1}^{m1} (D_{ij} \times g_{ij}) \quad (17)$$

Note that $D_{ij}$ is an SOM output value at the coordinate (i, j) on the second-dimensional SOM, and $g_{ij}$ is a value at the coordinate (i, j) of the template data Tmpl(k).

The k-th inner product calculation unit 272k transmits the signal indicating the calculated inner product value through the above-described processing to the state determination unit 28 as the signal D_f(k).

The matching processing unit 27 transmits the data obtained through the above-described processing to the state determination unit 28 as vector data vec_D_f(=(D_f(1), D_f(2), D_f(3), D_f(4), D_f(5), D_f(6))) for adaptability data.

The state determination unit 28 determines a state at current timing t based on the received vector data vec_D_act transmitted from the activity value obtaining unit 25 and the received vector data vec_D_f for adaptability data transmitted from the matching processing unit 27.

More specifically, assuming that a determination evaluation value is D_est(k) (k is a natural number satisfying 1≤k≤6), the state determination unit 28 obtains a determination evaluation value D_est(k) for state K through processing corresponding to the following formula:

$$D\_est(k) = D\_act(k) \times D\_f(k).$$

When the adaptability data is obtained by calculation of the inner product as described above, the larger the adaptability data (the inner product value) is, the higher the probability that the current state is the state corresponding to the template used in the processing for calculating the inner product is.

The larger the activity value D_act(k) is, the higher the probability that data inputted into the state determination apparatus 2000 is data obtained in State k.

Thus, the state determination unit 28 determines that State k whose determination evaluation value D_est(k) is the largest of the determination evaluation values D_est(1) to D_est(6) for State 1 to 6 is a state at current timing t, and then transmits a signal indicating the determination result, as the signal Dout, out of the state determination apparatus 2000.

More specifically, (1) when the determination evaluation value D_est(1) is the largest of the determination evaluation values D_est(1) to D_est(6), the state determination unit 28 transmits the signal Dout indicating that data inputted into the state determination apparatus 2000 is data obtained in State 1, or "Sitting state" out of the state determination apparatus 2000.

(2) when the determination evaluation value D_est(2) is the largest of the determination evaluation values D_est(1) to D_est(6), the state determination unit 28 transmits the signal Dout indicating that data inputted into the state determination apparatus 2000 is data obtained in State 2, or "Standing state" out of the state determination apparatus 2000.

(3) when the determination evaluation value D_est(3) is the largest of the determination evaluation values D_est(1) to D_est(6), the state determination unit 28 transmits the signal Dout indicating that data inputted into the state determination apparatus 2000 is data obtained in State 3, or "Running state" out of the state determination apparatus 2000.

(4) when the determination evaluation value D_est(4) is the largest of the determination evaluation values D_est(1) to D_est(6), the state determination unit 28 transmits the signal Dout indicating that data inputted into the state determination apparatus 2000 is data obtained in State 4, or "Walking state" out of the state determination apparatus 2000.

(5) when the determination evaluation value D_est(5) is the largest of the determination evaluation values D_est(1) to D_est(6), the state determination unit 28 transmits the signal Dout indicating that data inputted into the state determination apparatus 2000 is data obtained in State 5, or "UpStairs state" out of the state determination apparatus 2000.

(6) when the determination evaluation value D_est(6) is the largest of the determination evaluation values D_est(1) to D_est(6), the state determination unit 28 transmits the signal Dout indicating that data inputted into the state determination apparatus 2000 is data obtained in State 6, or "DownStairs state" out of the state determination apparatus 2000.

For example, when data shown in FIG. 21 is obtained, (1) the inner product value D_f(4), which is obtained through matching processing between the SOM data D_som(1) and the template data Tmpl(4), is the largest and (2) the activity value D_act(4)(=0.11) is the largest, as shown in FIG. 16. Thus, the value determination evaluation D_est(4) is the largest of the determination evaluation value D_est(1) to D_est(6). Consequently, in the case of FIG. 21, the state determination unit 28 appropriately determines that data inputted into the state determination apparatus 2000 is data obtained in State 4, or "Walking state".

For example, when data shown in FIG. 22 is obtained, (1) the inner product value D_f(3), which is obtained through matching processing between the SOM data D_som(2) and the template data Tmpl(3), is the largest and (2) the activity value D_act(3)(=0.15) is the largest, as shown in FIG. 16. Thus, the value determination evaluation D_est(3) is the largest of the determination evaluation value D_est(1) to D_est(6). Consequently, in the case of FIG. 22, the state determination unit 28 appropriately determines that data inputted into the state determination apparatus 2000 is data obtained in State 3, or "Running state".

As described above, the state determination apparatus 2000 creates template data indicating a predetermined state, and calculates a value D_f(k) (e.g., inner product value) indicating the correlation degree between template data and SOM output data. Furthermore, the state determination apparatus 2000 obtains norm data of the feature vector data D2, and obtains a probability density (relative likelihood) by the probability density function using the obtained norm data. In other words, the state determination apparatus 2000 obtains, as the activity value D_act(k), the probability density (relative likelihood) for State K, which is a state in obtaining the norm data, from the obtained norm data.

The state determination apparatus 2000 then determines the state in which the input data is obtained based on (1) the value indicating the correlation degree for State k and (2) the activity value D_act(k) for State k.

In other words, the state determination apparatus 2000 appropriately detects the correlation degree (the degree of similarity) between the template indicating a predetermined state and the SOM output data even when a map generated by the SOM technique includes discontinuous image regions (e.g., split image regions). Thus, the state determination apparatus 2000 appropriately performs pattern classification processing and/or pattern determination processing even when a map generated by the SOM technique includes discontinuous image regions (e.g., split image regions).

Furthermore, the state determination apparatus 2000 determines the state of input data in consideration of the activity value D_ack(k) for State k. This enables the state determination apparatus 2000 to perform state determination processing with high accuracy even when a plurality of pieces of similar template data are used.

First Modification

A first Modification of the second embodiment will now be described.

The components in this modification that are the same as the components described in the above embodiment will be given the same reference numerals as those components and will not be described in detail.

Figure 24:
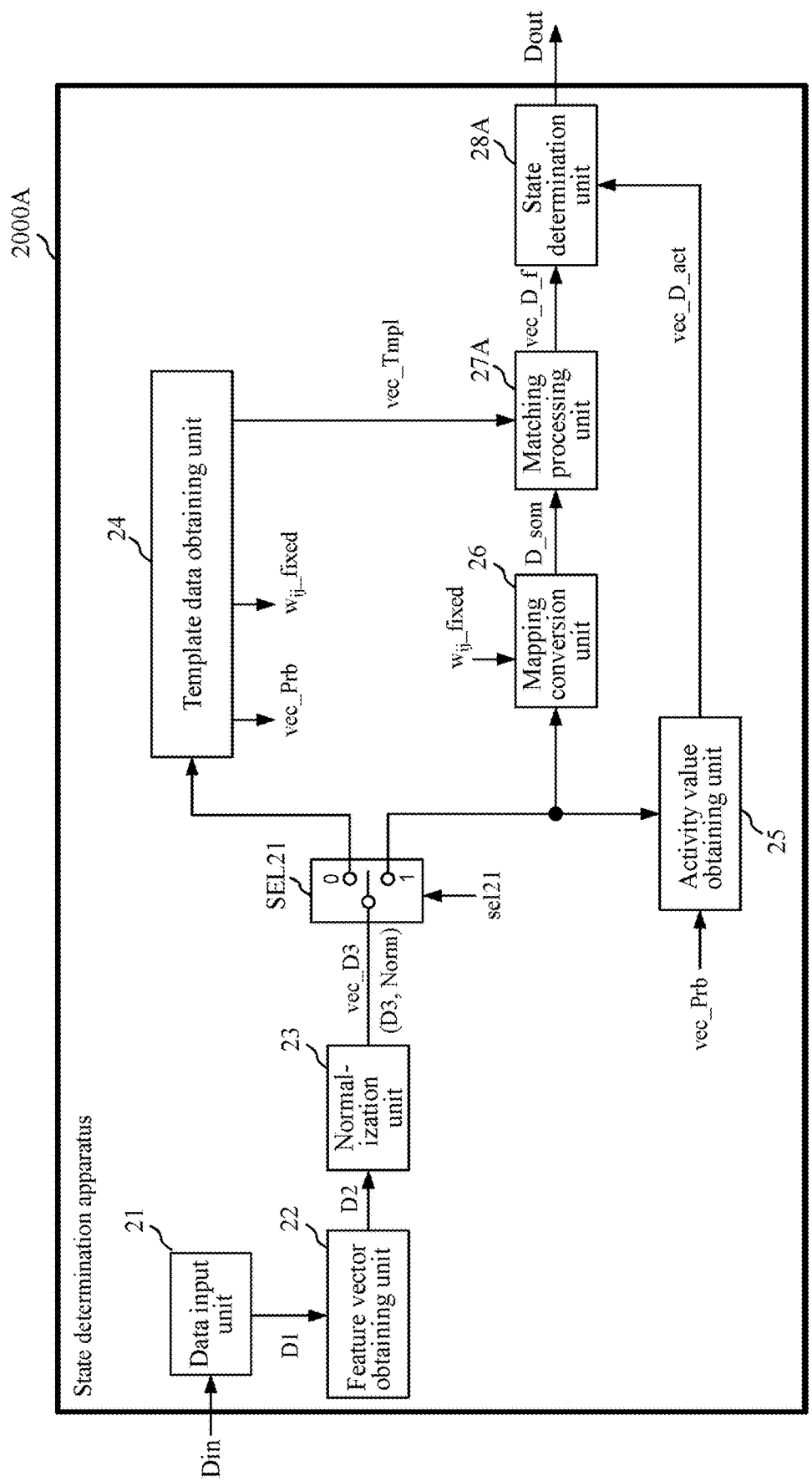
FIG. 24 is a schematic diagram of a state determination apparatus 2000A according to a first modification of the second embodiment.

FIG. 24 is a schematic diagram of a state determination apparatus 2000A according to the first modification of the second embodiment.

Figure 25:
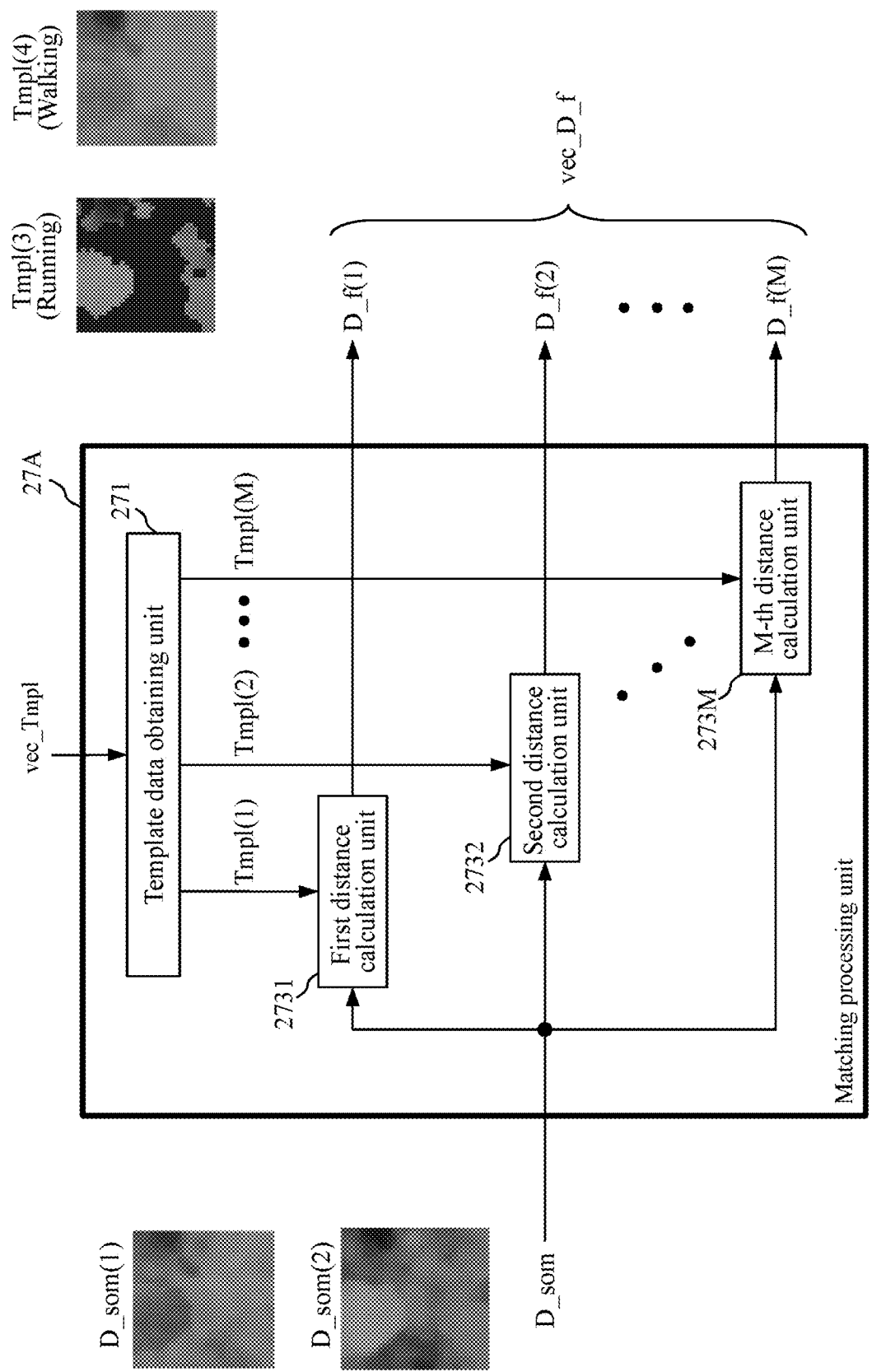
FIG. 25 is a schematic diagram of a matching processing unit 27A according to the first modification of the second embodiment.

FIG. 25 is a schematic diagram of a matching processing unit 27A according to the first modification of the second embodiment.

As shown in FIG. 24, the state determination apparatus 2000A of the present modification includes a matching processing unit 27A, which replaces the matching processing unit 27 of the state determination apparatus 2000 according to the second embodiment, and a state determination unit 28A, which replaces the state determination unit 28 of the state determination apparatus 2000 according to the second embodiment.

The matching processing unit 27A of the present modification includes a first distance calculation unit 2731 to an M-th distance calculation unit 273M, which replaces the first inner product calculation unit 2721 to the M-th inner product calculation unit 272M, respectively.

The matching processing unit 27 obtains the adaptability data D_f by calculating an inner product, whereas the matching processing unit 27A of the present modification obtains the adaptability data D_f by calculating a Euclidean distance.

More specifically, the first distance calculation unit 2731 performs processing corresponding to the formula below to calculate a Euclidean distance between the SOM output data D_som and the template data Tmpl(1).

Formula 18

$$\text{D\_f}(1) = \sum_{j=1}^{m2} \sum_{i=1}^{m1} |D_{ij} - g_{ij}|^2 \qquad (18)$$

Note that $D_{ij}$ is an SOM output value at the coordinate (i, j) on the second-dimensional SOM, and $g_{ij}$ is a value at the coordinate (i, j) of the template data Tmpl(1).

More specifically, the first distance calculation unit 273k (k is a natural number satisfying 1≤k≤6) performs processing corresponding to the formula below to calculate a Euclidean distance between the SOM output data D_som and the template data Tmpl(k).

Formula 19

$$\text{D\_f}(k) = \sum_{j=1}^{m2} \sum_{i=1}^{m1} |D_{ij} - g_{ij}|^2 \qquad (19)$$

Note that $D_{ij}$ is an SOM output value at the coordinate (i, j) on the second-dimensional SOM, and $g_{ij}$ is a value at the coordinate (i, j) of the template data Tmpl(k).

The matching processing unit 27A transmits the data obtained through the above-described processing to the state determination unit 28A as vector data vec_D_f(=(D_f(1), D_f(2), D_f(3), D_f(4), D_f(5), D_f(6))) for adaptability data.

The state determination unit 28A determines a state at current timing t based on the vector data vec_D_act transmitted from the activity value obtaining unit 25 and the vector data vec_D_f for adaptability data transmitted from the matching processing unit 27A.

More specifically, assuming that a determination evaluation value is D_est(k) (k is a natural number satisfying 1≤k≤6), the state determination unit 28A obtains a determination evaluation value D_est(k) for state K through processing corresponding to the following formula:

$$D\_est(k) = D\_act(k) \times F1(D\_f(k))$$

Assume that the function F1(x) is a monotonically decreasing function with respect to x, and the value of the function F1(x) is always positive value or zero.

When the adaptability data is obtained by calculation of the Euclidean distance as described above, the smaller the adaptability data is, the higher the probability that the current state is the state corresponding to the template used in the processing for calculating the Euclidean distance. Since the function F1(x) is a monotonically decreasing function with respect to x, the larger the value of the function F1(D_f(k)) is, the higher the probability that the data inputted into the state determination apparatus 2000A is data in the state corresponding to the template used in the processing for calculating the Euclidean distance.

The larger the activity value D_act(k) is, the higher the probability that data inputted into the state determination apparatus 2000A is data obtained in State k.

Thus, the state determination unit 28A determines that State k whose determination evaluation value D_est(k) is the largest of the determination evaluation values D_est(1) to D_est(6) for State 1 to 6 is a state at current timing t, and then transmits a signal indicating the determination result, as the signal Dout, out of the state determination apparatus 2000A.

More specifically, (1) when the determination evaluation value D_est(1) is the largest of the determination evaluation values D_est(1) to D_est(6), the state determination unit 28A transmits the signal Dout indicating that data inputted into the state determination apparatus 2000A is data obtained in State 1, or "Sitting state" out of the state determination apparatus 2000A.

(2) when the determination evaluation value D_est(2) is the largest of the determination evaluation values D_est(1) to D_est(6), the state determination unit 28a transmits the signal Dout indicating that data inputted into the state determination apparatus 2000A is data obtained in State 2, or "Standing state" out of the state determination apparatus 2000A.

(3) when the determination evaluation value D_est(3) is the largest of the determination evaluation values D_est(1) to D_est(6), the state determination unit 28A transmits the signal Dout indicating that data inputted into the state determination apparatus 2000A is data obtained in State 3, or "Running state" out of the state determination apparatus 2000A.

(4) when the determination evaluation value D_est(4) is the largest of the determination evaluation values D_est(1) to D_est(6), the state determination unit 28A transmits the signal Dout indicating that data inputted into the state determination apparatus 2000A is data obtained in State 4, or "Walking state" out of the state determination apparatus 2000A.

(5) when the determination evaluation value D_est(5) is the largest of the determination evaluation values D_est(1) to D_est(6), the state determination unit 28A transmits the signal Dout indicating that data inputted into the state determination apparatus 2000A is data obtained in State 5, or "UpStairs state" out of the state determination apparatus 2000A.

(6) when the determination evaluation value D_est(6) is the largest of the determination evaluation values D_est(1) to D_est(6), the state determination unit 28A transmits the signal Dout indicating that data inputted into the state determination apparatus 2000A is data obtained in State 6, or "DownStairs state" out of the state determination apparatus 2000A.

As described above, the state determination apparatus 2000A creates template data indicating a predetermined state, and calculates a value D_f(k) (e.g., Euclidean distance) indicating the correlation degree between template data and SOM output data. Furthermore, the state determination apparatus 2000A obtains norm data of the feature vector data D2, and obtains a probability density (relative likelihood) by the probability density function using the obtained norm data. In other words, the state determination apparatus 2000A obtains, as the activity value D_act(k), the probability density (relative likelihood) for State K, which is a state in obtaining the norm data, from the obtained norm data.

The state determination apparatus 2000A then determines the state in which the input data is obtained based on (1) the value indicating the correlation degree for State k and (2) the value F1(D_act(k)) obtained using the function F1 with the activity value D_act(k) in State k.

In other words, the state determination apparatus 2000A appropriately detects the correlation degree (the degree of similarity) between the template indicating a predetermined state and the SOM output data even when a map generated by the SOM technique includes discontinuous image regions (e.g., split image regions). Thus, the state determination apparatus 2000A appropriately performs pattern classification processing and/or pattern determination processing even when a map generated by the SOM technique includes discontinuous image regions (e.g., split image regions).

Furthermore, the state determination apparatus 2000A determines the state of input data in consideration of the activity value D_ack(k) for State k. This enables the state determination apparatus 2000A to perform state determination processing with high accuracy even when a plurality of pieces of similar template data are used.

Other Embodiments

The above embodiments and modifications may be combined to form state determination apparatuses.

Although the above embodiments and modifications describe the case in which the SOM data storage unit 4 and the template data storage unit 6 are achieved by using different memories, the embodiments and modifications should not be limited to this structure. For example, the SOM data storage unit 4 and the template data storage unit 6 may be achieved by using one memory.

Although the above embodiments and modifications describe the case in which the norm data storage unit 242, the SOM data storage unit 244 and the template data storage unit 246 are achieved by using different memories, the embodiments and modifications should not be limited to this structure. For example, the norm data storage unit 242, the SOM data storage unit 244 and the template data storage unit 246 may be achieved by using one memory.

Although the above embodiments and modifications describe the case in which the activity value obtaining unit 25 calculates the activity value D_act(k) using a probability density function f(x) following the normal distribution assuming that the norm data of the feature vector data D2 for State k follows the normal distribution, the embodiments and modifications should not be limited to this configuration. For example, the activity value obtaining unit 25 may calculate the value of the probability density function f(x) using polygonal line approximation or the like, and then obtain the activity value D_act(k) based on the calculated approximate value of the probability density function f(x).

Although the above embodiments and modifications describe the case in which in the learning phase, the norm obtaining unit 241 obtains norm data and then stores the obtained norm data in the norm data storage unit 242, the embodiments and modifications should not be limited to this configuration. For example, in the template creating phase, the norm obtaining unit 241 may obtain norm data and then store the obtained norm data in the norm data storage unit 242.

Although the above embodiments and modifications describe the case in which the number of dimension for the feature vector data D2 and the normalized feature vector data D3 is eight (i.e., in the case of eight-dimensional vector data), the embodiments and modifications should not be limited to this configuration; the number of the feature vector data D2 or the normalized feature vector data D3 may be another number. For example, the feature vector data D2 and the normalized feature vector data D3 may be multidimensional vector data other than eight-dimensional vector data.

Each block of the state determination apparatus described in the above embodiments may be formed using a single chip with a semiconductor device, such as an LSI (large-scale integration) device, or some or all of the blocks of the moving object controller may be formed using a single chip.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented by a central processing unit (CPU) in a computer. All or part of the processes performed by the functional blocks described in the above embodiments may be implemented by a central processing unit (CPU) in a computer. The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a predetermined library), or may be implemented using both software and hardware.

For example, when functional units of the above embodiments and modifications is achieved by using software, the hardware structure (the hardware structure including CPU, ROM, RAM, an input unit, an output unit or the like, each of which is connected to a bus) shown in FIG. 26 may be employed to achieve the functional units by using software.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments are mere examples of the present invention, and may be changed and modified variously without departing from the scope and the spirit of the invention.

APPENDIXES

The present invention may also be expressed in the following forms.

A first aspect of the present invention provides a state determination apparatus including feature vector obtaining circuitry, mapping conversion circuitry, matching processing circuitry, and state determination circuitry.

The feature vector obtaining circuitry is configured to obtain feature vector data from measured data obtained by measuring an event with an unknown state.

The mapping conversion circuitry is configured to obtain SOM output data by mapping the feature vector data into a space whose dimension differs from a dimension of the feature vector data.

The matching processing circuitry is configured to obtain adaptability data indicating a correlation degree between template data indicating a predetermined state and the SOM output data obtained by the mapping conversion circuitry.

The state determination circuitry is configured to determine a state indicated by the measured data based on the adaptability data obtained by the matching processing circuitry.

In the state determination apparatus, the matching processing circuitry obtains the adaptability data indicating the correlation degree between template data indicating a predetermined state and the SOM output data, and the state determination circuitry determines the state of the input data based on the adaptability data.

In other words, the state determination apparatus appropriately detects the correlation degree (the degree of similarity) between the template indicating a predetermined state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

A second aspect of the invention provides the state determination apparatus of the first aspect of the invention in which the matching processing circuitry obtains M (M is a natural number) pieces of adaptability data $D\_f(1)$ to $D\_f(M)$, which respectively indicate the correlation degree with respect to M pieces of template data $Tmpl(1)$ to $Tmpl(M)$.

The state determination circuitry specifies the template data corresponding to the adaptability data whose correlation degree is the highest of the adaptability data $D\_f(1)$ to $D\_f(M)$, and determines that a state corresponding to the specified template data is the state indicated by the measured data.

This enables the state determination apparatus to determine the correlation degree between the SOM output data obtained from the input data and M pieces of template data $Tmpl(1)$ to $Tmpl(M)$ using the adaptability data. Thus, the state determination apparatus appropriately determines which state among the M states corresponding to the template data $Tmpl(1)$ to $Tmpl(M)$ is close to the state in which the input data is obtained.

In other words, the state determination apparatus appropriately detects the correlation degree (the degree of similarity) between the template indicating a predetermined state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

A third aspect of the invention provides the state determination apparatus of the second aspect of the invention in which the matching processing circuitry calculates inner products using M (M is a natural number) pieces of template data and the SOM output data and obtains the calculated inner products as the adaptability data $D\_f(1)$ to $D\_f(M)$.

The state determination circuitry specifies the template data corresponding to the adaptability data whose correlation degree is the highest of the adaptability data $D\_f(1)$ to $D\_f(M)$ and determines that a state corresponding to the specified template data is the state indicated by the measured data.

Thus, the state determination apparatus obtains the correlation degree between the SOM output data obtained from the input data and the M pieces of template data $Tmpl(1)$ to $Tmpl(M)$ by calculating the inner products.

A fourth aspect of the invention provides the state determination apparatus of the second aspect of the invention in which the matching processing circuitry calculates Euclidean distances using M (M is a natural number) pieces of template data and the SOM output data and obtains the calculated Euclidean distances as the adaptability data $D\_f(1)$ to $D\_f(M)$.

The state determination circuitry specifies the template data corresponding to the adaptability data whose correlation degree is the highest of the adaptability data $D\_f(1)$ to $D\_f(M)$ and determines that a state corresponding to the specified template data is the state indicated by the measured data.

Thus, the state determination apparatus obtains the correlation degree between the SOM output data obtained from the input data and the M pieces of template data $Tmpl(1)$ to $Tmpl(M)$ by calculating the Euclidean distances.

A fifth aspect of the present invention provides a state determination apparatus including feature vector obtaining circuitry, normalization circuitry, mapping conversion circuitry, matching processing circuitry, activity value obtaining circuitry, and state determination circuitry.

The feature vector obtaining circuitry is configured to obtain feature vector data from measured data obtained by measuring an event with an unknown state.

The normalization circuitry is configured to obtain a norm of the feature vector data and obtain normalized feature vector data by normalizing the feature vector data.

The mapping conversion circuitry is configured to obtain SOM output data by mapping the normalized feature vector data into a space whose dimension differs from a dimension of the normalized feature vector data.

The matching processing circuitry is configured to obtain adaptability data indicating a correlation degree between template data indicating a predetermined state and the SOM output data obtained by the mapping conversion circuitry.

The activity value obtaining circuitry is configured to obtain an activity value indicating a probability that the norm obtained by the normalization circuitry corresponds to a norm of the feature vector data obtained in the predetermined state.

The state determination circuitry is configured to determine a state indicated by the measured data based on the adaptability data obtained by the matching processing circuitry and the activity value obtained by the activity value obtaining circuitry.

In the state determination apparatus, the matching processing circuitry obtains the adaptability data indicating the correlation degree between the template data indicating a predetermined state and the SOM output data, and the state determination circuitry determines the state of the input data based on the adaptability data and the activity value.

In other words, the state determination apparatus appropriately detects the correlation degree (the degree of similarity) between the template indicating a predetermined state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

Furthermore, the state determination apparatus determines the state of the input data in consideration of the activity value indicating a probability (relative likelihood) of the predetermined state. This enables the state determination apparatus to perform state determination processing with high accuracy even when a plurality of pieces of similar template data are used.

A sixth aspect of the invention provides the state determination apparatus of the fifth aspect of the invention in which the activity value obtaining circuitry obtains the activity value for a state k (k is a natural number satisfying 1≤k≤M, and M is a natural number) through processing corresponding to Formula 20

$$f(x) = \frac{1}{\sqrt{2\pi\sigma^2}} \exp\left(-\frac{(x-\mu)^2}{2\sigma^2}\right) \quad (20)$$

where μ is an average value of norms of the feature vector data obtained in the state k, σ is a standard deviation, x is a value of the norm of the feature vector data, and f(x) is a probability density function.

Thus, the state determination apparatus obtains the activity value using the probability density function f(x) assuming that the norm (norm data) of the feature vector obtained in the k-th state (State k) follows the normal distribution.

A seventh aspect of the invention provides the state determination apparatus of the fifth or sixth aspect of the invention in which the matching processing circuitry obtains M (M is a natural number) pieces of adaptability data D_f(1) to D_f(M), which respectively indicate the correlation degree with respect to M pieces of template data Tmpl(1) to Tmpl(M).

The activity value obtaining circuitry obtains activity values D_act(1) to D_act(M), which respectively corresponds to a first state to M-th state.

The state determination circuitry obtains a determination evaluation value D_est(k) for k-th state based on the adaptability data D_f(k) for the k-th state and the activity value D_act(k) for the k-th state, and determines a state indicated by the measured data based on the obtained determination evaluation value D_est(k) for the k-th state.

This enables the state determination apparatus to determine the correlation degree between the SOM output data obtained from the input data and M pieces of template data Tmpl(1) to Tmpl(M) using the adaptability data. Thus, the state determination apparatus appropriately determines which state among the M states corresponding to the template data Tmpl(1) to Tmpl(M) is close to the state in which the input data is obtained.

In other words, the state determination apparatus appropriately detects the correlation degree (the degree of similarity) between the template indicating a predetermined state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

Furthermore, the state determination apparatus determines the state of the input data in consideration of the activity value indicating a probability (relative likelihood) of the predetermined state. This enables the state determination apparatus to perform state determination processing with high accuracy even when a plurality of pieces of similar template data are used.

An eighth aspect of the invention provides the state determination apparatus of the seventh aspect of the invention in which the matching processing circuitry calculates inner products using M (M is a natural number) pieces of template data and the SOM output data and obtains the calculated inner products as the adaptability data D_f(1) to D_f(M).

The state determination circuitry obtains the determination evaluation value D_est(k) for the k-th state through processing corresponding to $$D\_est(k)=h(D\_f(k),D\_act(k))$$

h(x,y): a function of variables x and y. The state determination circuitry determines that a state corresponding to the largest determination evaluation value of the determination evaluation values D_est(1) to D_est(M) is the state indicated by the measured data.

Thus, the state determination apparatus obtains the correlation degree between the SOM output data obtained from the input data and the M pieces of template data Tmpl(1) to Tmpl(M) by calculating the inner products.

It is preferable that the larger the values of the variables x and y are, the larger the value of the function h(x,y) is.

In one example, the function h(x,y) is a function defined by h(x,y)=x×y.

When the function h(x,y) is set as described above, the determination evaluation value D_est(k) for the k-th state (State k) is calculated using the following formula:

$$D\_est(k)=D\_f(k)\times D\_act(k).$$

A ninth aspect of the invention provides the state determination apparatus of the seventh aspect of the invention in which the matching processing circuitry calculates Euclidean distances using M (M is a natural number) pieces of template data and the SOM output data and obtains the calculated Euclidean distances as the adaptability data D_f(1) to D_f(M).

The state determination circuitry obtains the determination evaluation value D_est(k) for the k-th state through processing corresponding to $$D\_est(k)=h(F1(D\_f(k)),D\_act(k))$$

where h(x,y) is a function of variables x and y, and F1(x) is a monotonically decreasing function with respect to x and the value of the function F1(x) is a positive value or zero, and determines that a state corresponding to the largest determination evaluation value of the determination evaluation values D_est(1) to D_est(M) is the state indicated by the measured data.

Thus, the state determination apparatus obtains the correlation degree between the SOM output data obtained from the input data and the M pieces of template data Tmpl(1) to Tmpl(M) by calculating the Euclidean distances.

It is preferable that the larger the values of the variables x and y are, the larger the value of the function h(x,y) is.

In one example, the function h(x,y) is a function defined by h(x,y)=x×y.

When the function h(x,y) is set as described above, the determination evaluation value D_est(k) for the k-th state (State k) is calculated using the following formula:

$$D\_est(k)=F1(D\_f(k))\times D\_act(k).$$

A tenth aspect of the invention provides the state determination apparatus of one of the first to ninth aspect of the invention in which the template data is composed of two-dimensional elements, and a sum of all the values of the elements of the template data is "1".

In the state determination apparatus, normalization is performed such that the sum of the values of element data of the template data is "1". Such normalization allows possible range of values indicating correlation degree (e.g., inner product values or Euclidean distances) to be constant (common) regardless of templates to be used in the determination processing for determining the correlation degree between template data and SOM output data. This allows classification determination processing to be easily achieved.

An eleventh aspect of the invention provides the state determination apparatus of one of the first to tenth aspect of the invention in which the template data is composed of two-dimensional elements.

The template data is created based on N pieces of SOM output data obtained during a period from timing t=1 to timing t=N (N is a natural number) in which an identical state continues.

Assuming that the template data is composed of m×n (m and n are natural numbers) pieces of data, the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by Formula 21

$$g_{ij} = \frac{1}{N}\sum_{t=1}^{N} D_{ij}(t) \quad (21)$$

where $g_{ij}$ is element data at a second-dimensional coordinate (i, j) (i and j are natural numbers satisfying 1≤i≤m and 1≤j≤n) of the template data, and $D_{ij}(t)$ is element data at a second-dimensional coordinate (i, j) of the SOM output data at timing t.

Thus, the state determination apparatus performs state determination processing using the template data obtained by averaging, in the temporal direction, the SOM output data obtained during the period in which the identical state continues.

A twelfth aspect of the invention provides the state determination apparatus of the one of the first to tenth aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting an average value obtained by calculating an average value of the element data $D_{ij}(t)$ satisfying $D_{ij}(t) \geq Th1$ to a value $g_{ij}$ at a second-dimensional coordinate (i, j) of the template data.

Thus, the state determination apparatus performs state determination processing using the template data obtained by averaging, in the temporal direction, the SOM output data obtained during the period in which the identical state continues. The template data is created through the averaging processing with the data smaller than the predetermined threshold excluded. Using such template data allows the state determination apparatus to perform appropriate state determination processing.

A thirteenth aspect of the invention provides the state determination apparatus of one of the first to tenth aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value vii is obtained by Formula 22

$$AveD_{ij} = \frac{1}{N}\sum_{t=1}^{N} D_{ij}(t) \quad (22)$$

Formula 23

$$v_{ij} = \frac{1}{N}\sum_{t=1}^{N} (D_{ij}(t) - AveD_{ij})^2 \quad (23)$$

and satisfies $v_{ij} \leq Th2$.

Thus, the state determination apparatus performs state determination processing using the template data obtained by averaging, in the temporal direction, the SOM output data obtained during the period in which the identical state continues. The template data is created through the averaging processing using only data whose variance in the temporal direction is smaller than the predetermined threshold.

Using such template data allows the state determination apparatus to perform appropriate state determination processing.

A fourteenth aspect of the invention provides the state determination apparatus of one of the first to tenth aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value vi is obtained by Formula 24

$$AveD_{ij} = \frac{1}{N}\sum_{t=1}^{N} D_{ij}(t) \qquad (24)$$

Formula 25

$$v_{ij} = \frac{1}{N}\sum_{t=1}^{N} (D_{ij}(t) - AveD_{ij})^2 \qquad (25)$$

and satisfies $v_{ij} \leq Th2$, the values $D_{ij}(t)$ of the SOM output data each satisfying $D_{ij}(t) > Th3$ where Th3 is a predetermined threshold.

Thus, the state determination apparatus performs state determination processing using the template data obtained by averaging, in the temporal direction, the SOM output data obtained during the period in which the identical state continues. The template data is created through the averaging processing using data whose variance in the temporal direction is smaller than the predetermined threshold and element data larger than the predetermined threshold. Using such template data allows the state determination apparatus to perform appropriate state determination processing.

A fifteenth aspect of the invention provides the state determination apparatus of the one of the first to tenth aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, (3) $D_{ij}(t)$ is element data at a second-dimensional coordinate (i, j) of the SOM output data at timing t, and (4) $\sigma_{ij}$ is a standard deviation of element data at the coordinate (i, j) obtained by Formula 26

$$AveD_{ij} = \frac{1}{N}\sum_{t=1}^{N} D_{ij}(t) \qquad (26)$$

Formula 27

$$v_{ij} = \frac{1}{N}\sum_{t=1}^{N} (D_{ij}(t) - AveD_{ij})^2 \qquad (27)$$

$$\sigma_{ij} = sqrt(v_{ij})$$

sqrt(x): a function that returns the square root of x, the template data is created by (A) setting an average values of the SOM output data $D_{ij}(t)$ to the value $g_{ij}$ when $abs(D_{ij}(t) - AveD_{ij}) \leq n1 \times \sigma_{ij}$ is satisfied and (B) setting zero to the value $g_{ij}$ when $abs(D_{ij}(t) - AveD_{ij}) \leq n1 \times \sigma_{ij}$ is not satisfied.

Thus, the state determination apparatus performs state determination processing using the template data obtained by averaging, in the temporal direction, the SOM output data obtained during the period in which the identical state continues. The template data is created through the averaging processing using data whose value is within a range from the average value minus 3σ to the average value plus 3σ inclusive. Using such template data allows the state determination apparatus to perform appropriate state determination processing.

A sixteenth aspect of the present invention provides a state determination method including a feature vector obtaining step, a mapping conversion step, a matching processing step, and a state determination step.

The feature vector obtaining step includes obtaining feature vector data from measured data obtained by measuring an event with an unknown state.

The mapping conversion step includes obtaining SOM output data by mapping the feature vector data into a space whose dimension differs from a dimension of the feature vector data.

The matching processing step includes obtaining adaptability data indicating a correlation degree between template data indicating a predetermined state and the SOM output data obtained by the mapping conversion step.

The state determination step includes determining a state indicated by the measured data based on the adaptability data obtained by the matching processing step.

This achieves the state determination method having the same advantageous effects as the state determination apparatus of the first aspect of the present invention.

A seventeenth aspect of the present invention provides an integrated circuit including feature vector obtaining circuitry, mapping conversion circuitry, matching processing circuitry, and state determination circuitry.

The feature vector obtaining circuitry is configured to obtain feature vector data from measured data obtained by measuring an event with an unknown state.

The mapping conversion circuitry is configured to obtain SOM output data by mapping the feature vector data into a space whose dimension differs from the dimension of the feature vector data.

The matching processing circuitry configured to obtain adaptability data indicating a correlation degree between template data indicating a predetermined state and the SOM output data obtained by the mapping conversion circuitry.

The state determination circuitry configured to determine a state indicated by the measured data based on the adaptability data obtained by the matching processing circuitry.

This achieves the integrated circuit having the same advantageous effects as the state determination apparatus of the first aspect of the present invention.

An eighteenth aspect of the present invention provides a state determination method including a feature vector obtaining step, a normalization step, a mapping conversion step, a matching processing step, an activity value obtaining step, and a state determination step.

The feature vector obtaining step including obtaining feature vector data from measured data obtained by measuring an event with an unknown state.

The normalization step includes obtaining a norm of the feature vector data and obtaining normalized feature vector data by normalizing the feature vector data.

The mapping conversion step includes obtaining SOM output data by mapping the normalized feature vector data into a space whose dimension differs from the dimension of the normalized feature vector data.

The matching processing step includes obtaining adaptability data indicating a correlation degree between template data indicating a predetermined state and the SOM output data obtained by the mapping conversion step.

The activity value obtaining step includes obtaining an activity value indicating a probability that the norm obtained by the normalization circuitry corresponds to a norm of the feature vector data obtained in the predetermined state.

The state determination step includes determining a state indicated by the measured data based on the adaptability data obtained by the matching processing step and the activity value obtained by the activity value obtaining step.

This achieves the state determination method having the same advantageous effects as the state determination apparatus of the fifth aspect of the present invention.

A nineteenth aspect of the present invention provides a state determination apparatus including feature vector obtaining circuitry, normalization circuitry, mapping conversion circuitry, matching processing circuitry, activity value obtaining circuitry, and state determination circuitry.

The feature vector obtaining circuitry is configured to obtain feature vector data from measured data obtained by measuring an event with an unknown state.

The normalization circuitry is configured to obtain a norm of the feature vector data and obtain normalized feature vector data by normalizing the feature vector data.

The mapping conversion circuitry is configured to obtain SOM output data by mapping the normalized feature vector data into a space whose dimension differs from the dimension of the normalized feature vector data.

The matching processing circuitry is configured to obtain adaptability data indicating a correlation degree between template data indicating a predetermined state and the SOM output data obtained by the mapping conversion circuitry.

The activity value obtaining circuitry is configured to obtain an activity value indicating a probability that the norm obtained by the normalization circuitry corresponds to a norm of the feature vector data obtained in the predetermined state.

The state determination circuitry is configured to determine a state indicated by the measured data based on the adaptability data obtained by the matching processing circuitry and the activity value obtained by the activity value obtaining circuitry.

This achieves the integrated circuit having the same advantageous effects as the state determination apparatus of the fifth aspect of the present invention.

What is claimed is:

1. A movement state determination system comprising:
    an acceleration sensor configured to output an analog signal corresponding to movement of the acceleration sensor;
    input circuitry configured to receive the analog signal output from the acceleration sensor, convert the received analog signal to digital signal, and transmit the digital signal;
    feature vector obtaining circuitry configured to receive the digital signal transmitted from the input circuitry, perform frequency transform on the received digital signal to obtain feature vector data, and transmit the obtained feature vector data;
    selector circuitry configured to receive the feature vector data transmitted from the feature vector obtaining circuitry, receive a control signal from a controller, transmit the feature vector data to (i) mapping conversion circuitry or (ii) self organizing map (SOM) processing circuitry depending on the control signal;
    the mapping conversion circuitry configured to receive the feature vector data transmitted from the selector circuitry and obtain SOM output data by mapping the feature vector data into a space whose dimension differs from a dimension of the feature vector data;
    matching processing circuitry configured to obtain adaptability data indicating a correlation degree between template data indicating a predetermined movement state and the SOM output data when a distribution of the SOM output data is discontinuous; and
    movement state determination circuitry configured to
        identify one of a plurality of candidate movement states of the acceleration sensor based on the adaptability data; and
        output a signal indicating the identified one of the plurality of candidate movement states corresponding to the analog signal output by the acceleration sensor,
    wherein
    the acceleration sensor is configured to be attached to an object and the analog signal output by the acceleration sensor corresponds to movement of the object, and
    the object is a human body and the analog signal output by the acceleration sensor corresponds to movement of the human body.

2. The movement state determination system of claim 1, wherein
    the plurality of candidate movement states include at least a walking state, a running state and a standing state.

* * * * *